(12) United States Patent
McIntosh

(10) Patent No.: US 6,185,576 B1
(45) Date of Patent: Feb. 6, 2001

(54) DEFINING A UNIFORM SUBJECT CLASSIFICATION SYSTEM INCORPORATING DOCUMENT MANAGEMENT/RECORDS RETENTION FUNCTIONS

(76) Inventor: Lowrie McIntosh, 190 Arroyo Ter., Pasadena, CA (US) 91103

( * ) Notice: Under 35 U.S.C. 154(b), the term of this patent shall be extended for 0 days.

(21) Appl. No.: 09/176,394

(22) Filed: Oct. 21, 1998

Related U.S. Application Data

(63) Continuation of application No. 08/717,897, filed on Sep. 23, 1996, now abandoned.

(51) Int. Cl.[7] .................................................. G06F 17/30
(52) U.S. Cl. ............................................ 707/200; 707/206
(58) Field of Search ........................... 707/200, 202–204, 707/206; 705/2, 3

(56) References Cited

U.S. PATENT DOCUMENTS

| | | | |
|---|---|---|---|
| 4,276,597 | 6/1981 | Dissly et al. ............................... | 707/1 |
| 4,542,477 | 9/1985 | Noyori et al. ............................. | 704/7 |
| 4,674,066 | 6/1987 | Kucera ...................................... | 707/5 |
| 4,862,408 | 8/1989 | Zamora .................................. | 707/102 |
| 4,879,648 | 11/1989 | Cochran et al. ...................... | 345/353 |
| 4,899,299 | 2/1990 | MacPhail .............................. | 364/570 |
| 5,018,060 | 5/1991 | Gelb et al. ............................. | 707/205 |
| 5,051,891 | 9/1991 | MacPhail .............................. | 707/200 |
| 5,056,021 | 10/1991 | Auborn .................................... | 704/9 |
| 5,107,419 | 4/1992 | MacPhail .............................. | 707/9 |
| 5,168,565 | 12/1992 | Morita .................................. | 707/3 |
| 5,197,005 | 3/1993 | Shwartz et al. ........................... | 707/2 |
| 5,201,047 | 4/1993 | Maki et al. ................................ | 707/4 |
| 5,201,048 | 4/1993 | Coulter et al. ............................ | 707/3 |
| 5,204,812 | 4/1993 | Kasiraj et al. ............................ | 707/9 |
| 5,206,949 | 4/1993 | Cochran et al. .......................... | 707/4 |
| 5,218,696 | 6/1993 | Baird et al. ............................... | 707/1 |
| 5,229,936 | 7/1993 | Decker et al. .......................... | 704/10 |
| 5,261,103 | 11/1993 | Takeuchi et al. ..................... | 395/705 |

(List continued on next page.)

OTHER PUBLICATIONS

Skupsky, D.S., "Legal Requirements & Legal Considerations—the Basis for the Legal Records Retention Period," Records Management Quarterly, v24, n2, Apr. 1990, pp. 32–36.*

Skupsky, D.S., "The Functional Records Retention Schedule—an Alternative that Works!," Records Management Quarterly, v23, n4, Oct. 1989, pp. 37–43.*

\* cited by examiner

Primary Examiner—Maria N. Von Buhr
(74) Attorney, Agent, or Firm—Blakely Sokoloff Taylor & Zafman

(57) ABSTRACT

An interlingual mechanism to achieve uniformity when classifying anything by subject. Using generic terminology in an especially oriented hierarchical structure, it directs the user to a single classification. The system captures acronyms, vernacular and industry-specific, as well as foreign terms, into a thesaurus that can be modified and appended as classification needs change. The system "learns" as synonyms are added to "family groups", capturing differences in individual perception. Searching for an entity is quickly successful by reversing the process. To ask the system for the location of any item, a descriptive term is entered that the individual believes best describes the object in question. If this entry results in a "hit", all information pertaining to the item is then available to query. If the entry term does not find a match in the generic structure, the system will search the synonym data base for a match. By arranging "generic terms" in a classified format, the system provides a single location for each record series and enables linking all relevant administrative document management functions and legal retention requirements. Selective and timely purging of documents is thus made possible, greatly facilitating the management of information for both current and prospective use.

10 Claims, 42 Drawing Sheets

U.S. PATENT DOCUMENTS

| | | | |
|---|---|---|---|
| 5,265,065 | 11/1993 | Turtle | 707/4 |
| 5,274,806 | 12/1993 | Hill | 707/10 |
| 5,297,039 | 3/1994 | Kanaegami et al. | 707/5 |
| 5,299,123 | 3/1994 | Wang et al. | 707/2 |
| 5,307,266 | 4/1994 | Hayashi et al. | 707/531 |
| 5,369,763 | 11/1994 | Biles | 707/3 |
| 5,404,514 | 4/1995 | Kageneck et al. | 707/5 |
| 5,418,946 | 5/1995 | Mori | 707/1 |
| 5,418,948 | 5/1995 | Turtle | 707/4 |
| 5,418,951 | 5/1995 | Damashek | 707/5 |
| 5,423,034 | 6/1995 | Cohen-Levy et al. | 707/10 |
| 5,428,778 | 6/1995 | Brookes | 707/5 |
| 5,454,101 | 9/1995 | Mackay et al. | 707/3 |
| 5,463,773 | 10/1995 | Sakakibara et al. | 707/102 |
| 5,469,355 | 11/1995 | Tsuzuki | 704/9 |
| 5,530,848 | 6/1996 | Gilbert et al. | 395/683 |
| 5,630,125 | 5/1997 | Zellweger | 707/103 |
| 5,634,051 | 5/1997 | Thomson | 707/5 |
| 5,634,130 | 5/1997 | Lee | 395/733 |
| 5,649,196 | 7/1997 | Woodhill et al. | 707/204 |
| 5,655,130 | 8/1997 | Dodge et al. | 707/511 |
| 5,689,699 | 11/1997 | Howell et al. | 380/4 |

| Electronic Records System |
|---|

File   Edit   View   Window   Help

| Inventory Entry [ERS 030A] |
|---|

| Series Code: | [          ] | | [OK] |
| ---: | :--- | --- | :--- |
| | | | [Cancel] |
| Title:<br>(Name)<br>(Geography) | JOHN B. DOE<br>TRAVEL RE XX PROJ.<br>1/96 2:36:01 pm | | [Synonyms..] |
| Entry Date: | 8/22/96 14:36 | | |
| Class Code: | ACPAEM | ↓ | [Classes.] |
| Record Type: | Official | ↓ | o Single Add |
| | | | o Continuous Add |
| Media Type: | Paper | ↓ | o Similar Cont. Add |
| Location: | First Drawer, Top | | [Locations..] |
| File Name: | [          ] | | |
| Author: | Mcintosh Lowrie | | [Authors...] |
| Organization: | INFOLOGICS, INC. | | [Organizations...] |
| Entered By: | Lowrie | | |

Ready

Figure 1

| Electronic Records System |
|---|
| File  Edit  View  Window  Help |
| Synonym Update List [ERS750A] |

| Synonym Name | Class Code | Extended Class Title |
|---|---|---|
| BEAN COUNTER | AC | ACCOUNTING |
| BILLS,STATEMENTS | ACIN | ACCOUNTING INVOICES |
| BLAKELY SOKOLOF | LEPA | LEGAL PATENTS/TRADEMARKS |
| BUDGET | ADREFO | ADM,REC. MGMNT., FORMS MGT. |
| BUDGET | FIBU | FINANCE,BUDGET |
| CALENDAR | ADREFO | ADMINISTRATION |
| CONTRACT | LECO | LEGAL CONTRACT / AGREEMENTS |
| EMPLOYEE | LECO | LEGAL CONTRACT / AGREEMENTS |
| ERIC HYMAN | LEPA | LEGAL PATENTS/TRADEMARKS |
| ERS IV | OPCL | OPERATIONS |
| GREEN SHEET | ACAJITWH | ACCT, ADJ, INVENTORY, WAREHOUSE |
| HARDWARE | ADDP | ADMIN, EDP INFORMATION SYSTEMS |
| KAISER | OPCL | OPERATIONS |

Ready

FIGURE 2

Electronic Records System

File   Edit   View   Window   Help

Inventory Request Update [ERS740B]

| | | | | | |
|---|---|---|---|---|---|
| | Enter your search criteria to select documents | | | | Search |
| Class Code: | Equals ▼ | HRJD ▼ | Classes... | Syn.. | Cancel |
| Title: | Contain ▼ | JOB DESCRIPTION | OR. | | Reset |
| | | JOB | OR. | | Less... |
| | | | | | |
| Author: | Equals ▼ | | | Authors... | |
| Organization: | Equals | INFOLOGICS, INC | | Organizations | |
| Location: | Equals | | | Locaations.. | |
| Media Type: | Equals | Paper | | | |
| Record Type: | Equals | Official | | | |
| Entered by: | Equals | Lowrie | | | |
| Entry Date: | Equals | 8/22/96  Calandar | | Calandar | |
| Series Code: | Equals ▼ | JOB DESCRIPTION | | | |

Ready

Figure 3

| Electronic Records System |
|---|

File  Edit  View  Window  Help

| Inventory Request Update [ERS740B] |
|---|

| Enter your search criteria to select documents | | | | | Search |
|---|---|---|---|---|---|
| Class Code: | Equals ▼ | ▼ | Classes... | Syn.. | Cancel |
| Title: | Contain ▼ | Budget | | OR. | Reset |
| | | | | OR. | More... |
| | | | | | |
| Author: | Equals ▼ | | | Authors... | |

Ready

Figure 5

| Electronic Records System |
|---|

File  Edit  View  Window  Help

| Inventory Entry [ERS 030A] |
|---|

| Series Code: | [           ] | | OK |
| --- | --- | --- | --- |
| | | | Cancel |
| Title:<br>(Name)<br>(Geography) | BUDGET DATA<br>MARKETING DEPT.<br>1/96 (Sample Data) | | Synonyms.. |
| Entry Date: | 8/22/96 11:10 | | |
| Class Code: | FIBU ↓ | | Classes. |
| Record Type: | Official ↓ | o Single Add | |
| | | o Continuous Add | |
| Media Type: | Paper ↓ | o Similar Continuous Add | |
| Location: | First Drawer, Top (B249901) | | Locations.. |
| File Name: | [           ] | | |
| Author: | Mcintosh Lowrie ↓ | | Authors... |
| Organization: | INFOLOGICS, INC. | | Organizations.. |
| Entered By: | Lowrie | | |

| Ready |
|---|

Figure 6

| Electronic Records System |
|---|

File  Edit  View  Window  Help

| Inventory Update [ERS 720A] |
|---|

| Inv. ID | Inventory Label | Series Code | Class Code | Author/ Entered By | Organization Location |
|---|---|---|---|---|---|
| 5219 | BUDGET PREP DEPARTMENT FORMS 1995-6 | | ADREFO | lowrie | INFOLOGICS, Inc. |
| 5217 | BUDGET DATA MARKETING DEPT 1996 | | FIBU | lowrie | INFOLOGICS, Inc. |
| 5216 | BUDGET DATA-work sheets MARKETING DEPT 1996 (sample data) | | FIBUWS | lowrie | INFOLOGICS, Inc. |
| 5213 | Manager, Budget Planning Job Description Aug. 1996 | | HRJD | lowrie | INFOLOGICS, Inc. [D3470104] |
| 4694 | BUDGETING PRINCIPLES & PRACTICE H C HEISER 1959 | | ADLY | lowrie | INFOLOGICS, Inc. Bottom Glass Shelf |

| Changes saved to database... |
|---|

FIGURE 7

| Fig 12A | Fig 12B | Fig 12C |
|---------|---------|---------|
| Fig 12D | Fig 12E | Fig 12F |

Fig. 12

| Fig 13A | Fig 13B | Fig 13C | Fig 13D |
|---------|---------|---------|---------|
| Fig 13E | Fig 13F | Fig 13G | Fig 13H |
| Fig 13I | Fig 13J | Fig 13K | Fig 13L |

Fig. 13

| Fig 14A | Fig 14B | Fig 14C | Fig 14D |
|---------|---------|---------|---------|
| Fig 14E | Fig 14F | Fig 14G | Fig 14H |
| Fig 14I | Fig 14J | Fig 14K | Fig 14L |

Fig. 14

Fig. 13D tbl_dict
| ent_nme: varchar(40) |
| --- |
| att_nme: varchar(40) |
| att_def: varchar(255) |
| col_nme:varchar(40) |
| dtyp: char(20) |
| ent_def: varchar(255) |
| null_opt: char(20) |
| udt_nme:char(20) |
| lst_chg_dte: datetime |
| lst_chg_by: char(20) |
| timestamp: timestamp | tbl_obj_idn
| obj_nme: char(20) |
| --- |
| idn:int |
| lst_chg_dte: datetime |
| lst_chg_by: char(20) |
| timestamp: timestamp |
| filler_1:char(255) |
| filler_2:char(255) |
| filler_3:char(255) |
| filler_4:char(255) |
| filler_5:char(255) |
| filler_6:char(255) |
| filler_7:char(255) |
| filler_8:char(103) |

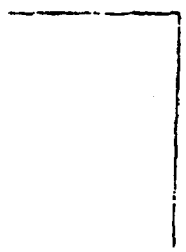

Fig. 14D

DEFINING A UNIFORM SUBJECT CLASSIFICATION SYSTEM INCORPORATING DOCUMENT MANAGEMENT/RECORDS RETENTION FUNCTIONS

This application is a continuation of U.S. application Ser. No. 08/717,897, filed Sep. 23, 1996, now abandoned.

BACKGROUND OF THE INVENTION

The exponential growth of information within an enterprise which is stored in individual document form has created a need for a reliable mechanism to purge individual documents when no longer legally or otherwise required, as well as locate them in an efficient manner.

In an age when the growth of information contained within documents has been exponential, a missing element is the ability to determine the proper life cycle for a document, and thus, make it possible for the document to be purged on a scheduled basis. However, to safely accomplish this purging process, a document management system typically requires that a significant amount of detail be stored with the document.

Since all retention scheduling is based on the subject matter of a document, it is essential that the system identify the subject matter of all documents in a consistent manner. Additionally, the terms used to identify the subject matter must conform to the terms used in legislation to identify documents as well as the terminology in current use within the enterprise.

The present invention provides a reliable mechanism to accomplish this task.

In systems having this capability, the "type" of document must also be determined. Different types of documents within the same subject matter area may have different retention requirements. The system must be able to determine the type of document at the outset. This "type" information specifies whether a particular document is "official" or "informational" and whether it is also "vital" or "sensitive." The type of document determines the level of protection afforded and has a direct impact on determining the life-cycle of the document. Additionally, document type impacts the decision as to the media selected to store it, whether electronic, paper or film.

Official documents are those documents identified in a retention schedule as having either administrative or legislative retention requirements. Properly, only official documents are subject to archiving.

Informational documents (largely copies) have their own destruction schedule based on need. They are not archived and their life cycle must not exceed official documents of the same subject. They are destroyed at the office level when their usefulness is over. Normally, informational documents have a substantially shorter life-cycle than official documents pertaining to the same subject.

Vital documents are those that are absolutely essential to the conduct of the enterprise and whose loss would be hugely expensive or would irrefutably damage continued operations.

Sensitive documents contain, for example:
1. Personnel information which provides confidential data.
2. Information that in the hands of a competitor could be used to embarrass or cast a bad image on the enterprise with its customers or the public.
3. Marketing, product development or corporate changes that could sabotage effectiveness.

SUMMARY OF THE INVENTION

A system is disclosed for providing a true interlingual mechanism to achieve uniformity when classifying documents by subject to assist in the management, complying with retention requirements and long term storage of documents of an organization. In this connection, as used herein, the term document includes, without limitation, the hard copy and digitally stored version of the output of a computer program such as a wordprocessor, microfilm or microfiche, correspondence of all types and office folders which themselves may contain documents. Although not a document by this definition, objects such as furniture and the like may also be classified by creating a label (in this case, the document) which contains all of the relevant classification information for the object. Using generic terminology in a hierarchical structure, use of the system directs a user of the system to a single classification for any document. The system captures acronyms, vernacular and industry specific terms, as well as foreign terms, into a thesaurus that can be modified and appended as classification needs change. The system learns as synonyms are added to the hierarchical structure capturing differences in individual perception.

Legislative terminology describes document retention requirements by subject. In this connection, two major issues exist:

1. Documents whose retention is covered by legislative requirements must be retained a prescribed period of time, after a certain event takes place, e.g., after an audit is completed, when the document is superseded, when its purpose has been completed (such as a contract) and for certain corporate documents).
2. Legal penalties exist, including fines, where purging of documents occurs before their legal requirements have been met. On the other hand, retaining documents longer than their legal requirement can have both a "sword and a shield" effect where litigation is concerned.

With billions of documents being filed every day, the volume of documents subject to legislative retention offer additional justification for a system that makes retrieval inexpensive and predictable. Current practices involving the classification of documents make it difficult to identify documents by subject. However, retention legislation identifies documents by subject.

Accordingly, all documents must be identified by subject and ultimately destroyed consistently with the enterprise's official retention schedule.

In most cases legislation is silent as to the specific media to be used to "house" a document, This means that legislative retention requirements apply to all media. For example, if the paper document is destroyed and it continues to exist on magnetic media, the retention schedule is not effective and is not being enforced. This invention provides a reliable structure to accomplish compliance with all legislative retention requirements.

In addition to classifying documents to ensure compliance with legislatively or other required retention schedules, as a bi-product, the invention includes the capability of searching for the location of a particular document. To use the system for the location of any particular document, a descriptive term is entered at a query prompt that the user believes best describes the subject matter of the document in question. If this entry results in a hit, all information pertaining to the document is then available to query. An example of a screen display in which such a query may be made is shown in FIG. 3. For example, entry of a descriptive term produces a particular subject classification (i.e., a class code as described below).

For a typical user, there is just a small set of documents within his or her responsibility. Thus, once within this relatively small set of documents, if only those assigned a particular class code are deemed to be "hits," the user is able to easily select the correct document from the set of hits. For users whose responsibility includes a large set of documents such that it would not be feasible to select a desired document from a list of documents assigned a particular class code hit list, a full range of attribute filters would be available to narrow the hits. Examples of such attribute filters include location (physical location such as file cabinet or work station), acronym (class codes, alpha and/or numeric references, i.e., form numbers, department IDs), organizational unit (cost center number, departmental number), subject description (i.e., class code), label description (e.g., three line description for a particular tangible asset as shown in FIG. 1. If the entry term does not find a match in the hierarchical structure, the system will search a synonym database for a match. If the search of the synonym database also does not yield the desired document, it must be concluded that the desired document has not been classified.

By arranging terms from the general to the specific in a consistent classification format, the system is able to specify a physical location for a hard copy of a document by office, box, draw and folder, or of a document on magnetic or similar media by diskette location, hard disk drive location (i.e., computer) or network drive location (i.e., server) and file name. In this manner, for each document within a set of records, linking all relevant administrative document management functions and legal retention requirements for each document classified in the system is possible.

Selective and timely purging of documents is thus made possible, greatly facilitating the management of information for both current and prospective use.

BRIEF DESCRIPTION OF THE DRAWINGS

FIG. 1 is a screen display showing a query screen for performing a search.

FIG. 2 is a screen display showing a list of synonyms.

FIG. 3 is a screen display showing a query screen for performing a search.

FIG. 5 is a screen display showing a query screen for performing a search.

FIG. 6 is a screen display showing the results of a query of the type shown in FIG. 5.

FIG. 7 is a screen display showing the results of a query of the type shown in FIG. 5.

FIG. 12 shows the layout for the entity relationship diagram shown in FIGS. 12A–12F.

FIG. 13 shows the layout for the logical database model shown in FIGS. 13A–13L.

FIGS. 13A–13D show the first row of Figures forming the logical database model.

FIG. 14 shows the layout for the physical database model shown in FIGS. 14A–14L.

FIGS. 14A–14D show the first row of Figures forming the physical database model.

DETAILED DESCRIPTION OF THE INVENTION

Figure 4:
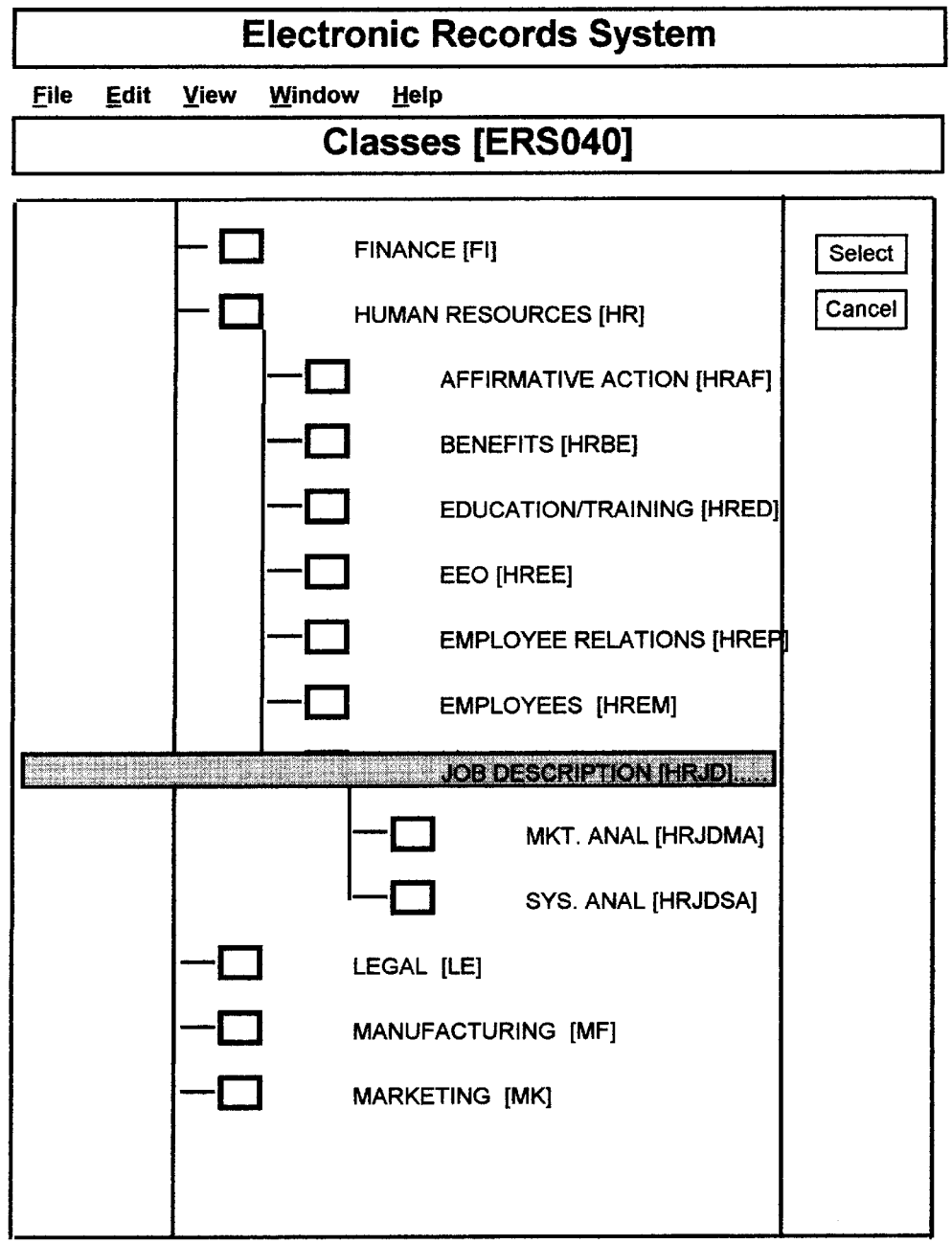
FIG. 4 is a screen display showing the results of a query of the type shown in FIG. 3.

This invention is a computer based system which provides a reliable structure to properly identify and track documents used by an enterprise throughout their life cycle to provide an efficient and easy to use mechanism to ensure that document retention requirements are complied with while enabling the orderly destruction of documents once their retention requirements have been satisfied.

In order to meet all the requirements of a document management system, it is necessary to develop a technique for classifying documents by subject. For this reason, the requirements of a document management system are more disciplined than any other component of an information resource management environment. One particular component is a detail tracking mechanism that must be in place to know where each document is and how many copies exist so that they all may be destroyed according to schedule.

Schedules must be rigorously followed. If the documents in question have to do with a litigation, the court in which the litigation is pending will test to determine if a true schedule exists and if records are destroyed in accordance with the schedule. If a true retention schedule does not exist, the company can be sanctioned for destroying records related to the case. The source of protection, and limiting exposure, lies within a disciplined document management program and enforcement of document retention policies covering all media.

Classification is performed when the document is created. There are a number of reasons for developing software that makes retrieval easier and control and tracking a bi-product of the processing which of necessity is already being performed. One factor which leads to performing document classification at document creation is placing the responsibility for classifying the document on the individual creating the document. The individual creating the document is in the best position to provide its proper classification. The time it takes to learn proper classifications for the subject areas involved for the normal user is relatively short, typically a matter of hours. This small investment in time substantially reduces the time required for searches to locate documents for retention schedule compliance and for retrieval. Learning to classify at the time a document is "saved" enables the use of the same procedure when a search needs to be performed.

Almost all search engines in use today rely on various mechanical techniques and sophisticated algorithms to find documents that have been saved by an author using "on-the-fly" techniques for classifying. This invention provides a mechanism for the author/creator of the document to classify the document properly, and, in such a form that anyone searching for the document would, following the same sequence, find the document with ease. This makes investing a small amount of time on the "save" side important because it makes the search time much more productive and far quicker than prior art approaches.

The selection of terms and what are referred to as classes used in a hierarchical structure to classify documents must be of the most generic form possible. Terms used in each class, i.e., Major, Primary, Secondary, Tertiary and Quaternary, requires that each word has a relative relationship and the same value level as any other word in that grouping. In order to simplify the subject description, where possible, the first two letters of the word used in each level of hierarchy is selected as its acronym.

In a very short period of time, the acronyms become easily translatable as the individual users have an opportunity to work with the system. This ease of learning is more easily understood since the range of subjects in use by a predominance of users is limited to a very small number, usually between 10 and 15 classes. Rarely does anyone using a typical work station require global searches, i.e., searches extending through multiple organizational units. Such searches would require special security clearance and a substantial knowledge of system navigation.

The invention also employs the intelligent use of synonyms, i.e., a synonym database, as pointers. Synonyms are used to direct the user to the "official" term for the appropriate classification. To populate the synonym database, a document inventory is taken to collect the local terms being used to describe documents. It should be noted that a detailed inventory of document descriptions currently existing (i.e., prior to implementation of the invention) is not needed. However, when a system implementing the invention is initially used, it is preferable that there be some inventory of terms (synonyms) in use be available to the new users of the system to improve acceptance of the system and productivity. This inventory or synonym database can be created manually, i.e., by manual entry as part of the Browse Synonym function shown in FIG. 9. The synonym database contains all or a subset of terms in use by the organization to refer to a particular document instead of the "official" term used to classify that document. A screen display used for this purpose is shown in FIG. 2.

Synonyms are assigned to each level of the hierarchy. This enables anyone to use a term that they perceive is related to the subject matter and be directed to a unique official classification.

There should be only one location in the hierarchy for any document. If it appears that there is more than one location, it generally means that the selected classification is not as precise as it should be, and it is likely that an additional classification should be added.

One of the most important strengths of using a synonym database to link the elements of the hierarchy is that it makes possible the use of local vernacular. Changes to the hierarchy are rare, leaving its structure stable. Almost all changes can be easily accomplished through changes in synonyms.

Because of the global scope of this invention, such as its use on the Internet, the use of foreign language terms in the synonym database makes it possible for the system to uniformly classify documents (as well as any other item) using any language throughout the world. With this range of flexibility, a unique classification tool exists for any multi-national information system.

One of the important aspects of this invention relates to its record retention components which create a records retention linkage. This includes tracking and providing a direct linkage to the terminology used in the U.S. Code of Federal Regulations and to similar legislative retention requirements of any other country. In addition to identifying the media, it also catalogs the type of record.

The document type determines the essential security requirements for these documents.

Use of the invention provides a system that ensures uniformity by all users when classifying documents by subject, i.e., a uniform subject classification system. This invention provides a hierarchically structured, subject oriented database, populated with terms in current use by the enterprise (i.e., chart of accounts and organizational chart) and by legislative references which pertain to the retention of documents. A typical set of class codes names with class code acronyms in a uniform subject classification is shown in Table II.

When a document is "saved," as on a magnetic media, or simply classified manually as in hardcopy documents, the system provides classification tools that enable the process to "find" the single proper classification in the hierarchy.

The "search" process is the reverse, where the search word (subject description) is entered into the system and the classification tools lead the user to the proper classification and then to the document being sought.

Supplemental databases containing synonyms are available for each line of the classification scheme. These databases can be added to by the user and in this way translate acronyms, local vernacular, abbreviations and foreign terms that reveal the user's perception of the subject being sought.

Associated with all documents belonging to the same subject (referred to as a "File Series") are a body of particular attributes set forth by legislative or informational requirements.

The invention provides a tracking mechanism to enable protecting, finding and retrieving a document, or group of documents (file series) when needed and to ultimately locate and destroy them when their life-cycle has been completed, as specified by an official retention schedule.

Using The Uniform Subject Classification System

I. Build A Classification Structure:

Select terms from legislative, business government and other industry sources. Adapt terms used in the Code of Federal Regulations, state statutes and terms that are industry specific. Organize selected terms into hierarchical order, i.e., primary class and sub-classes (i.e., secondary, tertiary, etc.).

II. Apply Synonyms To The Classification Structure

Assemble synonyms into a thesaurus and connect the synonyms with a particular file series (i.e., a line in the class hierarchy).

Build a database of local vernacular, acronyms, technical terms, etc.

Organize the database into the classification structure built in step I, appending to the synonym database, as appropriate.

Modify major classes, primary classes, secondary classes, etc. as required to fit the working environment.

III. Classify Documents

Determine major classes, e.g.,: Accounting, Administration, Finance, Marketing, Corporate, Legal, Engineering, etc. Major classes should be by functional class, not organizational names.

Using the first two characters in the class description, assign functional descriptions from the general to the specific, under the selected major class, then do the same thing for the selected primary class, secondary class, etc., until no further delineation is needed to classify all documents of interest. In most cases, no more than tertiary or quaternary classes are needed. For example, a document containing "Employee Expense Accounts" would be classified as follows:

AC Accounting (MAJOR)
PA Payables (PRIMARY)
EM Employee (SECONDARY)

which results in the Uniform Subject Classification Code:

ACPAEM ACCOUNTING, PAYABLES, EMPLOYEE

Depending on need, class levels can be adjusted to fit local conditions.

| | | |
|---|---|---|
| AD | Administration | Level 1 |
| FA | Facilities | Level 2 |
| BU | Buildings | Level 3 |
| OF | Offices | Level 4 |
| FU | Furnishings | Level 5 |
| AR | Art | Level 6 |
| DE | Desk | Level 6 |

With the above class levels, the following are examples of acronyms which could be employed:

ADFAOF Administration, Facilities, Offices
ADFAOFFU Administration, Facilities, Offices, Furnishings
ADFUDE Administration, Furnishings, Desk
ADFUAR Administration, Furnishings, Art The particular acronym which would be employed in any given situation would depend on how many levels are needed to identify particular items of interest so that they can be efficiently retrieved. For example, in some situations just two or three levels are sufficient because the number of items which are classified at that level of detail is sufficiently small such that a user can see on a single screen display all potential hits from which the desired item may be selected. In other situations, more levels may be needed where there are numerous items that satisfy a particular class code.

In these examples, the document would be a label affixed to the artwork or the desk. Such labels may also be affixed to a document or folder or box containing documents and/or folders. Additional data appearing on the label, referred to as "label lines," providing specific descriptions beyond the class itself. Label line descriptions are extensions of the class code and are searchable using well known automated search techniques. Labels are a part of the record when attached with the same retention value as the record which normally is then case when the label is associated with a particular folder. It should be noted that labels do not have a retention value when attached to an asset such as a desk.

IV: Finding Documents using the Uniform Subject Classification System

To illustrate this step, assume that it is desired to find job descriptions for an employee's new assignment as Budget Analyst, a newly created position.

To determine what may be available to aid in the creation of a new job description, enter the term "job description" in an inventory label search field to determine the location for all Job Descriptions. In this connection, the label search field is part of a query screen display, an example of which is shown in FIG. 1.

A typical response to the query provides the acronym of "HRJD", or "Human Resources, Job Descriptions" as shown in the screen display of FIG. 3.

Next, assuming that any job description for an Analyst would help in creating the new job description, a search on the word "Analyst" within the "HRJD" segment of the hierarchy displays "HRJDSA" for job descriptions related to a range of Systems Analysts positions as shown in the screen display of FIG. 4 and "HRJDMA" for job description of a Marketing Analyst also shown in the screen display of FIG. 4.

Next, search for job descriptions that are involved with the budgeting process to identify the terms used in describing the tasks and skills required:

Enter the word "budget" as shown in the screen display of FIG. 5.
With full security clearance, the system would return:
"FIBU" or Finance, Budgets.
as shown in the screen display of FIG. 6.

From the synonym table, the display would show the contents of the class table for the item located by the search as containing:
"HRD" or "Human Resources, Job Description"
as shown in the screen display of FIG. 4.

From the synonym table, a display would show the "folder" contents as containing a job description for "Manager, Budget Planning " as shown in the screen display of FIG. 7.

By inspection, the searcher would select the analyst job descriptions as well as the one for "Manager" that might help in preparing the new description.

V. Associate The Class Acronym With Retention Data

Once steps I–III have been performed, it is possible to generate a report for each classification with the information shown in Table I. The information in the Med Typ, Rec Typ, Start After, Off Ret and RC Ret columns is initialized for each new document added to the system based on the class code. That is, for each class code, this information is stored in a class table and is predetermined based on business and government regulations. The information in the RCopy CC4 column is obtained from a location table and is preset with a location code based on the workstation from which the data for the record was entered. By changed the data in the class table or location table, all documents associated with that class code or location would be changed as well. However, all of this information can be changed for individual documents, and once changed for a particular document, changes at the class table or location table level are not reflected in the records for such documents.

TABLE I

| Class No. | Class Acronym | Class Code Name | Med Typ | Rec Typ | Start After | Off Ret | RC Ret | RCopy CC# |
|---|---|---|---|---|---|---|---|---|
| 124 | AD | Administration | 0 | O | AR | 12 | 0 | |
| 125 | ADFU | Furnishings | 0 | O | CT | 12 | 24 | 993452 |
| 126 | ADFUDE | Desks | 0 | O | SU | 12 | 24 | 993452 |
| 127 | ADFUDEEX | Executive | 0 | O | SU | 12 | 36 | 993452 |

In Table I, each row corresponds to a file series.
The column labeled "No." contains a unique computer generated numbers used to represent each file series.
The column labeled "Class Acronym " contains the classification acronyms.
The column labeled "Class Code Name" contains the official terms to describe documents.

The column labeled "Med Typ" represents media type, i.e., paper, magnetic, microfiche, etc. Each media type in the example is represented by a number, for example, 0 for paper, 1 for magnetic, 2 for microfilm, 3 for microfiche, 4 for CD-ROM.

The column labeled "Rec Typ" represents record type, i.e., Vital (V), Informational (I), Official (O), Sensitive (S).

The column labeled Start After contains the date starting the retention, e.g., annual review (AR), completed (CT), superseded (SU), current year (CY) and final audit (FA). The retention start date marks the beginning of the "clock" as related to "upon the completion of the audit" when the record is superseded, or beginning when the contract has been completed, or when a license has expired. As a result, the creation date has little relevance to the legislative requirement for retention.

The column labeled "Off Ret" represents office retention in months.

The column labeled "RC Ret" represents records center retention in months.

The column labeled "RCopy CC#" represents record responsibility copy cost center number. This is the cost center number as identified in the Chart-of-Accounts for the organization. This cost center is the only cost center which can send documents in this file series to a long term storage facility (for archival). All other holders of copies of such documents (i.e., informational copies) would have been instructed to destroy such copies at the office level according to a predefined schedule for destruction of such documents, which as previously noted, would predate scheduled destruction of the official copy of the document. An expanded example of a retention schedule appears in Table II.

TABLE II

REPRESENTATIVE CLASSIFIED RETENTION SCHEDULE
WITH CITATIONS AND REFERENCES

| CLASS ACRONYM | CLASS CODE NAME | MED TYP | REC TYP | START AFTER | OFF RET | RC RET | TOT RET | R COPY CC# | REFERENCE |
|---|---|---|---|---|---|---|---|---|---|
| AC | ACCOUNTING | 1 | O | FA | 12 | 0 | 12 | 55000 | 26 CFR 1.6001.1 |
| ACAJ | ADJUSTMENTS | 1 | O | CY | 12 | 24 | 36 | 55260 | 26 CFR 1.6001.1 |
| ACAJIT | INVENTORY | 1 | O | CY | 12 | 36 | 48 | 55260 | ADMIN. DECISION |
| ACAJITCN | CONSOLIDATIONS | 1 | O | CY | 12 | 12 | 24 | 55260 | 26 CFR 1.6001.1 |
| ACAJITMN | MAINTENANCE | 1 | O | CY | 36 | 0 | 36 | 55260 | ADMIN. DECISION |
| ACAJITWH | WAREHOUSE | 1 | O | CT | 84 | 0 | 84 | 55260 | 26 CFR 1.6001.1 |
| ACAJRB | REIMBURSEMENTS | 1 | O | CY | 12 | 24 | 36 | 55800 | 26 CFR 1.6001.1 |
| ACAS | ASSETS | 1 | V | CY | 24 | 36 | 60 | 55300 | 26 CFR 1.6001.1 |
| ACASAM | AMORTIZATIONS | 1 | O | FA | 24 | 36 | 60 | 55330 | 26 CFR 1.6001.1 |
| ACASAP | APPROPRIATIONS | 1 | O | CT | 12 | 12 | 24 | 55330 | 26 CFR 1.6001.1 |
| ACASCA | CAPITAL ASSETS | 1 | V | FA | 24 | 216 | 240 | 55330 | 26 CFR 1.6001.1 |
| ACASCACC | COMPANY VEHICLES | 1 | O | CT | 120 | 0 | 120 | 55330 | 26 CFR 1.6001.1 |
| ACASDE | DEPRECIATING | 1 | O | FA | 12 | 24 | 36 | 55340 | 26 CFR 1.312-15 |
| ACASIT | INVENTORY | 3 | V | FA | 24 | 36 | 60 | 55440 | 26 CFR 1.6001.1 |
| ACASITSP | SPECIAL ACCOUNTS | 1 | O | FA | 12 | 12 | 24 | 55440 | 26 CFR 1.6001.1 |
| ACASITSU | SURPLUS | 1 | O | CT | 12 | 24 | 36 | 55440 | 26 CFR 1.6001.1 |
| ACASITWH | WAREHOUSE | 1 | O | FA | 12 | 72 | 84 | 55440 | 26 CFR 1.6001.1 |
| ACASITWHDI | DISBURSEMENTS | 1 | O | FA | 12 | 60 | 72 | 55440 | 26 CFR 1.6001.1 |
| ACASPR | APPRAISALS | 1 | O | SU | 24 | 216 | 240 | 55200 | 26 CFR 1.6001.1 |
| ACASVE | VEHICLES | 2 | O | CT | 24 | 36 | 60 | 55440 | 26 CFR 1.6001.1 |
| ACAU | AUDIT | 1 | O | FA | 24 | 36 | 60 | 56000 | 26 CFR 1.6001.1 |
| ACAUEX | EXTERNAL | 1 | O | FA | 24 | 36 | 60 | 56000 | 26 CFR 1.6001.1 |
| ACAUIN | INTERNAL | 1 | O | FA | 24 | 36 | 60 | 56100 | 26 CFR 1.6001.1 |
| ACAZ | AUTHORIZATIONS | 1 | O | CT | 24 | 48 | 72 | 55260 | ADMIN. DECISION |
| ACAZAV | TRAVEL | 2 | O | CT | 24 | 0 | 24 | 55290 | ADMIN. DECISION |
| ACAZAVDO | DOMESTIC | 2 | O | CT | 12 | 24 | 36 | 55290 | ADMIN. DECISION |
| ACAZAVIN | INTERNATIONAL | 2 | O | CT | 12 | 24 | 36 | 55290 | ADMIN. DECISION |
| ACBA | BANKING | 2 | O | CY | 24 | 12 | 36 | 55500 | ADMIN. DECISION |
| ACBACH | CHECKS | 1 | O | FA | 12 | 48 | 60 | 55500 | 26 CFR 1.6001.1 |
| ACBACHCO | CHECK COPIES | 1 | O | CT | 36 | 48 | 84 | 55500 | 26 CFR 1.6001.1 |
| ACBACHPC | PETTY CASH | 1 | O | CT | 36 | 48 | 84 | 55500 | 26 CFR 1.6001.1 |
| ACBACHPY | PAYROLL | 3 | O | CY | 12 | 48 | 60 | 55550 | 29 CFR 516.2,.5,.6 |
| ACBACHRE | REQUEST | 1 | O | CT | 2 | 0 | 2 | 55500 | ADMIN. DECISION |
| ACBACO | CASH OPERATIONS | 3 | O | CT | 12 | 60 | 72 | 55570 | 26 CFR 1.6001.1 |
| ACBADP | DEPOSIT SLIPS | 1 | O | CY | 12 | 60 | 72 | 55570 | 26 CFR 1.6001.1 |
| ACBADR | DRAFTS | 1 | O | CT | 12 | 0 | 12 | 55570 | 26 CFR 1.6001.1 |
| ACBALC | LETTERS OF CREDIT | 1 | V | CT | 12 | 60 | 72 | 55570 | 26 CFR 1.6001.1 |
| ACBARE | RECONCILIATIONS | 3 | O | FA | 18 | 24 | 42 | 55570 | 26 CFR 1.6001.1 |
| ACBARM | BANK REMITTANCE | 1 | O | CT | 36 | 0 | 36 | 55570 | 26 CFR 1.6001.1 |
| ACBARS | RESOLUTIONS | 1 | O | CT | 12 | 24 | 36 | 55500 | 26 CFR 1.6001.1 |
| ACBAST | STATEMENTS | 1 | O | FA | 12 | 84 | 96 | 55570 | 26 CFR 1.6001.1 |
| ACBASTDO | DOMESTIC | 1 | O | FA | 12 | 24 | 36 | 55570 | 26 CFR 1.6001.1 |
| ACBASTFO | FOREIGN | 1 | O | FA | 12 | 48 | 60 | 55570 | 31 CFR 103.32 |
| ACBI | BALANCE SHEETS/INCOME STATEMENT | 2 | O | FA | 24 | 456 | 480 | 77000 | 26 CFR 1.6001.1 |
| ACBIAN | ANALYSIS | 1 | O | FA | 24 | 456 | 480 | 77000 | 26 CFR 1.6001.1 |
| ACBIPL | PROFIT & LOSS | 1 | O | FA | 24 | 456 | 480 | 77000 | 26 CFR 1.6001.1 |
| ACCA | CAPITAL EXPENDITURES | 1 | V | FA | 12 | 24 | 36 | 55440 | 26 CFR 1.6001.1 |
| ACCARE | REQUESTS | 1 | O | CT | 24 | 446 | 470 | 55440 | ADMIN. DECISION |
| ACCAWP | WORKING PAPERS | 1 | O | CT | 24 | 446 | 470 | 55440 | ADMIN. DECISION |
| ACCH | CHART OF ACCOUNTS | 1 | O | CY | 12 | 987 | 999 | 55000 | ADMIN. DECISION |
| ACCO | COST ACCOUNTING | 1 | O | CY | 12 | 24 | 36 | 55700 | 26 CFR 1.6001.1 |

TABLE II-continued

REPRESENTATIVE CLASSIFIED RETENTION SCHEDULE
WITH CITATIONS AND REFERENCES

| CLASS ACRONYM | CLASS CODE NAME | MED TYP | REC TYP | START AFTER | OFF RET | RC RET | TOT RET | R COPY CC# | REFERENCE |
|---|---|---|---|---|---|---|---|---|---|
| ACCR | CREDIT | 1 | O | FA | 48 | 60 | 108 | 55800 | 26 CFR 1.6001.1 |
| ACCRAD | ADJUSTMENTS | 1 | O | FA | 12 | 48 | 60 | 55800 | 31 CFR 103.33 |
| ACCRAL | APPROVAL | 1 | O | CY | 12 | 48 | 60 | 55800 | ADMIN. DECISION |
| ACCRAP | APPLICATIONS | 1 | O | FA | 24 | 36 | 60 | 55800 | 31 CFR 103.33 |
| ACCRCO | COLLECTIONS | 1 | O | CT | 24 | 24 | 48 | 55800 | 29 CFR 516.2 |
| ACCRCODO | DOUBTFUL ACCOUNTS | 1 | O | CT | 12 | 108 | 120 | 55800 | 26 CFR 1.6001.1 |
| ACCRDO | DEPOSITS | 1 | O | CY | 24 | 0 | 24 | 55800 | ADMIN.DECISION |
| ACCRMM | MEMOS | 1 | O | CY | 12 | 36 | 48 | 55800 | 26 CFR 1.6001.1 |
| ACCRRT | REMITTANCES | 1 | O | CY | 24 | 48 | 72 | 55800 | 26 CFR 1.6001.1 |
| ACIN | INVOICES | 1 | O | CY | 24 | 48 | 72 | 55100 | ADMIN. DECISION |
| ACINEX | EXPORT | 1 | V | CY | 24 | 48 | 72 | 55100 | ADMIN. DECISION |
| ACIV | INVESTMENT CREDITS | 1 | V | CY | 12 | 24 | 36 | 77000 | 26 CFR 1.46.1 & 1.6001.1 |
| ACJV | JOURNAL VOUCHERS | 1 | V | FA | 24 | 216 | 240 | 55440 | 26 CFR 1.6001.1 |
| ACLE | LEDGERS | 1 | V | FA | 12 | 987 | 999 | 55440 | 26 CFR 1.6001.1 |
| ACLEAS | CAPITAL ASSETS | 3 | V | FA | 12 | 48 | 60 | 55440 | 26 CFR 1.6001.1; 1.312-15 |
| ACLEBA | BANK | 3 | V | FA | 24 | 96 | 120 | 55440 | 26 CFR 1.6001.1 |
| ACLEBO | BOND | 3 | V | FA | 24 | 96 | 120 | 55440 | 26 CFR 1.6001.1 |
| ACLECA | CASH | 3 | O | FA | 12 | 48 | 60 | 55440 | 26 CFR 1.6001.1 |
| ACLECC | COST & CONTROL | 3 | O | CY | 12 | 36 | 48 | 55440 | 26 CFR 1.6001.1 |
| ACLECH | CHECK REGISTER | 3 | O | FA | 12 | 60 | 72 | 55440 | 26 CFR 1.6001.1 |
| ACLECM | CREDIT MEMOS | 3 | O | FA | 12 | 24 | 36 | 55440 | 26 CFR 1.6001.1 |
| ACLECU | CREDIT UNION | 3 | V | FA | 12 | 60 | 72 | 55440 | 26 CFR 1.6001.1 |
| ACLEDI | DIVIDEND | 3 | V | CT | 24 | 96 | 120 | 55440 | 26 CFR 1.56-2 |
| ACLEDR | DRAFTS | 3 | O | FA | 12 | 48 | 60 | 55440 | 26 CFR 1.6001.1 |
| ACLEEX | EXPENSE | 3 | O | CT | 12 | 36 | 48 | 55440 | 26 CFR 1.6001.1 |
| ACLEGL | GENERAL LEDGER | 3 | V | CY | 12 | 987 | 999 | 55440 | 26 CFR 1.6001.1 CCCP 3001 |
| ACLEIN | INVOICES | 3 | V | FA | 12 | 48 | 60 | 55440 | 26 CFR 1.6001.1 |
| ACLEIS | INSURANCE | 3 | V | CT | 12 | 72 | 84 | 55440 | ADMIN. DECISION |
| ACLEIV | INVENTORY | 3 | V | FA | 24 | 216 | 240 | 55440 | 26 CFR 1.6001.1 |
| ACLENO | NOTE REGISTER | 3 | V | CT | 24 | 12 | 36 | 55440 | ADMIN. DECISION |
| ACLEPA | PAYABLE | 3 | O | CY | 12 | 987 | 999 | 55440 | 26 CFR 1.6001.1 |
| ACLEPB | PAYROLL | 3 | V | CT | 12 | 24 | 36 | 55550 | 29 CFR 516.2,.5,.6 |
| ACLEPE | PERSONNEL | 3 | O | CT | 24 | 96 | 120 | 55440 | 29 CFR 1627.3 |
| ACLEPR | PROPERTY ACCOUNTS | 3 | V | FA | 24 | 216 | 240 | 55440 | 26 CFR 1.6001.1 |
| ACLEPU | PURCHASING | 3 | O | FA | 12 | 24 | 36 | 55440 | 26 CFR 1.6001.1 |
| ACLERE | RECEIVABLE | 3 | V | CT | 84 | 0 | 84 | 55440 | ADMIN. DECISION |
| ACLESA | SALES | 3 | V | CT | 12 | 24 | 36 | 55440 | ADMIN. DECISION |
| ACLESE | SECURITIES | 3 | V | FA | 24 | 96 | 120 | 77000 | 26 CFR 1.6001.1 |
| ACLEST | CAPITAL STOCK | 3 | V | FA | 24 | 96 | 120 | 10000 | 26 CFR 1.57-5 |
| ACLESU | SUBSIDIARY | 3 | V | CT | 12 | 24 | 36 | 55440 | 26 CFR 1.6001.1 |
| ACPA | PAYABLES | 3 | O | CY | 12 | 24 | 36 | 55100 | 26 CFR 1.6001.1 |
| ACPAEM | EMPLOYEE EXPENSES | 3 | O | FA | 12 | 24 | 36 | 55100 | 26 CFR 1.274-5 |
| ACPAEMCC | CREDIT CARDS | 3 | O | CY | 12 | 48 | 60 | 55100 | 26 CFR 1.274-5 |
| ACPAFR | FREIGHT | 3 | O | FA | 12 | 24 | 36 | 55150 | 26 CFR 1.6001.1 |
| ACPAIN | INVOICES | 3 | O | FA | 24 | 48 | 72 | 55150 | 26 CFR 1.6001.1 |
| ACPALE | LEASING | 1 | O | FA | 12 | 24 | 36 | 55100 | 26 CFR 1.6001.1 |
| ACPALEVE | VEHICLES | 1 | O | FA | 24 | 36 | 60 | 55100 | 26 CFR 1.6001.1 |
| ACPALEVEQU | QUESTIONNAIRES | 1 | O | FA | 24 | 36 | 60 | 55100 | 26 CFR 1.6001.1 |
| ACPANO | NOTES, PAYABLE | 1 | O | CT | 24 | 12 | 36 | 55100 | 26 CFR 1.6001.1 |
| ACPAPP | PREPAID EXPENSES | 1 | O | CT | 12 | 0 | 12 | 55100 | ADMIN. DECISION |
| ACPATC | TELEPHONE BILLS | 1 | O | CY | 12 | 24 | 36 | 55100 | 26 CFR 1.6001.1 |
| ACPAVE | VENDORS | 1 | O | CY | 12 | 24 | 36 | 55100 | 26 CFR 1.6001.1 |
| ACPAVO | VOUCHERS | 1 | O | CY | 12 | 60 | 72 | 55100 | 26 CFR 16001.1 |
| ACPB | PAYROLL | 3 | O | FA | 18 | 18 | 36 | 55300 | 29 CFR 516.2 |
| ACPBDE | DEDUCTIONS | 3 | O | CT | 12 | 36 | 48 | 55300 | 26 CFR 31.6001.1 |
| ACPBTI | TIME SHEETS | 1 | O | CT | 12 | 60 | 72 | 55300 | 29 CFR 516.2,.5,.6 |
| ACPBWX | W-2'S &ALL GOVNMT PAYROLL RP | 1 | O | FA | 12 | 24 | 36 | 55300 | 29 CFR 516.2 |
| ACRC | RECONCILIATIONS | 3 | O | FA | 12 | 24 | 36 | 55800 | 26 CFR 1.6001.1 |
| ACRE | RECEIVABLES | 3 | V | CT | 12 | 24 | 36 | 55900 | 26 CFR 1.6001.1 |
| ACREAJ | ADJUSTMENTS | 3 | O | CT | 12 | 108 | 120 | 55900 | ADMIN. DECISION |
| ACREBI | BILLING | 3 | V | CT | 12 | 108 | 120 | 55900 | 29 CFR 516.2 |
| ACRT | REMITTANCES | 3 | O | CY | 24 | 48 | 72 | 55910 | ADMIN. DECISION |
| ACTA | TAX | 1 | O | FA | 12 | 48 | 60 | 55920 | 26 CFR 1.6001.1 |
| ACTACO | CORPORATE | 1 | V | CY | 12 | 24 | 36 | 55920 | 26 CFR 1.6001.1 |
| ACTAFE | FEDERAL | 1 | V | FA | 12 | 24 | 36 | 55920 | 26 CFR 1.6001.1 |
| ACTAFO | FOREIGN | 1 | V | FA | 24 | 96 | 120 | 55930 | 29 CFR 516.2 |
| ACTALO | LOCAL | 1 | V | FA | 12 | 24 | 36 | 55920 | 26 CFR 1.6001.1 |
| ACTAPB | PAYROLL | 1 | V | FA | 12 | 24 | 36 | 55950 | 26 CFR 1.6001.1 |
| ACTAPR | PROPERTY | 1 | V | FA | 12 | 24 | 36 | 55940 | 26 CFR 1.6001.1 |
| ACTASA | SALES | 1 | V | FA | 12 | 24 | 36 | 55960 | 26 CFR 1.6001.1 |

TABLE II-continued

REPRESENTATIVE CLASSIFIED RETENTION SCHEDULE
WITH CITATIONS AND REFERENCES

| CLASS ACRONYM | CLASS CODE NAME | MED TYP | REC TYP | START AFTER | OFF RET | RC RET | TOT RET | R COPY CC# | REFERENCE |
|---|---|---|---|---|---|---|---|---|---|
| ACTAST | STATE | 1 | V | FA | 12 | 24 | 36 | 55920 | 26 CFR 1.6001.1 |
| ACTAUN | UNEMPLOYMENT | 1 | O | FA | 12 | 60 | 72 | 55945 | 26 CFR 31.6001.1 |
| AD | ADMINISTRATION | 1 | O | AR | 12 | 0 | 12 | 20000 | ADMIN. DECISION |
| ADAG | AGENDAS/SCHEDULES | 1 | O | CT | 12 | 36 | 48 | 21000 | ADMIN. DECISION |
| ADAS | ASSOCIATIONS/ORGANIZATIONS | 1 | O | CT | 12 | 0 | 12 | 21000 | ADMIN. DECISION |
| ADBU | BULLETINS/PUBLICATIONS | 1 | O | CT | 12 | 24 | 36 | 21100 | ADMIN. DECISION |
| ADBUDM | DEVELOPMENT MATERIAL | 1 | O | CY | 12 | 6 | 18 | 21100 | ADMIN. DECISION |
| ADBUFR | FREIGHT BROCHURES | 1 | O | SU | 12 | 24 | 36 | 21100 | ADMIN. DECISION |
| ADBUPD | PRODUCTION | 3 | O | CT | 12 | 48 | 60 | 21000 | ADMIN. DECISION |
| ADCH | CHRONOLOGICAL FILES | 1 | O | CT | 36 | 0 | 36 | 22000 | ADMIN. DECISION |
| ADCO | COMMITTEES/MEETINGS | 1 | O | CT | 12 | 48 | 60 | 21000 | ADMIN. DECISION |
| ADCQ | COMMUNICATIONS | 1 | O | CY | 12 | 0 | 12 | 25000 | ADMIN. DECISION |
| ADCR | CONSULTANT IFORMATION | 3 | O | CT | 12 | 0 | 12 | 21000 | ADMIN. DECISION |
| ADCU | CORRESPONDENCE | 1 | O | CY | 12 | 24 | 36 | 22000 | ADMIN. DECISION |
| ADCUID | INTERDEPARTMENT | 1 | O | CT | 24 | 0 | 24 | 22000 | ADMIN. DECISION |
| ADCUIN | INSURANCE | 1 | V | CT | 120 | 0 | 120 | 22000 | ADMIN. DECISION |
| ADCUMK | MARKETING | 1 | O | CT | 24 | 0 | 24 | 22000 | ADMIN. DECISION |
| ADDP | EDP-INFORMATION SYSTEMS | 3 | O | CT | 12 | 24 | 36 | 24000 | ADMIN. DECISION |
| ADDPLY | TAPE LIBRARY | 3 | O | CY | 12 | 24 | 36 | 24100 | ADMIN. DECISION |
| ADES | EMPLOYEE SUGGESTIONS | 1 | O | CT | 24 | 48 | 72 | 20000 | ADMIN. DECISION |
| ADIN | INSURANCE | 3 | O | CT | 12 | 24 | 36 | 26000 | ADMIN. DECISION |
| ADINCL | CLAIMS | 3 | O | CY | 12 | 72 | 84 | 26000 | ADMIN. DECISION |
| ADINCV | COMPANY VEHICLES | 3 | O | CT | 12 | 24 | 36 | 26100 | ADMIN. DECISION |
| ADISPO | PRINTOUT | 1 | O | CT | 12 | 0 | 12 | 26100 | ADMIN. DECISION |
| ADLS | LEASING | 3 | V | CT | 12 | 24 | 36 | 26400 | ADMIN. DECISION |
| ADLSOF | OFFICE EQUIPMENT | 3 | O | CT | 24 | 36 | 60 | 26400 | ADMIN. DECISION |
| ADLY | LIBRARY | 1 | O | CT | 12 | 12 | 24 | 22000 | ADMIN. DECISION |
| ADOA | OFFICE AUTOMATION | 3 | O | CT | 12 | 24 | 36 | 24000 | ADMIN. DECISION |
| ADOF | OFFICE EQUIPMENT | 3 | O | CT | 12 | 24 | 36 | 22100 | ADMIN. DECISION |
| ADOR | ORGANIZATION CHARTS | 1 | V | SU | 12 | 228 | 240 | 22000 | ADMIN. DECISION |
| ADPC | PROCEDURES | 3 | V | SU | 24 | 216 | 240 | 22700 | ADMIN. DECISION |
| ADPL | PLANNING | 1 | O | SU | 12 | 24 | 36 | 22700 | ADMIN. DECISION |
| ADPO | POLICIES | 1 | O | SU | 12 | 228 | 240 | 22700 | ADMIN. DECISION |
| ADPR | PROJECTS | 3 | O | CT | 24 | 36 | 60 | 22000 | ADMIN. DECISION |
| ADPS | PRESENTATION MATERIAL | 1 | O | CT | 24 | 36 | 60 | 22000 | ADMIN. DECISION |
| ADPU | PURCHASING | 3 | O | CT | 24 | 60 | 84 | 22800 | ADMIN. DECISION |
| ADPUDS | DISTRIBUTION | 3 | O | CY | 12 | 24 | 36 | 22800 | ADMIN. DECISION |
| ADRE | RECORDS MANAGEMENT | 1 | O | CT | 12 | 24 | 36 | 22900 | ADMIN. DECISION |
| ADRERQ | REQUESTS | 1 | O | CY | 12 | 12 | 24 | 22900 | ADMIN. DECISION |
| ADRERS | RETENTION SCHEDULE | 1 | O | CT | 36 | 963 | 999 | 22900 | ADMIN. DECISION |
| ADRERV | VITAL RECORDS | 1 | O | CT | 0 | 999 | 999 | 22900 | ADMIN. DECISION |
| ADRG | REPROGRAPHICS | 1 | O | CT | 12 | 24 | 36 | 22800 | ADMIN. DECISION |
| ADSH | SHIPPING | 3 | O | FA | 12 | 24 | 36 | 23000 | 26 CFR 1.6001.1 |
| ADSHBL | BILLS OF LADING | 1 | O | CT | 84 | 0 | 84 | 23000 | 26 CFR 1.6001.1 |
| ADSU | SUPPLIES | 3 | O | CY | 12 | 0 | 12 | 22800 | ADMIN. DECISION |
| ADTR | TRAVEL INFORMATION | 3 | O | CY | 12 | 24 | 36 | 20200 | ADMIN. DECISION |
| CO | CORPORATE | 1 | V | CY | 12 | 987 | 999 | 10000 | ADMIN. DECISION |
| COAC | ACQUISITIONS | 1 | V | CT | 24 | 216 | 240 | 12000 | 26 CFR 1.6001.1 |
| COAU | AUDITS | 1 | V | FA | 12 | 24 | 36 | 15000 | 26 CFR 1.6001.1 |
| COBD | BONDS | 1 | V | CT | 24 | 96 | 120 | 12000 | ADMIN. DECISION |
| COBO | BOARD OF DIRECTORS | 3 | V | CY | 24 | 975 | 999 | 10100 | CCCP 1500 |
| COBOCM | COMMITTEES | 3 | O | CT | 24 | 975 | 999 | 10100 | CCCPCH 15 SEC1500+ |
| COBOCO | COMPENSATION | 3 | O | AR | 24 | 48 | 72 | 10100 | CCCPCH 15 SEC 1500+ |
| COBOME | MEETINGS/MINUTES | 1 | O | CT | 24 | 975 | 999 | 10100 | CCCPCH 15 SEC 1500+ |
| COBY | BY-LAWS | 1 | V | SU | 24 | 0 | 24 | 10100 | CCCPCH 15 SEC 1500+ |
| COCH | CHARTER | 1 | V | SU | 24 | 0 | 24 | 10100 | CCCPCH 15 SEC 1500+ |
| COCT | CONTRIBUTIONS | 3 | O | CT | 12 | 24 | 36 | 13000 | 26 CFR 1.70A-13 |
| COCTMCH | MEETINGS/MINUTES | 1 | O | CT | 24 | 975 | 999 | 13000 | CCCP CH 15 SEC 1500 |
| CODB | DOING BUSINESS AS | 1 | O | CT | 999 | 999 | 1998 | 10000 | ADMIN. DECISION |
| COER | ELECTION RECORDS | 3 | O | FA | 24 | 216 | 240 | 10100 | CCCPCH 15 SEC 1500+ |
| COHI | HISTORY | 1 | O | CY | 12 | 24 | 36 | 10000 | ADMIN. DECISION |
| COIN | ARTICLES OF INCORPORATION | 1 | V | CT | 120 | 0 | 120 | 10000 | CCCPCH 15 SEC 1500+ |
| COME | MERGERS | 3 | V | CT | 24 | 216 | 240 | 12000 | CCCP 1109 |
| COSE | SEALS | 1 | V | CT | 120 | 0 | 120 | 10000 | ADMIN. DECISION |
| COSH | SHAREHOLDERS | 3 | V | SU | 24 | 975 | 999 | 16000 | CCCPCH 15 SEC |

TABLE II-continued

REPRESENTATIVE CLASSIFIED RETENTION SCHEDULE WITH CITATIONS AND REFERENCES

| CLASS ACRONYM | CLASS CODE NAME | MED TYP | REC TYP | START AFTER | OFF RET | RC RET | TOT RET | R COPY CC# | REFERENCE |
|---|---|---|---|---|---|---|---|---|---|
| COSHME | MEETINGS | 1 | V | CT | 24 | 975 | 999 | 16000 | 1500+<br>CCCP.Sec 15:1500+ |
| COSHNO | NOTES | 1 | V | CT | 24 | 96 | 120 | 16000 | ADMIN. DECISION |
| COSHPR | PROXIES | 1 | O | CT | 24 | 96 | 120 | 16000 | CCCP Sec 3 |
| COST | STOCK | 1 | O | CT | 24 | 975 | 999 | 16100 | 26 CFR 1.57-5 |
| COSTDI | DIVIDENDS | 3 | O | CT | 24 | 96 | 120 | 16100 | 26 CFR 1.6001.1 |
| COSTSB | SUBSCRIBERS | 3 | O | AR | 24 | 12 | 36 | 16100 | ADMIN. DECISION |
| COSTSU | SUBSCRIPTIONS | 1 | O | AR | 24 | 96 | 120 | 16100 | ADMIN. DECISION |
| EN | ENGINEERING | 1 | O | CT | 12 | 24 | 36 | 90000 | ADMIN. DECISION |
| ENBP | BLUEPRINTS | 1 | O | CT | 24 | 96 | 120 | 91000 | ADMIN. DECISION |
| ENDA | DATA BOOKS | 1 | O | CT | 24 | 96 | 120 | 91000 | ADMIN. DECISION |
| ENDE | DESIGNS | 1 | O | CY | 12 | 987 | 999 | 91000 | ADMIN. DECISION |
| ENDR | DRAWINGS | 3 | O | CT | 12 | 987 | 999 | 91000 | ADMIN. DECISION |
| ENFO | FORMULAS, TECHNICAL | 3 | V | CT | 24 | 96 | 120 | 91100 | ADMIN. DECISION |
| ENIE | INDUSTRIAL ENGINEERING | 1 | O | AR | 24 | 0 | 24 | 91300 | ADMIN. DECISION |
| ENIEME | METHODS IMPROVEMENTS | 1 | O | CT | 24 | 0 | 24 | 91300 | ADMIN. DECISION |
| ENMA | MAPS | 1 | O | CT | 24 | 216 | 240 | 91000 | ADMIN. DECISION |
| ENPR | PROJECTS | 3 | O | CT | 24 | 216 | 240 | 95000 | ADMIN. DECISION |
| ENSC | SPECIFICATIONS | 3 | O | CT | 12 | 987 | 999 | 91100 | ADMIN. DECISION |
| ENST | STANDARDS | 1 | V | CT | 12 | 987 | 999 | 91300 | ADMIN. DECISION |
| ENTS | TESTING | 3 | O | CT | 12 | 0 | 12 | 96000 | ADMIN. DECISION |
| FI | FINANCE | 1 | O | FA | 12 | 24 | 36 | 70000 | 26 CFR 1.6001.1 |
| FIAN | ANALYSIS/STUDIES | 1 | O | CY | 24 | 12 | 36 | 71000 | ADMIN. DECISION |
| FIBU | BUDGETS | 1 | O | CT | 12 | 24 | 36 | 72000 | ADMIN. DECISION |
| FIBUAZ | AUTHORIZATIONS | 1 | O | CT | 24 | 12 | 36 | 72000 | ADMIN. DECISION |
| FIBUES | ESTIMATES | 1 | O | CT | 12 | 72 | 84 | 72000 | ADMIN. DECISION |
| FIBUPE | PERFORMANCE ANALYSIS | 1 | O | CT | 12 | 24 | 36 | 72000 | ADMIN. DECISION |
| FIBUPL | PLANNING | 1 | O | SU | 12 | 24 | 36 | 72000 | ADMIN. DECISION |
| FIBURD | RESEARCH & DEVELOPMENT | 1 | O | CT | 24 | 12 | 36 | 72000 | ADMIN. DECISION |
| FICA | CAPITAL PLAN | 1 | V | FA | 12 | 24 | 36 | 72500 | 26 CFR 1.6001.1 |
| FICAEX | EXPENDITURES | 3 | O | FA | 24 | 12 | 36 | 72500 | 26 CFR 1.6O01.1 |
| FIEC | ECONOMIC ANALYSIS | 1 | O | SU | 24 | 96 | 120 | 72200 | ADMIN. DECISION |
| FIFI | FINANCIAL REPORTS | 1 | V | CT | 12 | 24 | 36 | 72200 | ADMIN. DECISION |
| HR | HUMAN RESOURCES | 1 | O | AR | 12 | 0 | 12 | 30000 | ADMIN. DECISION |
| HRAF | AFFIRMATIVE ACTION | 1 | O | CY | 12 | 24 | 36 | 31000 | 41 CFR 60-741.5,.52. |
| HRBE | BENEFITS | 3 | V | CT | 12 | 48 | 60 | 32000 | 26 CFR 1.414 (F)-1 |
| HRBEBP | BONUS PLAN | 3 | O | CT | 12 | 96 | 108 | 32000 | ADMIN. DECISION |
| HRBEIN | INSURANCE | 1 | O | CT | 12 | 24 | 36 | 32100 | ADMIN. DECISION |
| HRBEINAU | AUTHORIZATIONS | 1 | O | CT | 12 | 72 | 84 | 32100 | 26 CFR 1.6001.1 |
| HRBEINCC | COMPANY VEHICLES | 1 | O | CT | 0 | 0 | 0 | 32200 | 26 CFR 1.6001.1 |
| HRBEINCL | CLAIMS | 1 | O | CT | 12 | 146 | 158 | 32100 | 26 CFR 1.6001.1 |
| HRBEINDE | DENTAL | 1 | O | CT | 12 | 60 | 72 | 32100 | 26 CFR 1.6001.1 |
| HRBEINDI | DISABILITY | 1 | O | CT | 12 | 60 | 72 | 32100 | 26 CFR 1.6001.1 |
| HRBEINLI | LIFE | 1 | O | CT | 12 | 48 | 60 | 32110 | 29 USC 626 |
| HRBEINME | MEDICAL | 1 | O | CT | 12 | 72 | 84 | 32110 | 26 CFR 1.6001.1 |
| HRBEINPL | PLAN | 1 | O | SU | 12 | 48 | 60 | 32110 | 29 USC 626 |
| HRBEINUN | UNEMPLOYMENT | 1 | O | CT | 12 | 24 | 36 | 33000 | CA C.P.S.1232; 26 CFR 31.6001.1 |
| HRBEINWC | CA WORKERS' COMPENSATION A | 1 | O | CT | 12 | 108 | 120 | 33000 | WORKERS' COMPENSATION |
| HRBEIV | INVESTMENTS/SAVINGS | 1 | O | CT | 12 | 24 | 36 | 32000 | 26 CFR 1.6001.1 |
| HRBELO | EMPLOYEE LOANS | 1 | O | CT | 24 | 48 | 72 | 32000 | 26 CFR 1.6001.1 |
| HRBEMI | MANAGEMENT INCENTIVE PLAN | 1 | O | CT | 12 | 96 | 108 | 34000 | ADMIN. DECISION |
| HRBEPE | PENSION PLAN | 1 | V | CY | 12 | 48 | 60 | 34000 | 29 USC 626; 26 CFR 1.6001.1 |
| HRBEPU | EMPLOYEE PURCHASE | 3 | O | CY | 12 | 48 | 60 | 34000 | ADMIN. DECISION |
| HRBERE | RETIREMENT PLAN | 1 | V | CY | 12 | 84 | 96 | 34000 | 29 CFR 2610.11; 26 CFR 1.6001.1 |
| HRBESB | SAVINGS BOND | 3 | O | CT | 24 | 48 | 72 | 34000 | ADMIN. DECISION |
| HRBEST | STOCK OPTION PLAN | 1 | V | SU | 24 | 48 | 72 | 34000 | 26 CFR 1.6001-1 |
| HRBEVA | VACATIONS | 3 | O | CY | 12 | 24 | 36 | 34000 | ADMIN. DECISION |
| HRED | EDUCATION/TRAINING | 3 | O | CY | 12 | 24 | 36 | 35000 | ADMIN. DECISION |
| HREE | EEO | 1 | O | CY | 12 | 987 | 999 | 31000 | 29 CFR 1607.4; 29 CFR 516.5 |
| HREM | EMPLOYEES | 3 | O | CT | 12 | 24 | 36 | 35000 | 29 CFR 1627.3 |
| HREMAC | ACTIVE | 3 | O | CT | 12 | 987 | 999 | 35000 | 29 CFR 1627.3 |
| HREMAP | APPLICATIONS | 1 | O | CY | 12 | 24 | 36 | 35000 | 29 CFR 1627.3 |
| HREMAPRE | RESUMES | 1 | O | CT | 60 | 0 | 60 | 35000 | ADMIN. DECISION |
| HREMET | EMPLOYMENT | 3 | O | CT | 12 | 24 | 36 | 35000 | 29 CFR 1627.3 & 516.2 |
| HREMHI | HISTORY | 3 | O | CT | 12 | 36 | 48 | 35000 | 29 CFR 1627.3 |
| HREMMS | MILITARYSERVICE | 3 | O | CT | 24 | 12 | 36 | 35000 | 26 CFR 1.6001.1 |
| HREMPA | PERFORMANCE APPRAISAL | 1 | O | CY | 12 | 12 | 24 | 35000 | ADMIN. DECISION |

TABLE II-continued

REPRESENTATIVE CLASSIFIED RETENTION SCHEDULE
WITH CITATIONS AND REFERENCES

| CLASS ACRONYM | CLASS CODE NAME | MED TYP | REC TYP | START AFTER | OFF RET | RC RET | TOT RET | R COPY CC# | REFERENCE |
|---|---|---|---|---|---|---|---|---|---|
| HREMRE | RETIRED | 3 | O | CT | 12 | 987 | 999 | 35100 | 29 CFR 516.2 |
| HREMRL | RELOCATIONS | 3 | O | CT | 12 | 146 | 158 | 35200 | 29 CFR 1627.3 |
| HREMSF | STAFF TRANSFERS | 3 | O | CY | 12 | 24 | 36 | 35200 | 26 CFR 1.6001.1 |
| HREMTE | TERMINATED | 3 | O | CT | 12 | 24 | 36 | 35000 | 29 CFR 516.2 |
| HREMWS | WAGE/SALARY | 3 | O | CY | 12 | 12 | 24 | 35000 | ADMIN. DECISION |
| HREP | EMPLOYEE RELATIONS | 1 | O | CY | 0 | 36 | 36 | 36000 | ADMIN. DECISION |
| HREPCS | CAREER SERVICING | 1 | O | CT | 12 | 36 | 48 | 36000 | ADMIN. DECISION |
| HREPJE | JOB EVALUATION | 1 | O | CY | 12 | 96 | 108 | 36000 | 26 CFR 1.6001.1 |
| HREPSU | SURVEYS | 1 | O | CY | 12 | 12 | 24 | 36000 | ADMIN. DECISION |
| HRJD | JOB DESCRIPTION | 1 | O | CY | 12 | 24 | 36 | 35300 | ADMIN. DECISION |
| LE | LEGAL | 1 | O | CY | 12 | 0 | 12 | 10500 | ADMIN. DECISION |
| LEAF | AFFIDAVITS | 1 | O | CT | 24 | 116 | 140 | 10500 | ADMIN. DECISION |
| LECA | CASE RECORDS | 3 | O | CT | 24 | 96 | 120 | 10500 | ADMIN. DECISION |
| LECAAB | ARBITRATION, STATE | 3 | O | CY | 12 | 24 | 36 | 10500 | ADMIN. DECISION |
| LECM | COMPLIANCE | 1 | O | CT | 36 | 0 | 36 | 10510 | ADMIN. DECISION |
| LECMIG | INVESTIGATIONS | 1 | O | CT | 36 | 0 | 36 | 10510 | ADMIN. DECISION |
| LECMRE | REGULATIONS | 1 | O | CT | 60 | 0 | 60 | 10510 | ADMIN. DECISION |
| LECMRK | RIGHT-TO-KNOW | 1 | O | CT | 12 | 0 | 12 | 10510 | ADMIN. DECISION |
| LECO | CONTRACTS/AGREEMENTS | 1 | V | CT | 12 | 48 | 60 | 10600 | ADMIN. DECISION |
| LECOBS | BILLS OF SALE | 1 | O | CT | 12 | 24 | 36 | 10600 | 26 CFR 1.6001.1 |
| LECOLA | LABOR | 1 | O | CT | 12 | 987 | 999 | 10600 | 26 CFR 1.6001.1 |
| LECOPA | PROMOTIONAL AGREEMENTS | 1 | O | CY | 12 | 12 | 24 | 10600 | 26 CFR 1.6001.1 |
| LECOSA | SALE OF PRODUCTS | 1 | O | CT | 12 | 36 | 48 | 10600 | 26 CFR 1.6001.1 |
| LECU | U.S. CUSTOMS | 1 | O | CY | 12 | 24 | 36 | 10600 | ADMIN. DECISION |
| LEDE | DEEDS/ABSTRACTS/TITLES | 1 | V | CT | 240 | 0 | 240 | 10600 | ADMIN. DECISION |
| LEEA | EASEMENTS/RIGHTS OF WAY | 1 | V | CT | 240 | 0 | 240 | 10600 | ADMIN. DECISION |
| LEEX | EXPORT REGULATIONS | 1 | O | SU | 12 | 12 | 24 | 10600 | ADMIN. DECISION |
| LEFD | FOOD AND DRUG ADMINISTRATION | 1 | O | CY | 240 | 0 | 240 | 10510 | ADMIN. DECISION |
| LELE | LEASES | 1 | V | CT | 24 | 216 | 240 | 10600 | 26 CFR 1.6001.1 |
| LELI | LITIGATION | 1 | O | CT | 12 | 12 | 24 | 10700 | ADMIN. DECISION |
| LELIAP | OPSAAC | 1 | O | CT | 24 | 12 | 36 | 10700 | ADMIN. DECISION |
| LEMO | MORTGAGES | 1 | V | CT | 12 | 24 | 36 | 10600 | ADMIN. DECISION |
| LENO | NOTARIES | 1 | O | CT | 12 | 0 | 12 | 10500 | ADMIN. DECISION |
| LEOC | OUTSIDE COUNSEL | 1 | O | CY | 12 | 24 | 36 | 10500 | ADMIN. DECISION |
| LEPA | PATENTS/TRADEMARKS | 1 | O | CT | 12 | 987 | 999 | 10510 | ADMIN. DECISION |
| LEPE | PERMITS | 1 | O | CT | 24 | 219 | 243 | 10600 | ADMIN. DECISION |
| LEPL | PRODUCT LIABILITY CLAIMS | 1 | O | CT | 12 | 60 | 72 | 10700 | ADMIN. DECISION |
| LETS | TRADE SECRETS | 1 | V | CT | 240 | 0 | 240 | 10510 | ADMIN. DECISION |
| LEWA | WARRANTIES | 1 | O | CY | 12 | 48 | 60 | 10510 | ADMIN. DECISION |
| MF | MANUFACTURING | 1 | O | AR | 24 | 0 | 24 | 40000 | ADMIN. DECISION |
| MFAR | DRAWINGS | 1 | O | CT | 12 | 60 | 72 | 41000 | ADMIN. DECISION |
| MFJR | JOB RECORDS | 1 | O | CT | 24 | 36 | 60 | 41000 | ADMIN. DECISION |
| MFPC | PRODUCTION CONTROL | 3 | O | CT | 12 | 24 | 36 | 41000 | ADMIN. DECISION |
| MFPCPS | PLANNING/SCHEDULING | 3 | O | CT | 24 | 0 | 24 | 41000 | ADMIN. DECISION |
| MFPCWO | WORK ORDERS | 3 | O | CT | 24 | 24 | 48 | 41000 | ADMIN. DECISION |
| MFRM | RAW MATERIALS | 3 | O | CY | 12 | 36 | 48 | 42000 | ADMIN. DECISION |
| MFSH | SHIPPING | 3 | O | AR | 24 | 12 | 36 | 43000 | 26 CFR 1.6001.1 |
| MFSHCL | CLAIMS | 1 | O | CT | 12 | 48 | 60 | 43000 | ADMIN. DECISION |
| MFSHTA | TARIFFS | 3 | O | SU | 12 | 36 | 48 | 10600 | ADMIN. DECISION |
| MK | MARKETING | 1 | O | CY | 12 | 24 | 36 | 80000 | ADMIN. DECISION |
| MKAD | ADVERTISING | 1 | O | CY | 12 | 24 | 36 | 81000 | ADMIN. DECISION |
| MKBD | BUSINESS DEVELOPMENT | 1 | O | CY | 12 | 24 | 36 | 81100 | ADMIN. DECISION |
| MKBDPT | PRODUCT TESTING | 1 | O | CT | 24 | 0 | 24 | 81100 | ADMIN. DECISION |
| MKCO | COMPETITION | 3 | O | CY | 24 | 0 | 24 | 81100 | ADMIN. DECISION |
| MKCR | CONSUMER RELATIONS | 1 | O | CY | 12 | 24 | 36 | 81200 | ADMIN. DECISION |
| MKGR | GRAPHICS | 3 | O | AR | 12 | 24 | 36 | 82000 | ADMIN. DECISION |
| MKMR | MARKET RESEARCH | 3 | O | CY | 12 | 24 | 36 | 83000 | ADMIN. DECISION |
| MKMRDV | DEVELOPMENT | 3 | O | CY | 12 | 6 | 18 | 83000 | ADMIN. DECISION |
| MKMRSU | SURVEYS | 3 | O | CY | 12 | 6 | 18 | 83000 | ADMIN. DECISION |
| MKPD | PRODUCT DEVELOPMENT | 1 | O | CY | 12 | 24 | 36 | 84000 | ADMIN. DECISION |
| MKPR | PUBLIC RELATIONS | 1 | O | CY | 12 | 24 | 36 | 85000 | ADMIN. DECISION |
| MKSA | SALES | 1 | O | CY | 12 | 24 | 36 | 81100 | ADMIN. DECISION |
| MKSAEX | EXPORT | 1 | O | CT | 12 | 24 | 36 | 81200 | 15 CFR 30.11 |
| MKSAPR | PRICING | 1 | O | SU | 12 | 36 | 48 | 80000 | ADMIN. DECISION |
| OP | OPERATIONS | 1 | O | AR | 12 | 0 | 12 | 45000 | ADMIN. DECISION |
| PDC | DISTRIBUTION CONTROL | 3 | O | CY | 12 | 24 | 36 | 45000 | ADMIN. DECISION |
| OPDCFG | FINISHED GOODS | 3 | O | CY | 12 | 24 | 36 | 45100 | ADMIN. DECISION |
| OPDR | DISASTER RECOVERY PLANNING | 1 | V | SU | 24 | 975 | 999 | 22900 | ADMIN. DECISION |
| OPFA | FACILITIES | 3 | O | CT | 24 | 48 | 72 | 45200 | ADMIN. DECISION |
| OPFAPL | PLANS | 3 | O | CY | 12 | 24 | 36 | 45300 | ADMIN. DECISION |
| OPMA | MAINTENANCE | 3 | O | CY | 12 | 987 | 999 | 45300 | ADMIN. DECISION |
| OPOR | ORDERS | 3 | O | AR | 24 | 0 | 24 | 45100 | ADMIN. DECISION |
| OPQA | QUALITY ASSURANCE | 3 | O | CT | 60 | 0 | 60 | 46000 | ADMIN. DECISION |

TABLE II-continued

REPRESENTATIVE CLASSIFIED RETENTION SCHEDULE WITH CITATIONS AND REFERENCES

| CLASS ACRONYM | CLASS CODE NAME | MED TYP | REC TYP | START AFTER | OFF RET | RC RET | TOT RET | R COPY CC# | REFERENCE |
|---|---|---|---|---|---|---|---|---|---|
| OPQARP | REPORTS | 1 | O | CT | 18 | 6 | 24 | 46000 | ADMIN. DECISION |
| OPSA | SAFETY/ENVIRONMENTAL HEALTH | 3 | O | CY | 12 | 48 | 60 | 47000 | 29 CFR 1910.20 |
| OPSAAC | ACCIDENTS | 1 | O | CY | 12 | 348 | 360 | 47100 | 29 CFR 1904.24 |
| OPSADS | SAFETY RECORDS | 1 | O | CT | 999 | 0 | 999 | 47100 | ADMIN. DECISION |
| DPSAHM | HAZARDOUS MATERIAL PLAN | 3 | O | SU | 120 | 0 | 120 | 47100 | 29 CFR 1910.120 |
| OPSAHW | HAZARDOUS WASTE | 3 | O | CY | 12 | 24 | 36 | 47100 | 29 CFR 1910.120 |
| OPSAIG | INVESTIGATIONS | 3 | O | CY | 12 | 24 | 36 | 47110 | ADMIN. DECISION |
| OPSATE | TESTS | 3 | O | CY | 12 | 12 | 24 | 47200 | ADMIN. DECISION |
| OPSE | SECURITY | 3 | O | CY | 12 | 24 | 36 | 48000 | ADMIN. DECISION |
| OPSEC | COUNTERMEASURES | 3 | O | CT | 24 | 0 | 24 | 48000 | ADMIN. DECISION |
| RE | RESEARCH/DEVELOPMENT | 1 | O | CY | 12 | 24 | 36 | 93000 | ADMIN. DECISION |
| REIN | INGREDIENTS/FORMULAS | 3 | O | SU | 24 | 975 | 999 | 93100 | ADMIN. DECISION |
| REPR | PRODUCTS | 3 | O | CT | 24 | 96 | 120 | 93200 | ADMIN. DECISION |
| REPT | PROJECTS | 3 | O | CT | 24 | 96 | 120 | 93400 | ADMIN. DECISION |
| RESP | ENGINEERING/TECH SPECIFICATION | 3 | O | CT | 24 | 96 | 120 | 93500 | ADMIN. DECISION |
| RETR | TECHNICAL REFERENCES | 3 | O | CT | 24 | 96 | 120 | 93600 | ADMIN. DECISION |

VI. Purge Documents Selectively And Within Legal And Administratively Defined Requirements Using predetermined life-cycles (retention schedules) for each file series, the system identifies documents subject to purging.

The system automatically identifies the "owner" of the document and the location of all copies, both Official and Informational. Such ownership is determined by virtue of the ownership of the file series of the document which in turn is determined by the functional responsibility of the cost center in the Chart-of-Accounts (organizationally). As noted above, the system captures the location and the cost center when the user "saves" a created (or modified) document based on information in the class table and location table.

By use of the system a report may be produced identifying the selected document's key attributes allowing the "owner" to review the document and authorize the purge process, or any other access to or modification of a file series and records in the file series.

The above described system may be implemented entirely in software as described below.

Design Details

The following is a description of an implementation of an Electronic Records System (ERS) according to the present invention as a computer program designed to assist in the management and long term storage of an organization's documents.

Overview

ERS is a client/server application to assist in the management of valuable corporate information.

ERS maintains a record retention schedule detailing how information ought to be stored, where, and for how long.

The application helps the user classify documents into groups of similar information.

ERS provides document security. It can prevent unauthorized reading of or writing to official corporate information.

ERS provides a means to search for documents pertaining to a specific subject, date range, author, etc.

The system acts as a pointer to direct users to where information is stored.

Definition of User Community

The ERS application has four categories of user. Each group of users and their responsibilities are described below.

Records Manager

The Records Manager is responsible for the overall performance of the system. The manager has the greatest amount of authority and access. The responsibilities of the Records Manager are the following:

Sets policy for record storage. This policy includes what media to use for long term storage.

Creates new classes and maintains the retention schedule.

Monitors the performance of the entire application.

Re-classifies documents that have been mis-classified.

Information Services

The Data Processing, Management Information Systems, or the Information Services organization plays a role in the management of documents. Their responsibilities are defined below:

Under the direction of the Records Manager, move documents from one media to another. For example, Information Services will be responsible for moving documents from disk to tape or microfiche.

Also Information Services will be responsible for moving documents from one location to another. Movement of records will apply to only those media they deal with (Tapes, microfiche, etc.).

Information Services will be responsible for maintaining the technical environment. This includes setting up databases, insuring that all users and servers are configured properly, etc.

Department Coordinator

The Department Coordinator is sometimes referred to as a 'Super User'. They have more authority and system access than a normal user, but less than the Records Manager. The responsibilities of the Department Coordinator are the following:

Provide training and technical support to users within the department.

Monitors the performance of the system regarding departmental records.

Creates and sets up new users.

Enforces record retention policy for official records created by the department.

Manages the logistics of moving records to and from a storage facility.

User

The majority of individuals accessing the system will be categorized as users. Their responsibilities are listed below:
  Properly classifies records they create.
  Enforces record retention policy for informational records created by them.

Policies

There are a number of office policies and procedure that need to be followed in order for ERS to be a successful application. Some of these policies are documented below.

Users and Class Assignments

Any user can assign any class to a document. They will not be prevented by the ERS application from assigning classes outside their area of the organization. However, audit reports will be made available to the Departmental Coordinators and Records Manager to help insure that classes are being used properly.

No Class Attribute Overrides

Each class has attributes. There attributes are retention period, record type (official, informational), sensitivity, and vital flag, etc. Users can not override these values with their own when storing a document. If they need different attribute values than what is associated with a given class, then they should contact the Record Manager. The Record Manager may then create a sub class having the attribute values desired by the user.

Classification Owner

There will be one cost center that owns each classification. A classification will no be the responsibility of two or more cost centers. The cost center the owns a classification is responsible for all the documents that have been assigned to that classification. The cost center must insure that the inventory of documents is correct and properly maintained.

Location and Class Assignment

If a document is assigned a classification at the major level, then it can not be located in any archive facility. For example, if a document is classified as 'AC' for accounting, then it can not be stored at a off site storage facility. If the same document was classified as 'ACAP' for accounting, accounts payable, then it could be stored at a warehouse.

One Production Database Per User

A user can have access to several ERS databases. One for production work and one database for training, for example. However, no user will have write access to two production databases. There will be no support for across production database searches.

System Functions

All the capabilities of the system can be described as functions. Functions fall into five types. They are reports, updates, inquires, interfaces, utilities. These functions are described below by the group of user who will access them.

User Functions

All individuals who have access to the system will be able to operate the functions defined as follows:

Application Package File Open Function

From a word processing, spreadsheet, or presentation software package, a user will be able to pull down the package's File menu and activate the Open menu item. This will access ERS, automatically. The features of this function are described below.

Search and Retrieve Feature

The user will have the ability to retrieve and open a document by searching for its classification, synonym, or other attributes such as author, title, and/or date. If multiple documents are found that satisfy the users search criteria, a list of these documents will be displayed for the user to pick from. The documents being searched may be found on the users hard drive, shared network drive, or archive facility (Mezzanine).

Application Package File Save Function

From a word processing, spreadsheet, or presentation software package, a user will be able to pull down the package's File menu and activate the Save or Save As menu items. This will access ERS, automatically. The features of this function are described below.

Document Storage Feature

The users will have the ability to store at document on their hard drives, shared network drives, or archive facility (Mezzanine). Regardless of where the user stores the document, they will have the ability to manage their documents with ERS classifications and synonyms.

Classification Assignment Feature

Users will be able to assign any classification directly to the document. Or, users can select a corporate synonym (official term or keyword) to be applied to the document. Behind the scenes, ERS will assign the classification associated with the corporate synonym to the document. Also, the user may wish to assign one of their own synonyms to the document. ERS will automatically translate from the user's synonym to the appropriate corporate synonym and assign the classification to the document.

Synonym Maintenance Feature

Users will have the ability to add, change, or delete their own synonyms. They may create synonyms different than the corporate synonyms. However, user created synonyms must be related to corporate synonyms. User synonyms will be children of a corporate synonym.

Attribute Maintenance Feature

When saving a document, a user will have the ability to store other attributes about the document. These attributes are title, subject, author, date created, etc.

Stand Alone ERS User Functions

Not all the functions the user needs can be accessed via an application package such as Microsoft Word. There will need to be a stand alone ERS application (.EXE) the user can run. The functions contained within this facility are described below.

Update Functions

| | |
|---|---|
| Inventory Maintenance | The ability to correct mis-assigned classifications given to items in inventory. This function assists the user in properly assigning classifications to documents. |
| Inventory Entry | The ability to add an item to inventory and to assign it a classification. This function is needed to store items that are not word processing documents, spread sheets, or presentations. Such items might be Write, text, or bit mapped files. |
| Inventory Request | The ability to request via the system that an inventory item be (1) moved to an off site storage facility, (2) retrieved from an off site storage facility, (3) changed from one media type to another. |
| Synonym Maintenance | The ability to add, change, or delete user synonyms. |
| User Profile Maintenance | This update function would allow a users to change information the system stored about them. Such information as phone number, mail stop, spread sheet directory name, and location would be fields a user could change. The function would not allow them to change their user group or create a new user. |

Inquiry Functions

| | |
|---|---|
| Inventory Retrieval | The ability to search and view a document in inventory. This function is needed to retrieve items that are not word processing documents, spread sheets, or presentations. Such items might be Write, text, or bit mapped files. |

Reporting Functions

| | |
|---|---|
| Inventory Detail Reports | The ability to display what items are in inventory by retirement date, or by class, or by age. The purpose of these reports is to help the user (1) re-assign classification codes (if needed), (2) retire inventory items. |
| Synonym Reports | Listings of the user's synonyms by classification or corporate synonym. The purpose of these reports is to help the users determine which of their synonyms they no longer need. |

Department Coordinator Functions

The Department Coordinator would have access to the same functions as the normal user. However, in their stand alone ERS application they would access to these additional functions.

Update Functions

| | |
|---|---|
| User Maintenance | The ability to add, change, or delete information about a user, the group they belong to, and the classes they can assign to a document. |
| Inventory Maintenance | The ability to change an inventory item's classification, location, or media. This update function helps the Department Coordinator correct mis-assigned classifications and move inventory items from one location to another. When changing an inventory items media, this will create a media request. A media request is a note to Information Services that items found on hard disk need to be moved to CD |

Reporting Functions

| | |
|---|---|
| Inventory Detail Reports | The ability to display what items are in inventory by department and cost center, or by retirement date, or by class, or by media type and age. The purpose of these reports is to help the Department Coordinator (1) retire inventory items, (2) move inventory items from one location to another. |
| Inventory Count Reports | The ability to count the quantity of inventory items by age, or by department and cost center, or by retirement date, or by classification. The purpose these reports is to help the Department Coordinator (1) understand how many items are inventory and their age, (2) determine if classifications are being properly used, and (3) manage the retirement process. |
| Center Retention Required | The purpose this report is to display those items in inventory that are approaching the end of their office retention period and starting their center retention period. These inventory items may require a media change and/or location change. This report would be used to issue inventory requests for media change. This report would help the Department Coordinator manage the logistics of moving records to and from a storage facility. |
| Classification Audit | The purpose of these reports are to display where |
| Reports | classifications may be mis used. The reports should list (1) the documents assigned classifications that are not approved by the Departmental Coordinator for application by the user, and (2) the documents only assigned a major classification. |
| Inventory Requests Report | The purpose of this report is to display the documents that need to be (1) placed in a off site storage facility, (2) retrieved from an off site storage facility, and/or (3) under go a media change. This report would help the Departmental Coordinator manage the logistics of moving records to and from a storage facility. |
| Static Table Listings | The ability to list the contents of various static tables such as record type, sensitivity codes, retention start codes, synonyms, classes, users, user groups, organization structure, media types, and locations. |

Information Services Functions

The Information Services organization needs some of the same functions of the Department Coordinator, but not all. Information Services needs to be able to maintain inventory locations and media. They will also need the same inventory reports and media life reports available to the Department Coordinator. In addition, the following functions would be available to only Information Services users.

Update Functions

There are several update functions that only Information Services personnel would use. These functions are described below.

| | |
|---|---|
| Database Definition | The purpose of this function is to describe the various ERS databases that may be at an organizations and their addresses. |
| Function Maintenance | The purpose of this update is to record what functions are in the system, which tables or database objects they access, which user groups can run them. This update would also maintain how a report is sorted and what columns can be used in its selection criteria. |

Batch Functions

The following functions are intended to run once a day in the evening hours. The overall purpose of these functions is to keep the various ERS servers in sync with one another and healthy.

| | |
|---|---|
| Function Usage Maintenance | ERS will record who is running what, when, and for how long. This usage activity can create a large volume of data in a short period of time. For this reason, there will be a batch job available to remove usage activity prior to a certain date. In this fashion, the Records Manager can select to keep usage information for only one quarter, for example. |
| Security Grants | The purpose of this batch job would be to re-do all the security grants on all the database objects (tables, view, etc.) to match what is defined in the function and user group tables. This batch job would be run during implementation of a new release of ERS. |

Records Manager Functions

The Records Manager would have access to all the functions available to the normal user and the Department Coordinator. However, the Records Manager would have access to the following additional functions in their stand alone ERS application.

Update Functions

| | |
|---|---|
| Class Maintenance | Add, change, or delete information about classifications, abstracts, and retention schedules. |
| Synonym Maintenance | Add, change, and delete synonyms used corporate wide. These synonyms are also referred to as keywords and official terms. |
| Static Table Maintenance | Add, change or delete rows from any of the application's static tables. Static tables would include record type. sensitivity codes, retention start codes, synonyms, classes, users, user groups, companies, departments, and cost centers, media types, buildings, aisles, and locations, etc. |

Reporting Functions

| | |
|---|---|
| Class Availability Report | Display a list of classifications available and applied by company, departments, cost centers, and user. The purpose of this report is to determine if departments are potentially mis-using classifications. |
| Function Usage Reports | List the system function number, title, and the quantity of times it was accessed by department, cost center, and user. The purpose of this report is to support a activity analysis or charge back. |
| Data Dictionary Reports | Database columns definitions by column name and table name. The purpose of these reports is to educate the record manager and developers as to what is stored in the database and where. |

Catalog of Functions

The purpose of the catalog of functions is to display a summarized list of all the update and reporting capabilities of the system by type, subject, name, and description.

| Type | Subject | Name | Description |
|---|---|---|---|
| Reports | Class | ERS110 | Class Authority Report. |
| | | ERS120 | Class Usage Report. |
| | | ERS130 | Classification Audit Report. |
| | Dictionary | ERS150 | Data Dictionary Report. |
| | Function | ERS210 | Function Usage Report. |
| | | ERS220 | Function/Object Relationship. |
| | | ERS230 | Function/Column Relationship. |
| | | ERS240 | Function/Sort Relationship. |
| | Inventory | ERS250 | Center Retention Required. |
| | | ERS255 | Inventory Detail Report. |
| | | ERS260 | Inventory Count Report. |
| | | ERS265 | Inventory Request Report. |
| | | ERS270 | Inventory Retirement Required. |
| | | ERS275 | Inventory Retrieval. |
| | Synonym | ERS310 | Synonym Report. |
| | User | ERS340 | Group Function Access Report. |
| | | ERS350 | User Class Access Report. |
| | Tables | ERS410 | Location Report. |
| | | ERS415 | Location Type Report. |
| | | ERS420 | Media Type Report. |
| | | ERS425 | Organization Report. |
| | | ERS430 | Organization Type Report. |
| | | ERS435 | Record Type Report. |
| | | ERS440 | Retention Reference Report. |
| | | ERS445 | Retention Start Report. |
| | | ERS450 | Sensitivity Report. |
| Batch | Function | ERS510 | Function Usage Maintenance. |
| | Inventory | ERS520 | Inventory Statistics Maintenance. |
| | Security | ERS510 | Grant Creation. |
| Update | | ERS610 | Class Maintenance. |
| Class | Function | ERS650 | Function Maintenance. |
| Update | | ERS710 | Inventory Entry. |
| Inventory | | ERS720 | Inventory Maintenance. |
| | | ERS730 | Inventory Re-Classification. |
| | | ERS730 | Inventory Request. |

-continued

| Type | Subject | Name | Description |
|---|---|---|---|
| | Synonym | ERS750 | Keyword Maintenance. |
| | | ERS760 | Synonym Maintenance. |
| | User | ERS810 | User Maintenance. |
| | | ERS820 | User Profile Maintenance. |
| | Tables | ERS905 | Database Definition. |
| | | ERS910 | Location Maintenance. |
| | | ERS915 | Location Type Maintenance. |
| | | ERS920 | Media Type Maintenance. |
| | | ERS925 | Organization Maintenance. |
| | | ERS930 | Organization Type Maintenance. |
| | | ERS935 | Record Type Maintenance. |
| | | ERS940 | Retention Reference Maintenance. |
| | | ERS945 | Retention Start Maintenance. |
| | | ERS950 | Sensitivity Maintenance. |
| Utilities | Inventory | ERS010 | Application Package, File Open. |
| | | ERS020 | Application Package, File Close. |
| | | ERS030 | Application Package, File Save. |

Generic Description of All Function and Features

The purpose of this section of the document is to describe, in a generic fashion, what the system will be able to do. This section defines the functions and features of the application.

Any system is made up of functions. Functions are software that produce menus, reports, updates, interfaces, and utility activities. Features are the capabilities of each function. For example, reporting functions have the capability to output their information to the screen, the printer, or to an extract file for easy entry into a spread sheet. These output routing capabilities are all features of a reporting function.

Menu Functions

The purpose of menus is to provide access to all other functions of the system. Pull down menus are placed at the top of each window. The features of all menus are described below:

Function Access All menus will provide access to the various functions of the system. An example of the pull down menus and their options would be the following:

File

New
Open
Delete
Close
Print
Printer Setup
Exit

Edit

Undo
Cut
Copy
Paste
Clear
Find
Go To
Search
Sort
Filter
View

First Page
Prior Page
Next Page
Last Page
Toolbars
Date and Time

-continued

```
                 Maintenance

Update 1
                 Update 2
                 Etc.
                 Reports Report 1
                 Report 2
                 Etc.
                 Window Tile
                 Layered
                 Cascade
                 Arrange Icons
                 Window 1
                 Window 2
                 Etc.
                 Help Contents
                 Search for Help on
                 How to Use Help
                 About ERS
```

| | |
|---|---|
| Micro Help | As a user points to a menu option and holds the left mouse button down, they will see a one line description of that menu option at the bottom of the window. |
| Button Bar | A bar of push buttons will be located just below the menu at the top of the window. The push buttons will contain icons symbolizing frequently used functions or menu options. Thereby a user can access a function one of two ways. The first method is by pulling down the appropriate menu and clicking on the option desired. The second means of accessing a function would be to click on the icon for the function found on the button bar. |
| Disabled Functions | The pull down menus will show all functions planned for the application at all times. However, some of the functions will appear in gray letters. These will be the functions that are not completed and are not available for use. As the system development effort continues, more and more of these functions will be enabled and will appear in black letters. In this fashion, a user can see all the functions of the system, and what is available for use today. |
| User Access | The functions an individual user can access will depend upon the level of security. Certain users will have all of their menu options enabled, others will not. The functions each user can access will be assigned by the Records Manager. |

Reporting Functions

Reports are functions used to output information. Reporting functions can produce output in tabular listings, graphs, or spread sheets formats. This output can be sent to the screen, a printer, or a file directory. The features of reporting functions are the following:

| | |
|---|---|
| Custom Sub Heading | The user will have the option to create their own report sub heading that will appear at the top of each page. The sub heading can be used to document the items selected or their purpose for running the report. |
| Selection Criteria | The user will have the ability to limit the size of the report. They will be able to select one or more columns on the report and state what values they would like to have retrieved for those columns. For example, if department number is a column on a report, then a user will be able to state which departments should appear on the report. For inventory related reports, users will have the ability to do string search on the title and description of items. |

-continued

| | |
|---|---|
| Variable Sorting | Each report can have more than one method of sorting. The user will have the ability to select, from a pre-set list, how the information should be sorted. |
| Routing of Output | Each report can be routed to one of three different places. The report can be viewed on the screen, sent to a printer, or placed in comma delimited file. The comma delimited file can be read by Lotus or Excel spread sheet software. |
| Report Footing | On the last page of each report will be displayed the sort sequence and selection criteria used to create the report. In this fashion, the reader of the report will know that the report may not contain all the information in the system. |
| Print After View | Every report routed to the screen will have the ability to be printed. This feature will allow the users to view the first several pages of a report, and then print it, if they desire. |
| Micro Help | Every object of the window used to specify report sub-headings, selection criteria, sorting, and routing will have a help message associated with it. The help message will offer a one line description of the object. |
| Usage Tracking | Just prior to exiting a reporting function, the system will post to the database the name of the reporting function run, rows retrieved, the user's ID, date, and time. In this fashion, tracking of reporting function usage and charge back activities can be supported. |

Update Functions

Update functions provide the ability to add, change, or delete records in the database. The features of update functions are the following:

| | |
|---|---|
| Add, Change, Delete | A single update function will allow the user to add new records, change existing ones, or delete records from a table. The user will not have to select three different update functions from a menu to maintain one table. |
| Point and Shoot | The user will not have to know key field values such as department numbers, building numbers, or document numbers. In each update function, they will be shown a list of records that can be updated. Then, they can point to an existing record to change it, or delete it. By displaying a list of existing records in a table first, the user can scroll through them and decide which one they would like to update. |
| Drop Down Lists | The user will not have to memorize codes to operate update functions. If a code field value is asked for on a data entry window, it will be displayed in a drop down list box along with its description. For example, if a user must input an cost center number, then they will be given a drop down list box containing cost center number and names to choose from. |
| Drag and Drop | Where ever possible, ERS will allow the user to drag an object on to a command button to signal that they wish to perform the command. |
| Jumping | If several windows are used to collect all the data being entered into a table or group of tables, then the user will have the ability to jump from one window to another. For example, an update function could consist of three windows. The first could be a list of documents to update. The second window could be all the descriptive information about the document. The third window could be used to input key words or phases about the document. The user would not be forced into going from the first, to the second, and then to the third window. They would be given push buttons to jump from the first window to the third, and from the third to the second window. In this fashion, the user would not be forced into traversing through several windows in a pre-set pattern to enter the data. |
| Validation | Each field will be validated at the time the user moves the cursor from one field to another on a data entry window. This will prevent the user from entering several fields of erroneous information before realizing that any of it is wrong. |
| Referential Integrity | All update functions will use referential integrity rules. These rules will prevent deletion of code values being used else where in the system. For example, a user will not be |

| Entity Name | Entity Definition |
|---|---|
| | able to delete a department number from the department table if it is being used to describe a document in the inventory table. |
| Confirmation | At the bottom of each data entry window, in an update function, would be several push buttons. These buttons would be used to signal the computer to write the transaction out to the database, or cancel the transaction. Each time one of these buttons is pressed, the user will see a message a the bottom of the window confirming the computer's actions. |
| Micro Help | Each object and field in a data entry window will have a help text associated with it. This one line of help message will appear at the bottom of the screen when the object or field is clicked on. |
| Usage Tracking | Just prior to exiting an update function, the system will post to the database the name of the update function run, the quantity of records processed, the user's ID, date, and time. In this fashion, tracking of update function usage and charge back activities can be supported. |

Process Model

The purpose of a business process model is to show the relationship between people, systems, data, office policy and procedures, and documents.

Node Tree Diagrams

Figure 8:
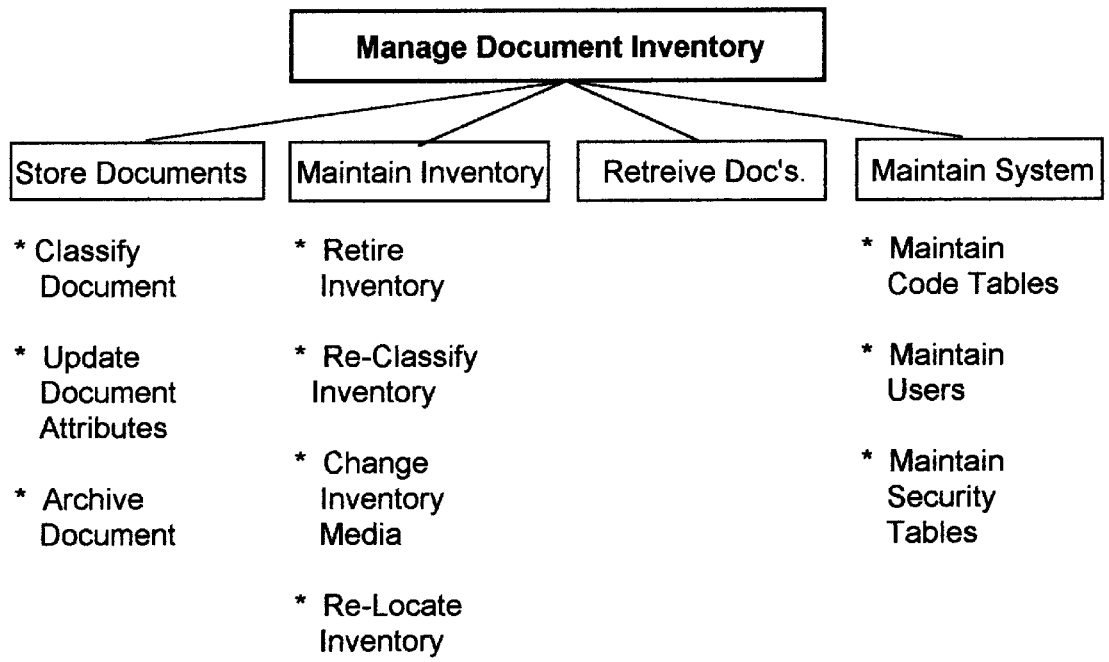
FIG. 8 is a block diagram showing a high level view of the functions performed by the invented system.
Figure 9:
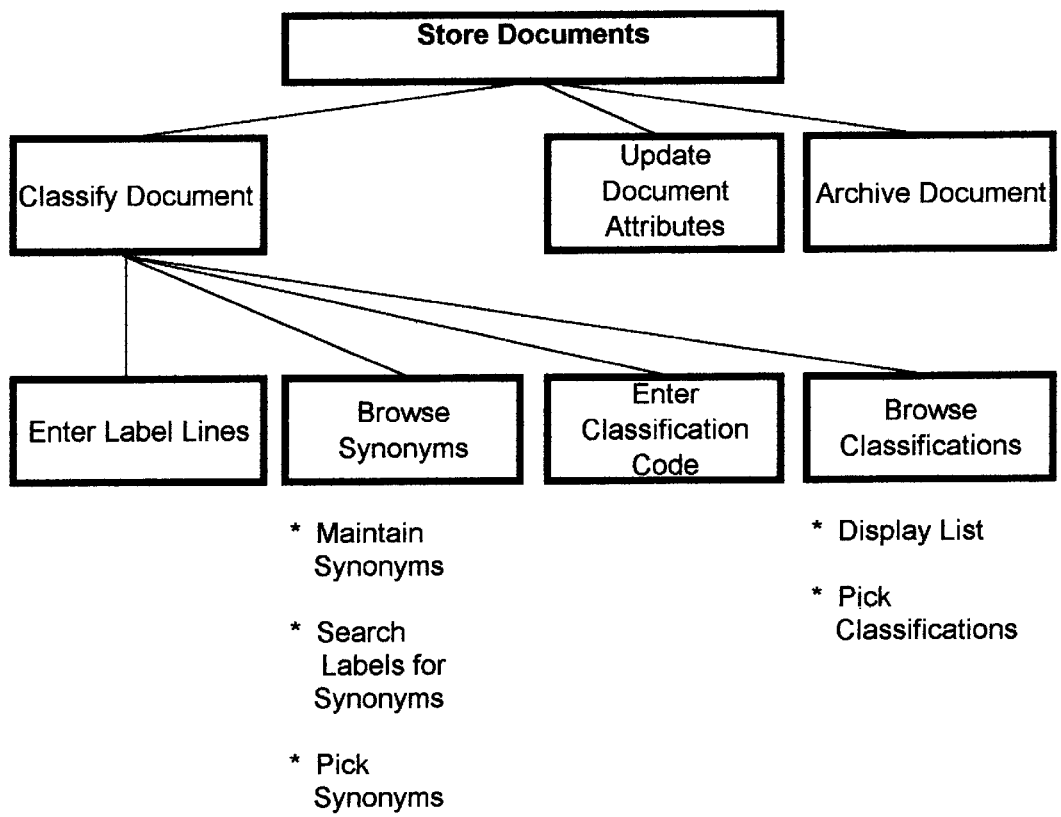
FIG. 9 is a block diagram showing the store documents function.
Figure 10:
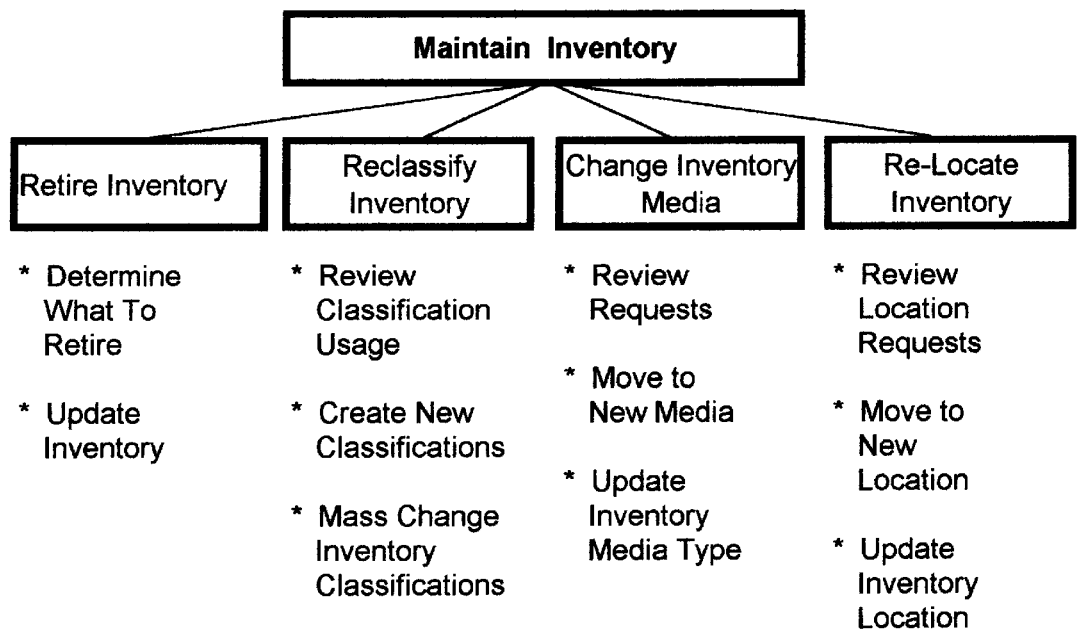
FIG. 10 is a block diagram showing the maintain inventory function.
Figure 11:
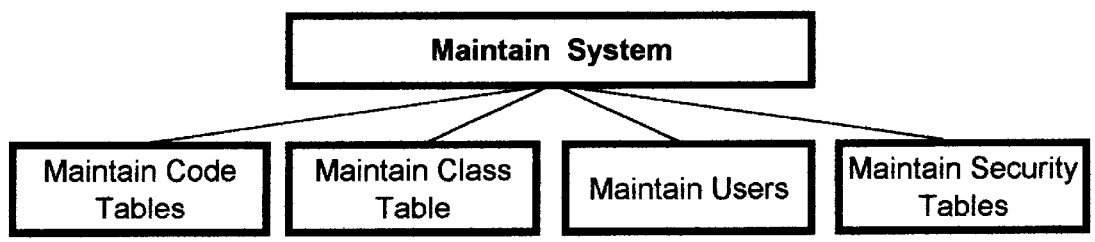
FIG. 11 is a block diagram showing the maintain system function.
Figure 12A:
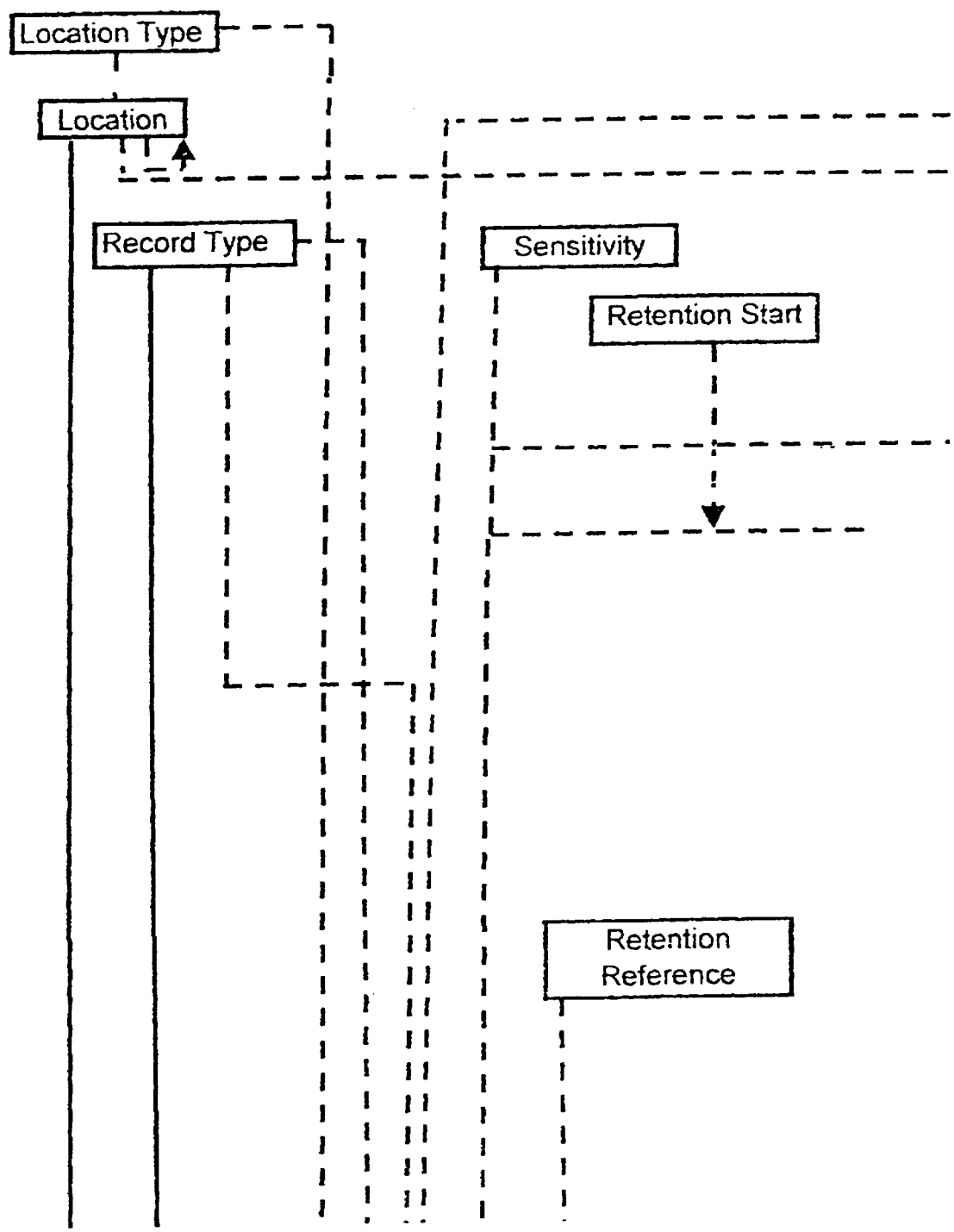
FIGS. 12A–12C show the first row of Figures forming the entity relationship diagram.
Figure 12B:
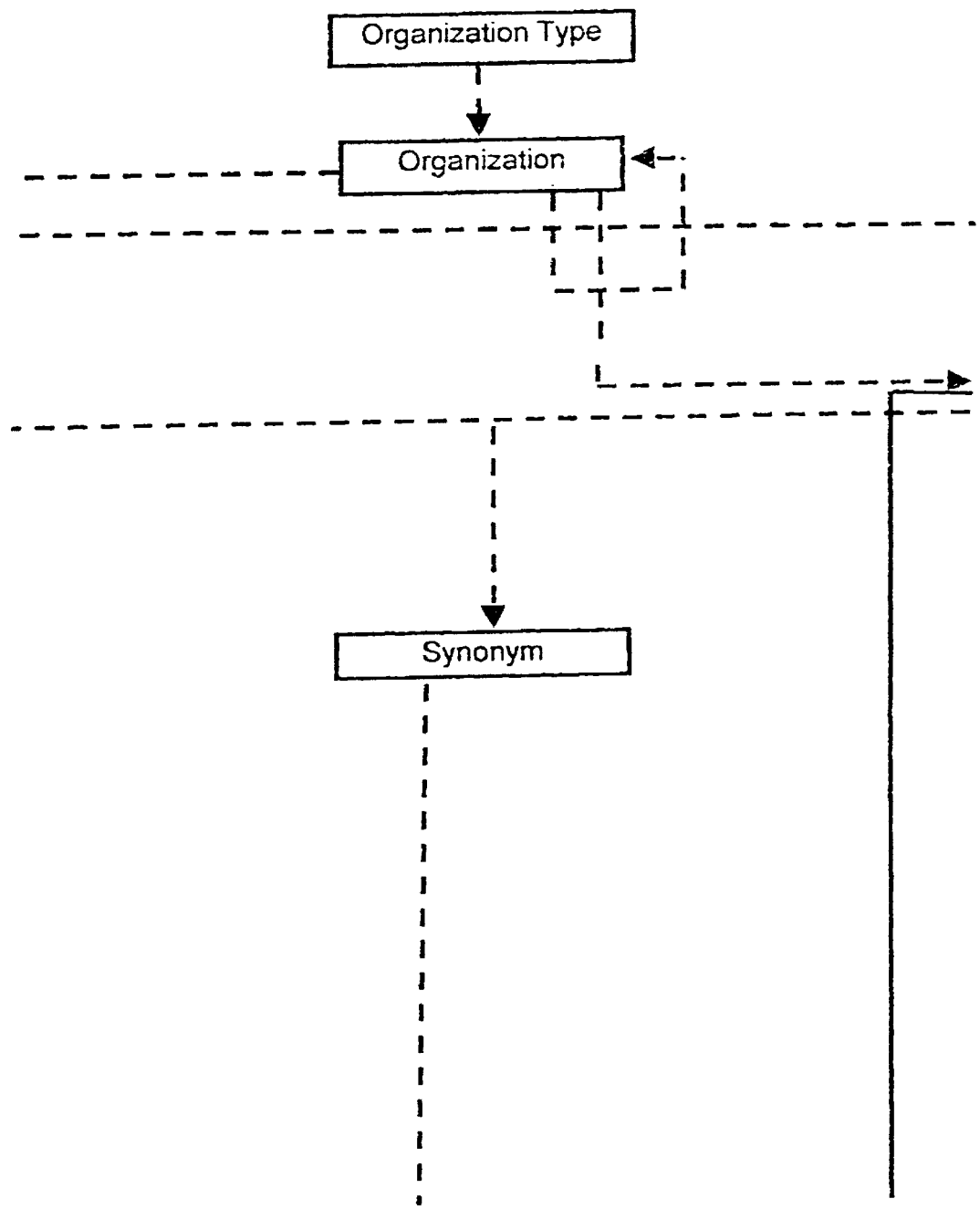
Figure 12C:
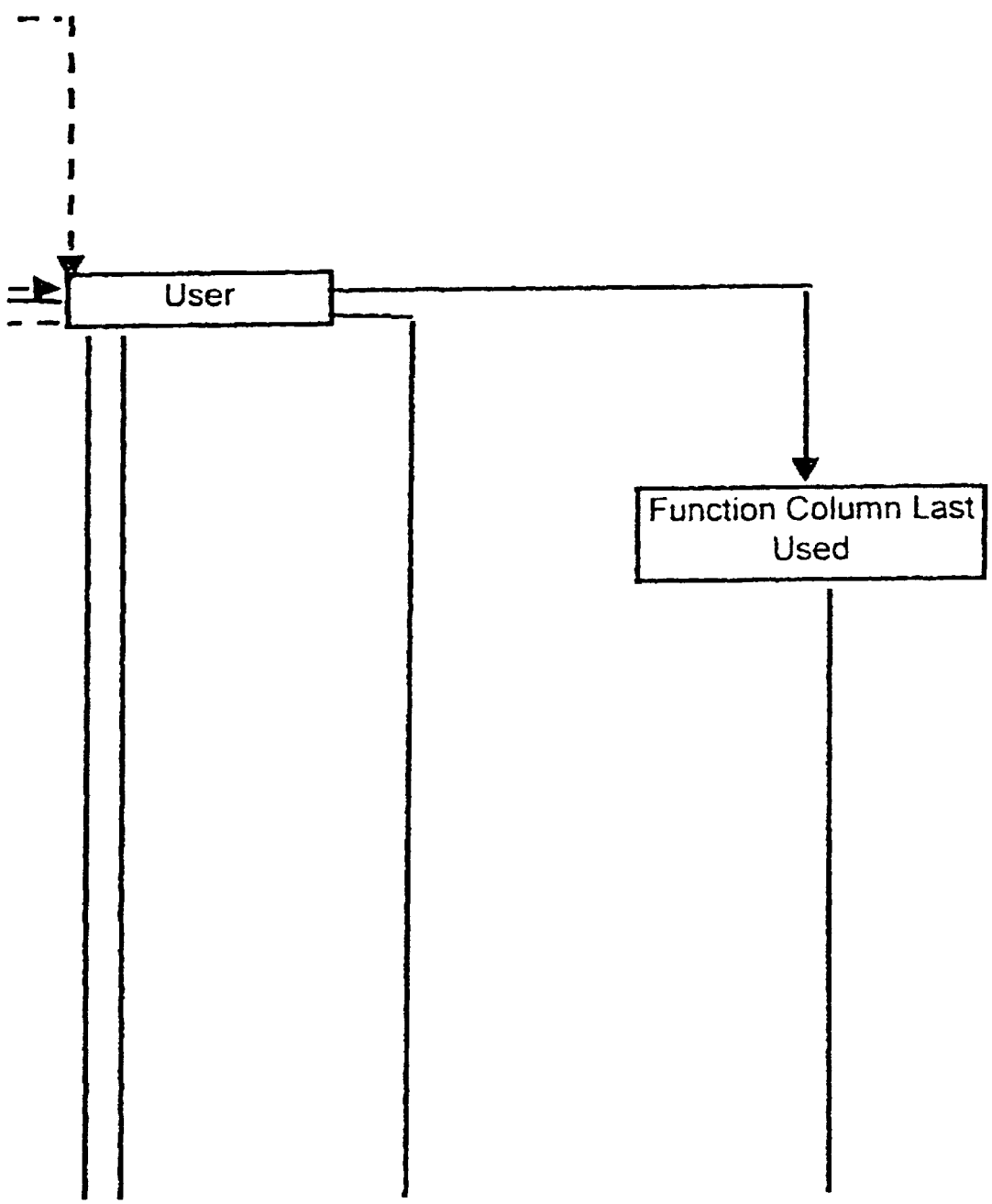
Figure 12D:
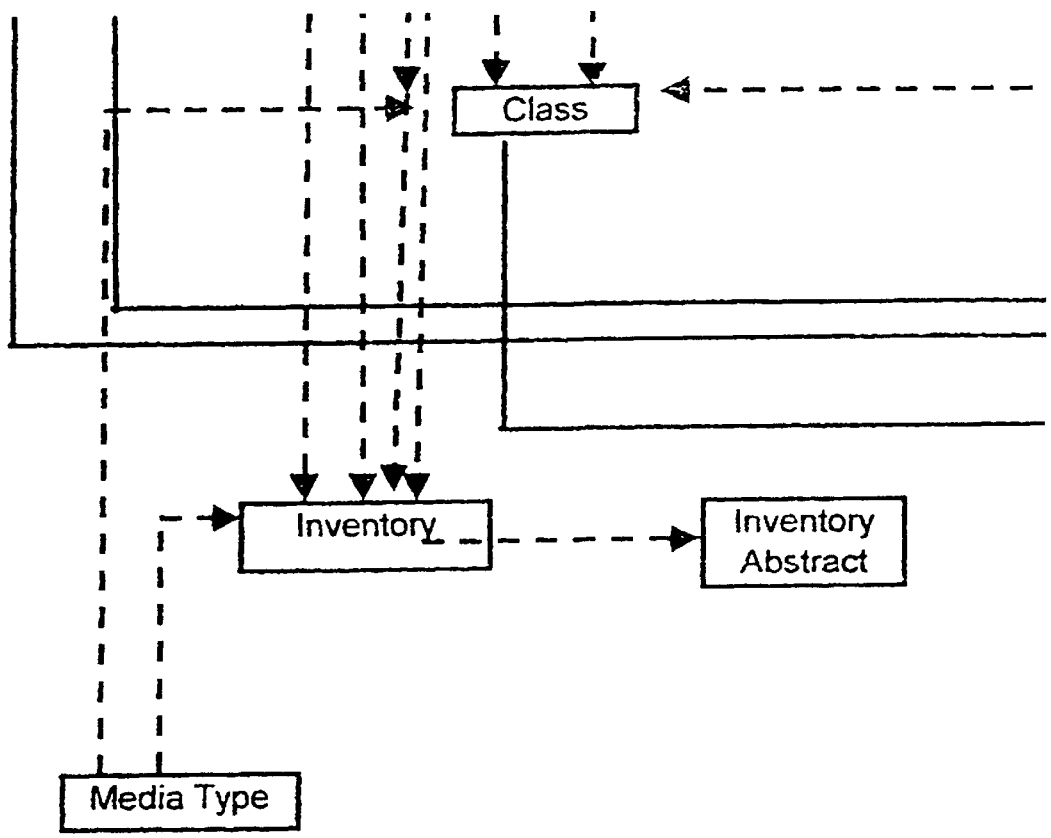
FIGS. 12D–12F show the second row of Figures forming the entity relationship diagram.
Figure 12E:
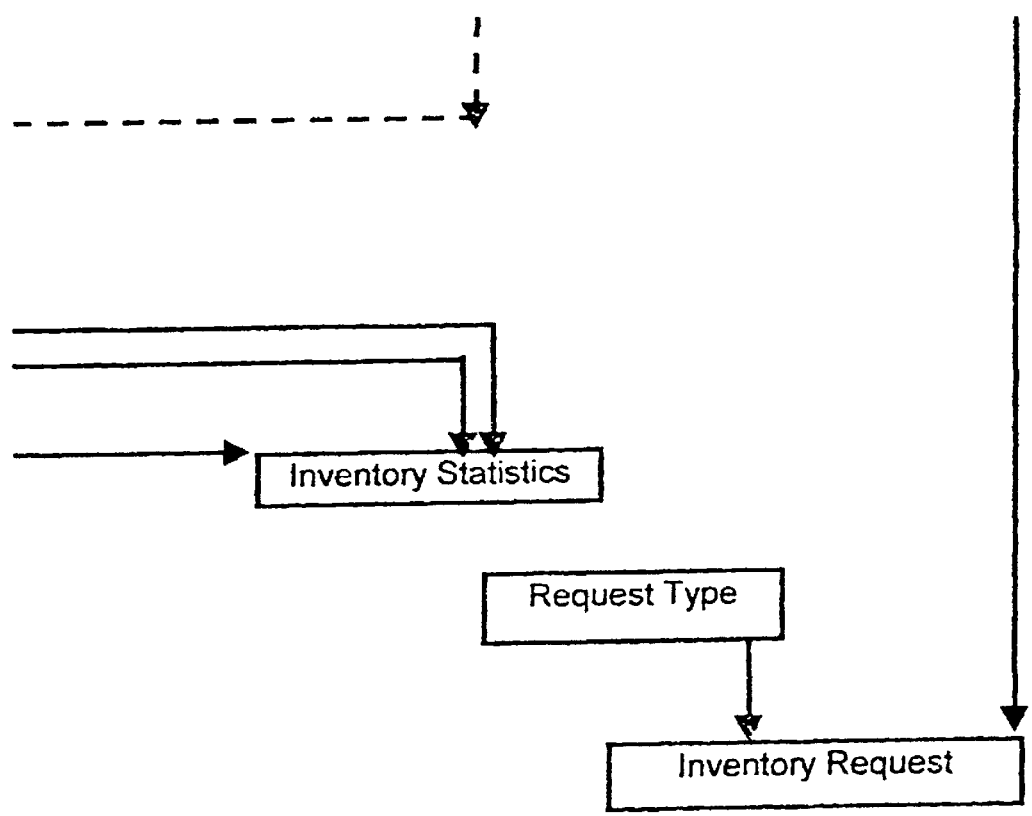
Figure 12F:
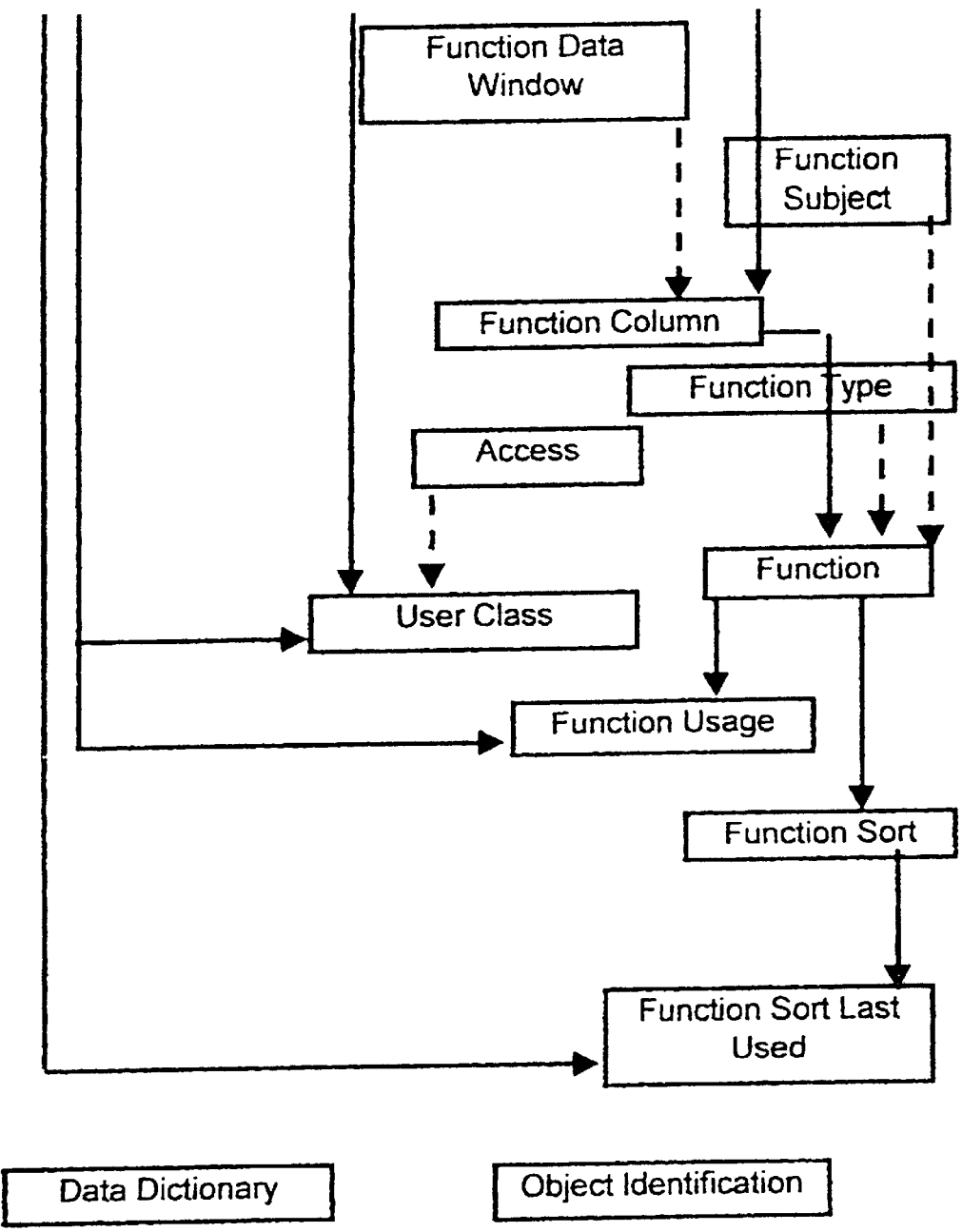
Figure 13A:
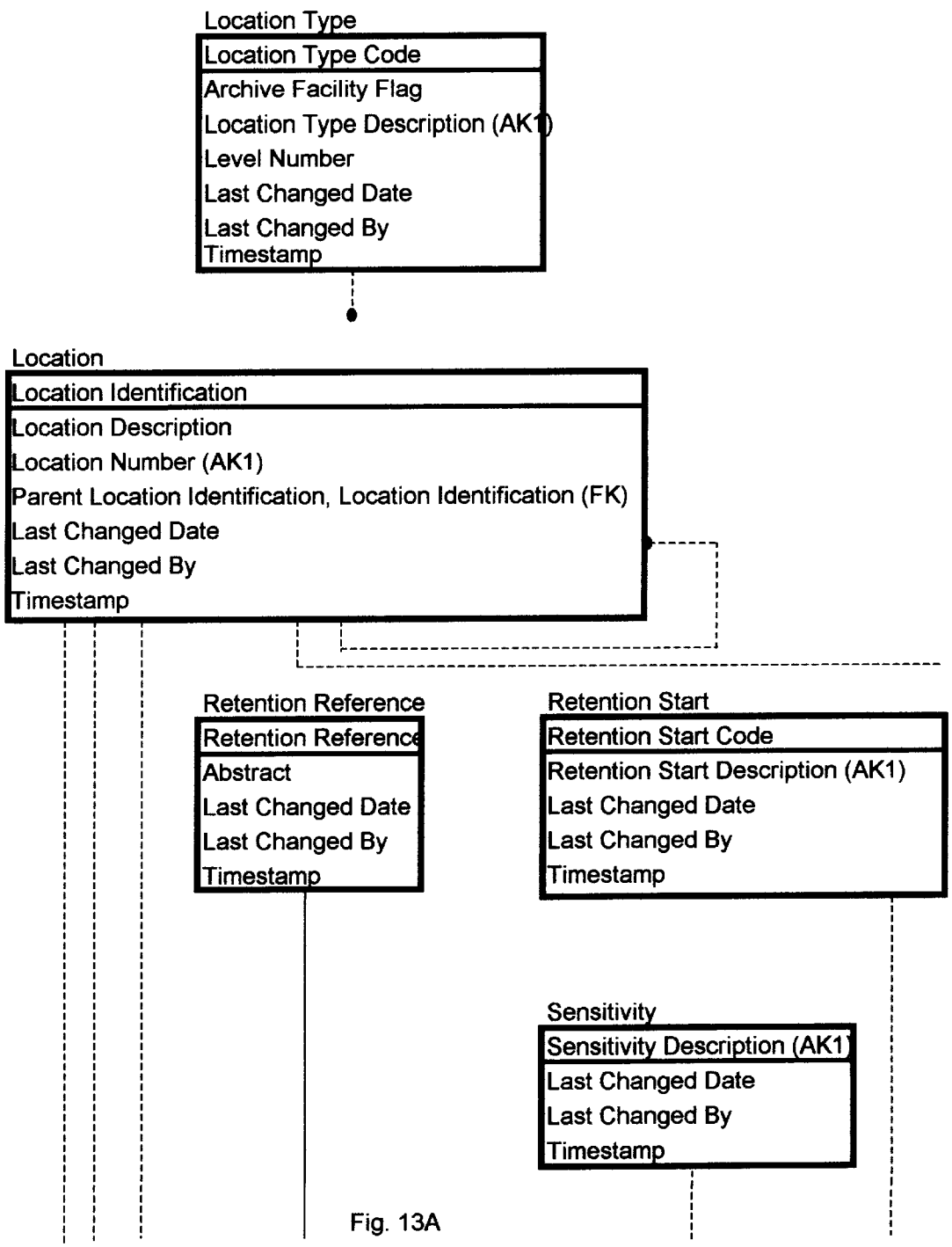
Figure 13B:
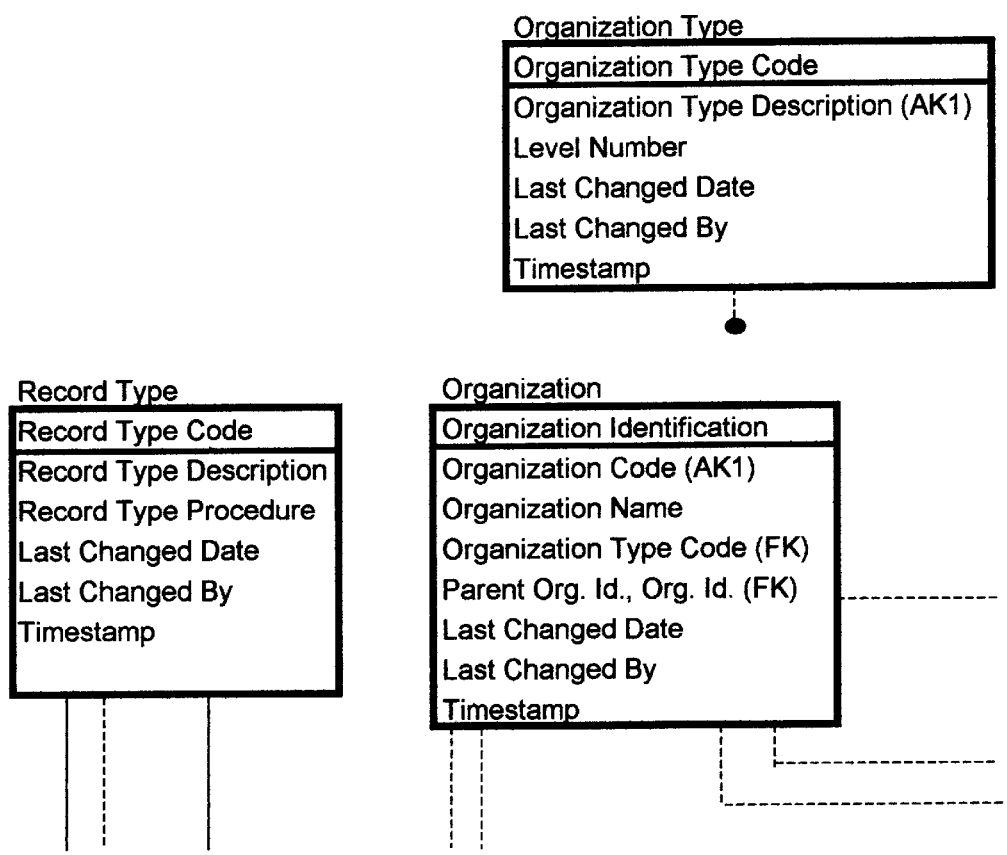
Figure 13C:
Figure 13E:
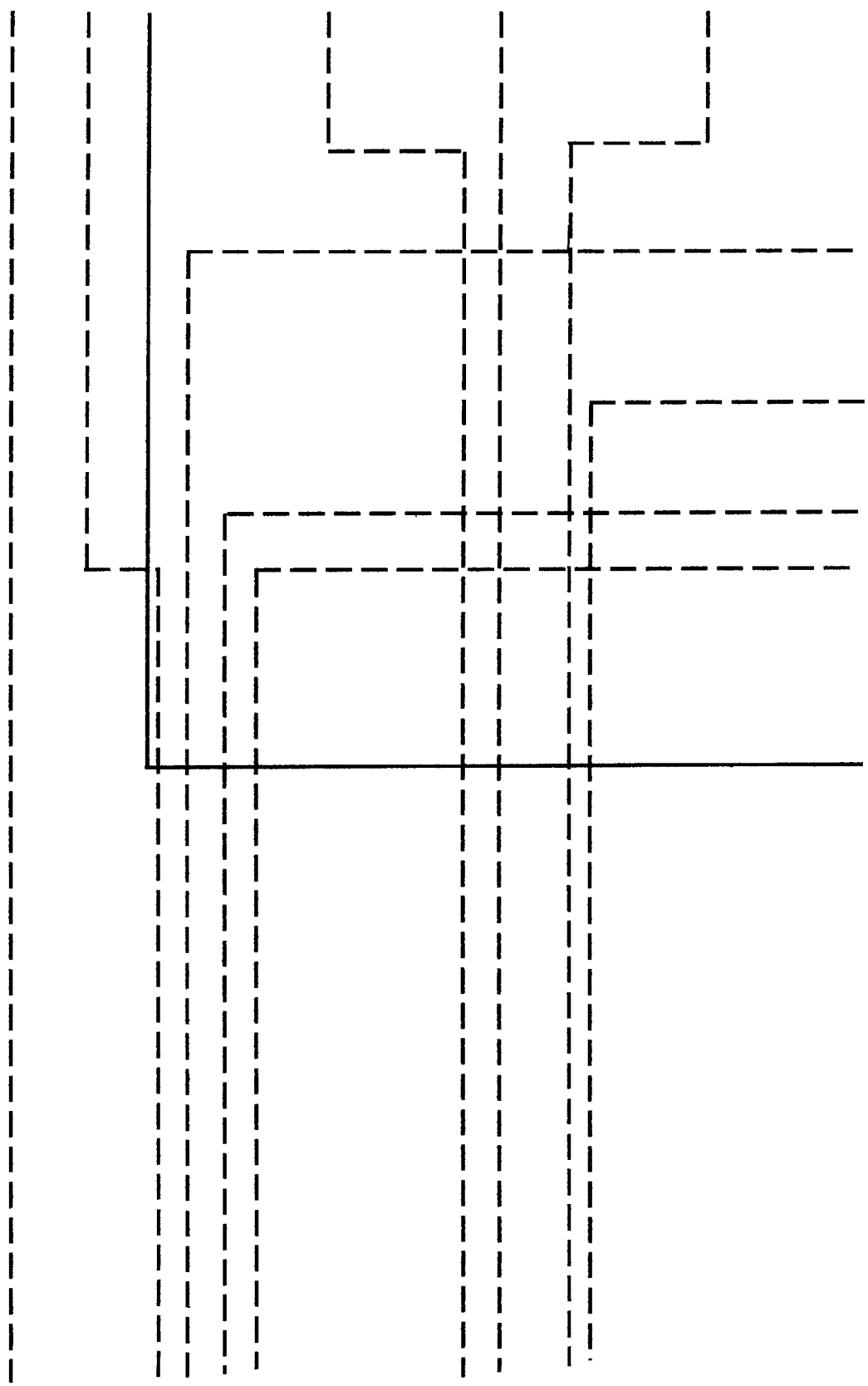
FIGS. 13E–13H show the second row of Figures forming the logical database model.
Figure 13F:
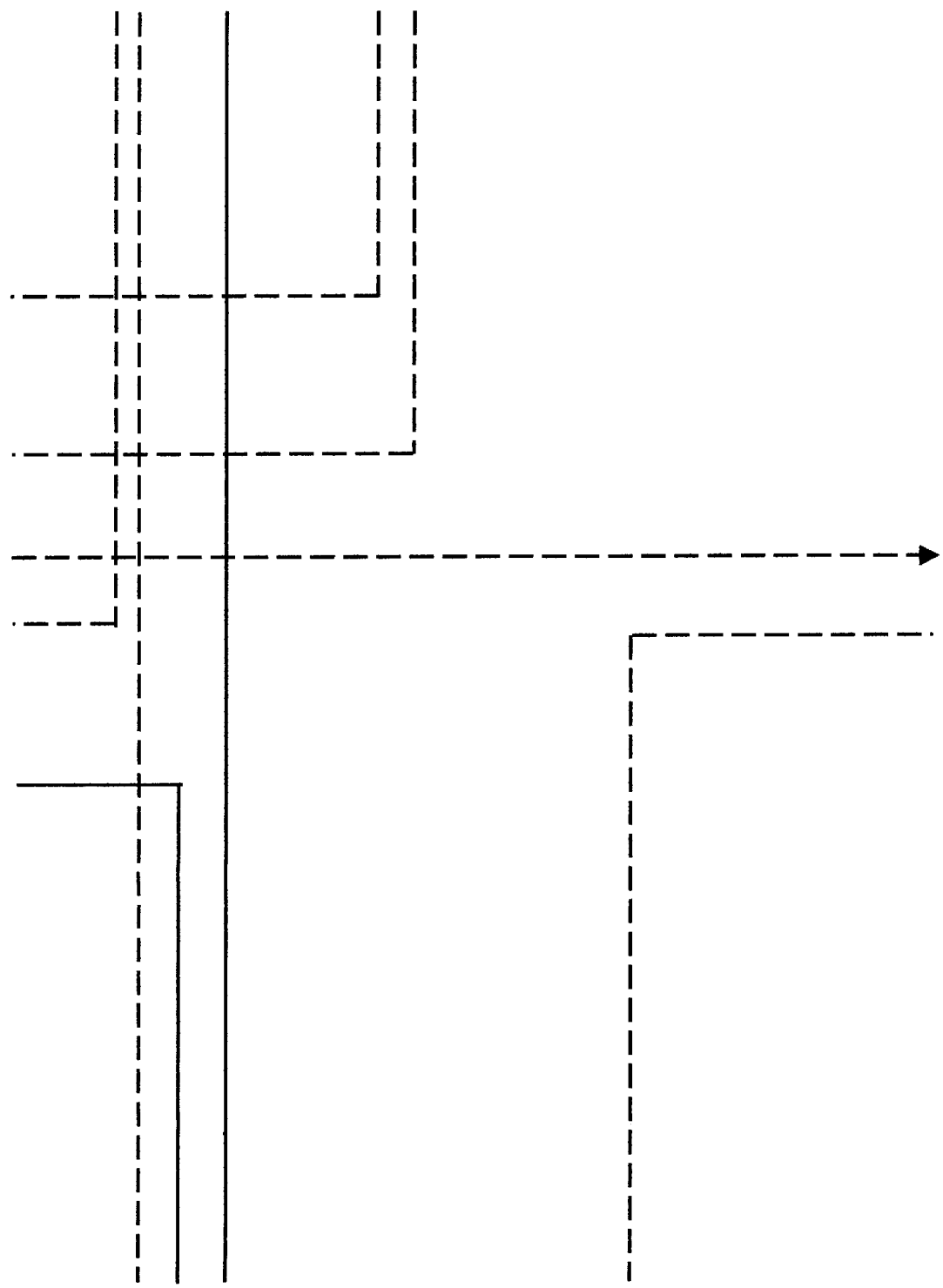
Figure 13G:
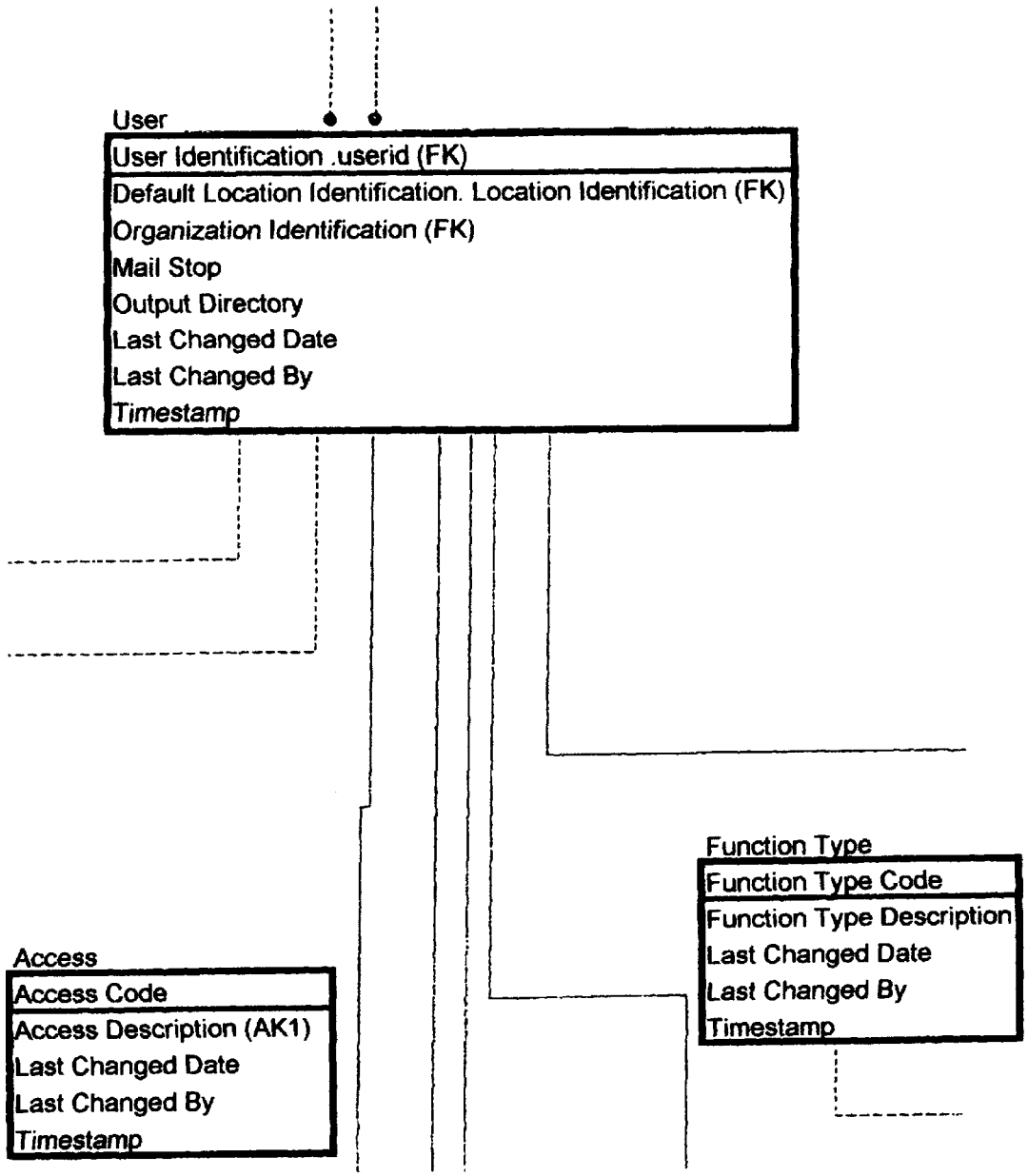
Figure 13H:
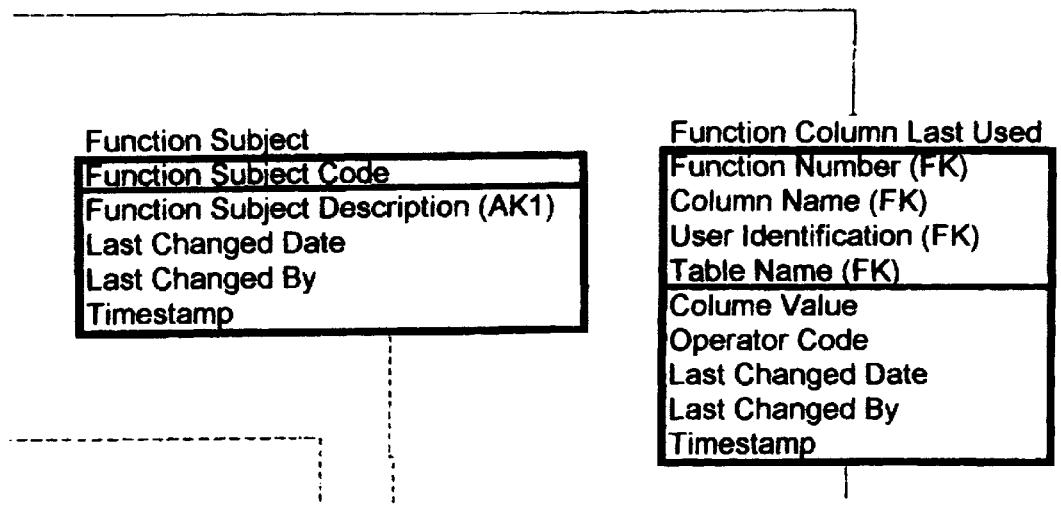
Figure 13I:
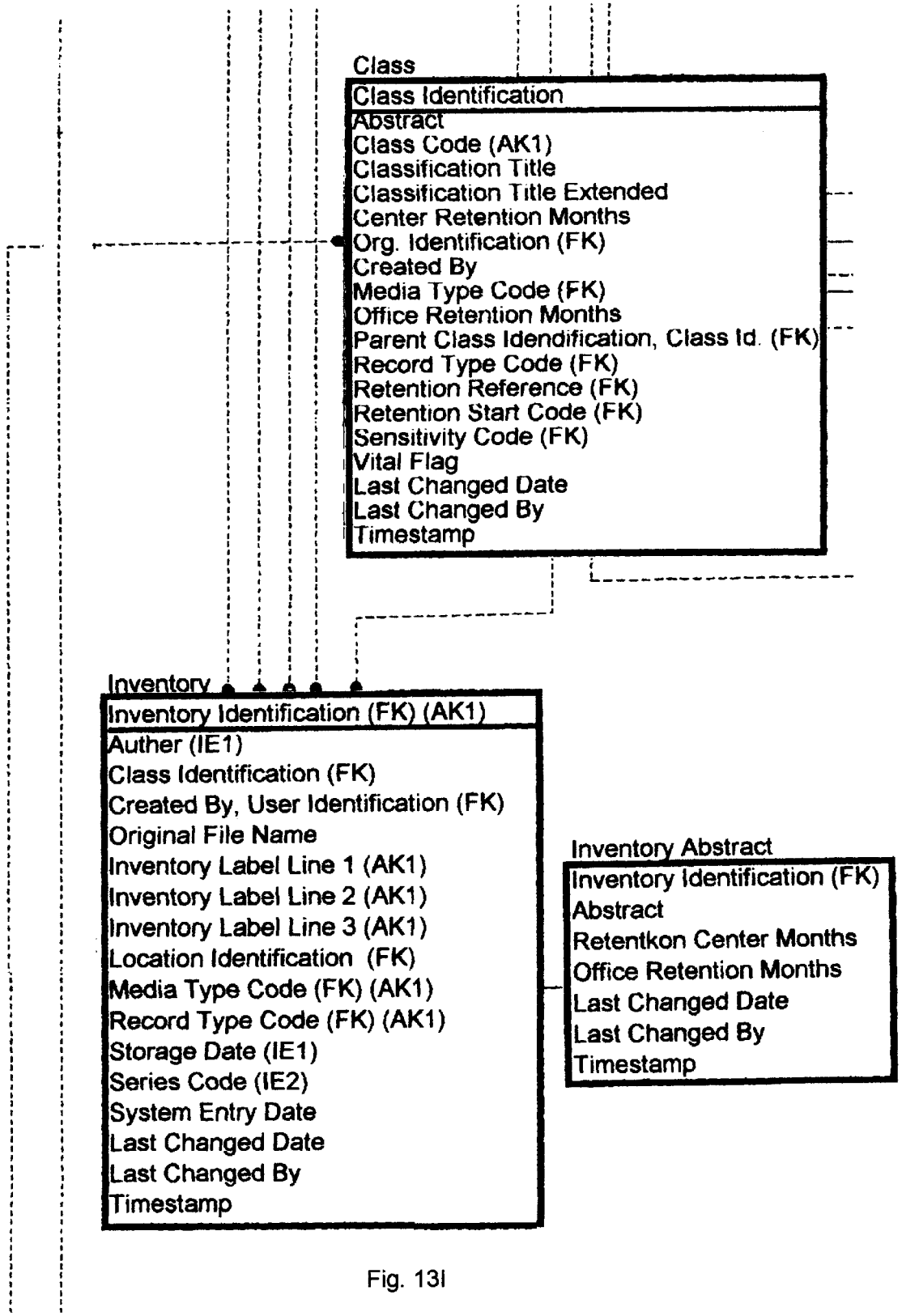
FIGS. 13I–13L show the third row of Figures forming the logical database model.
Figure 13J:
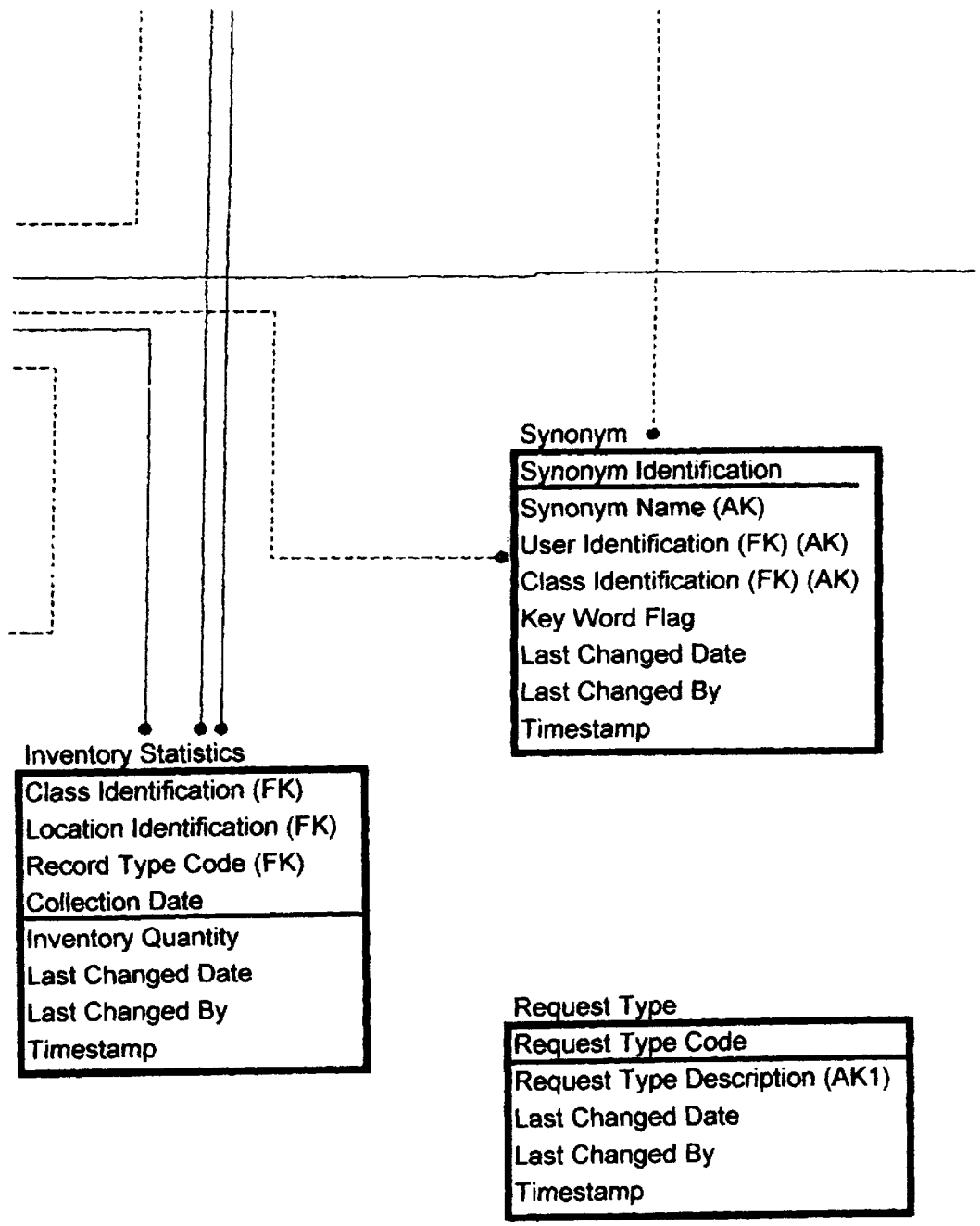
Figure 13K:
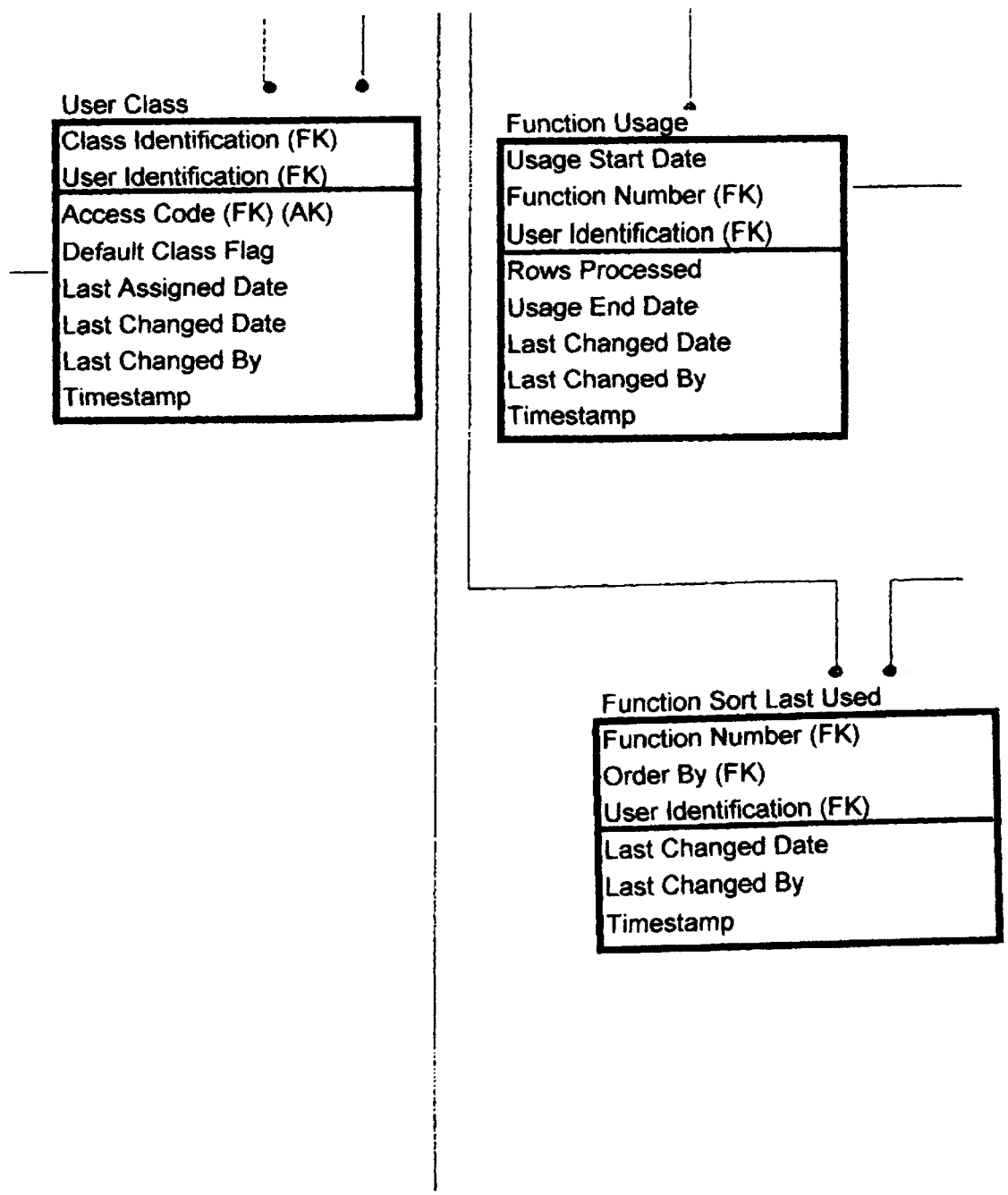
Figure 13L:
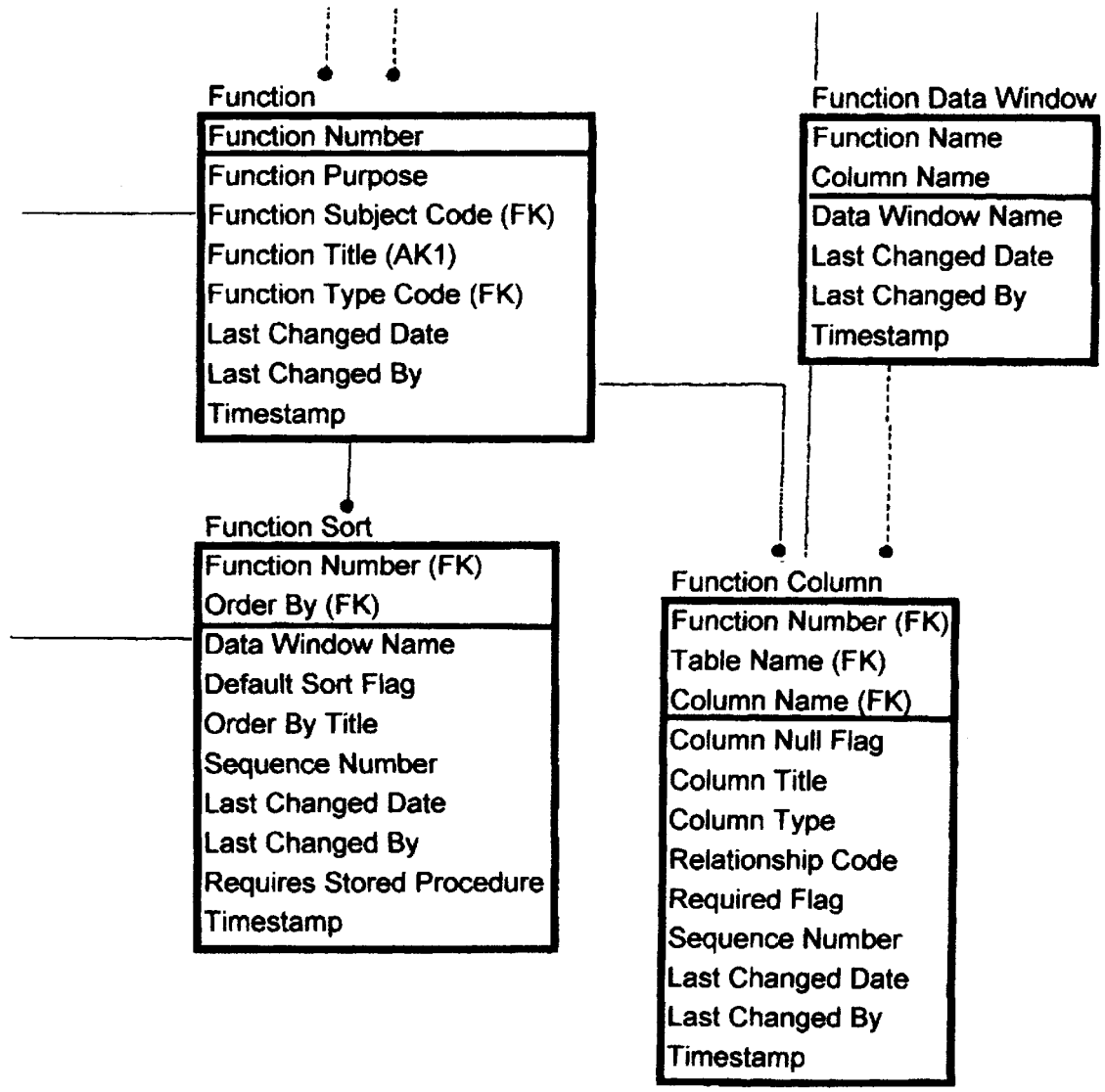
Figure 14A:
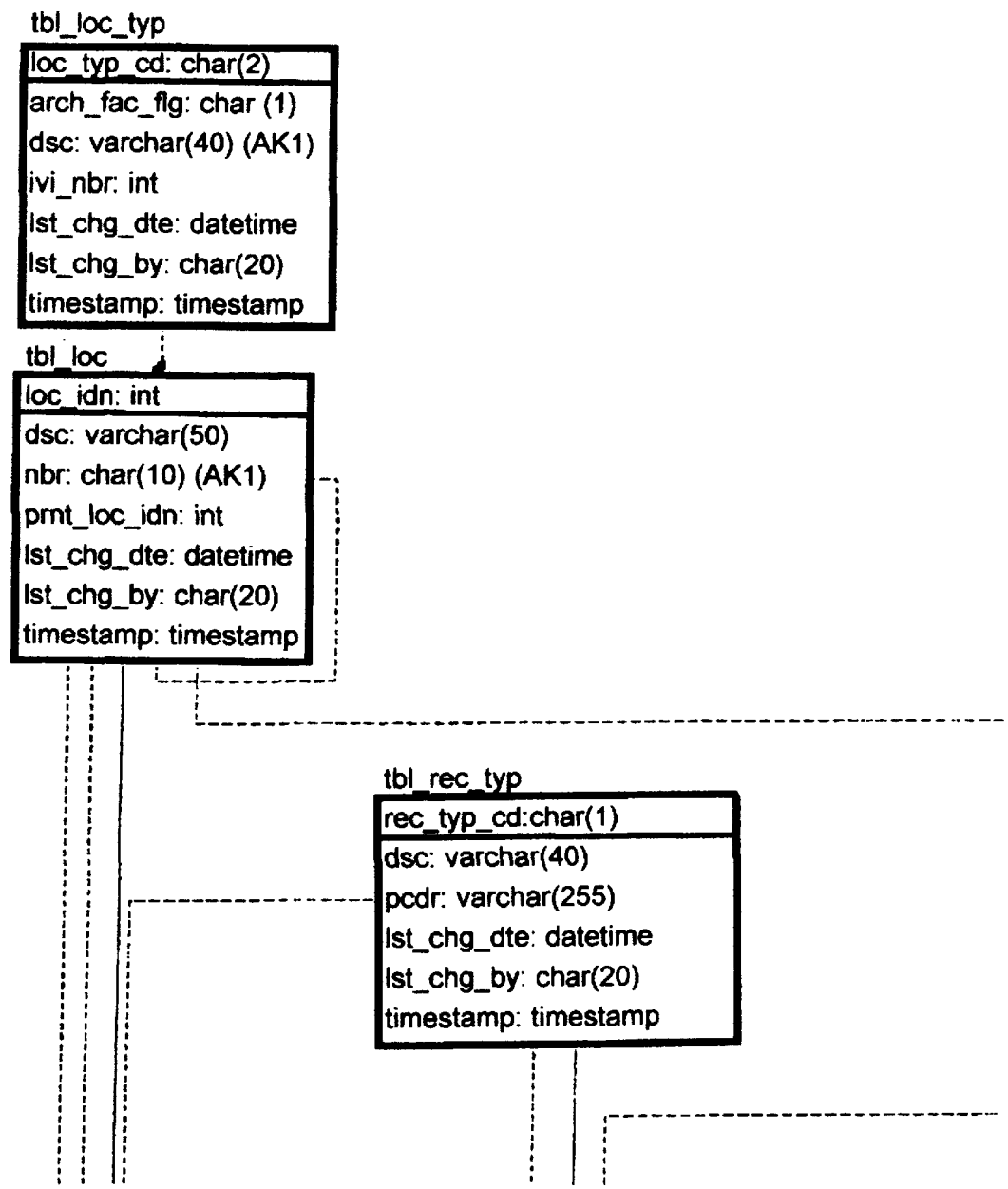
Figure 14B:
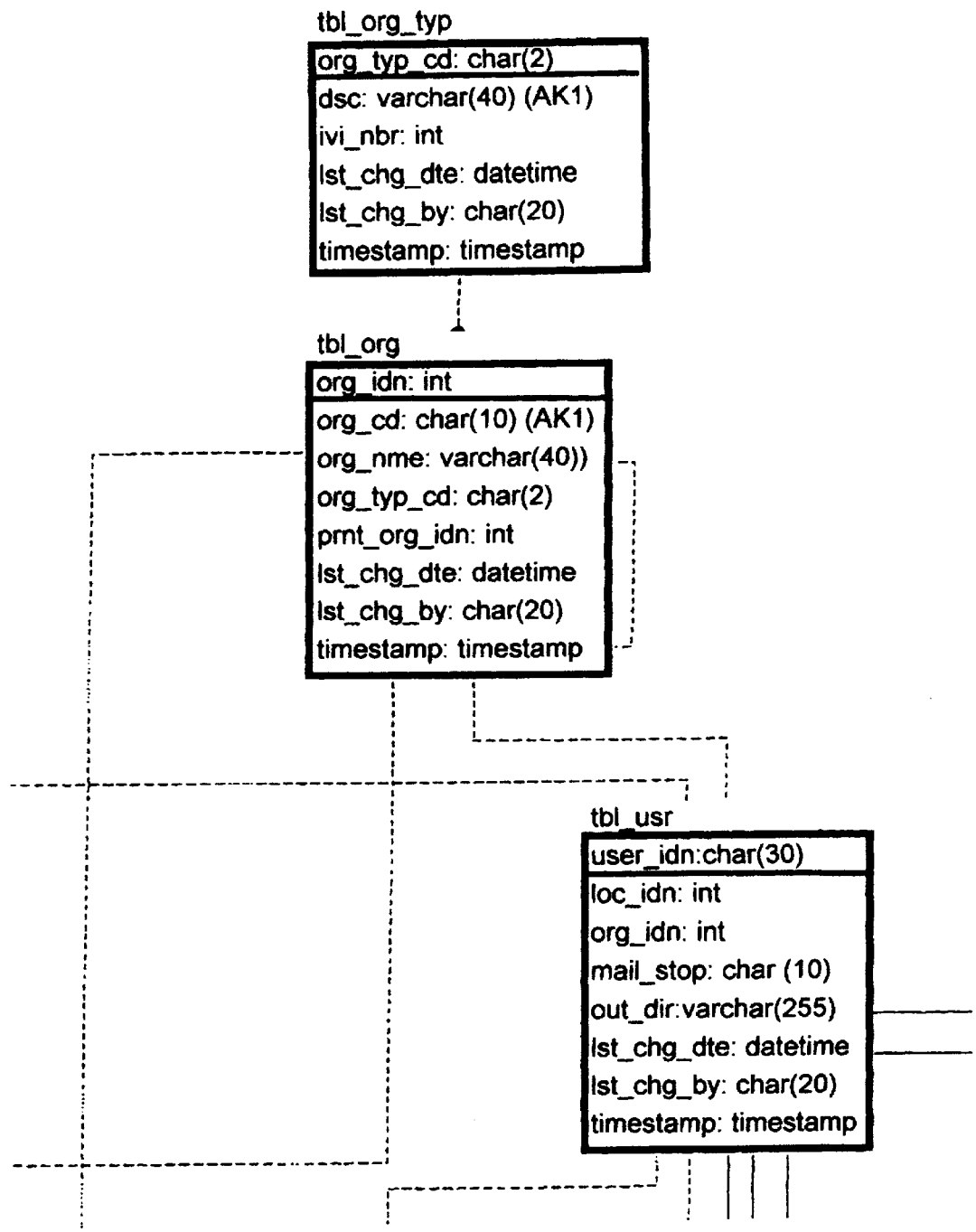
Figure 14C:
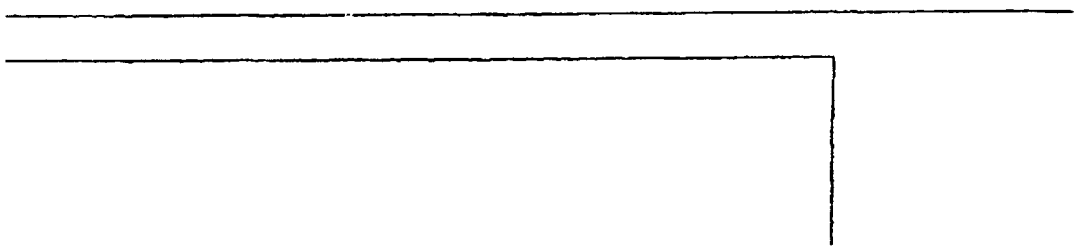
Figure 14E:
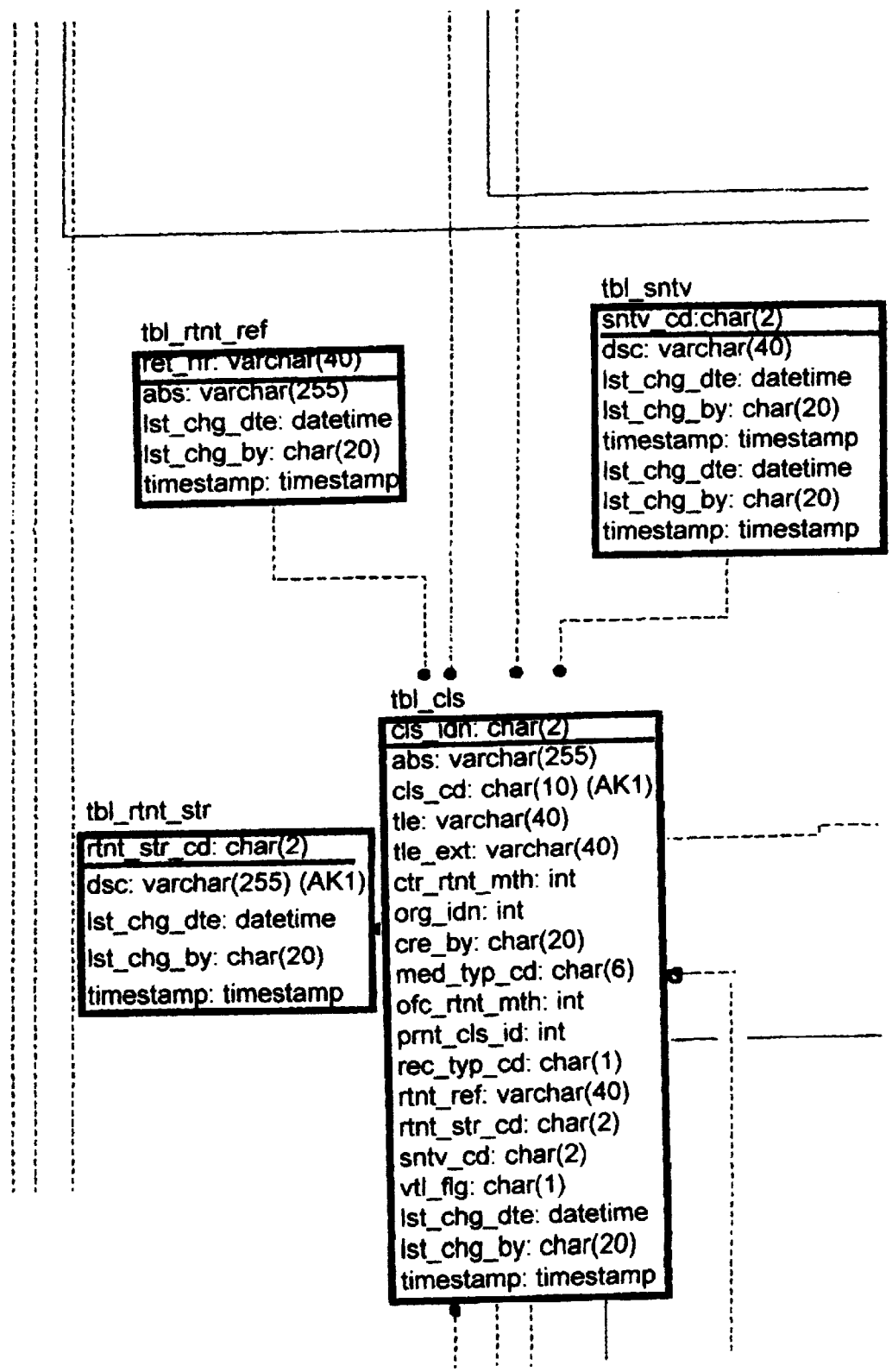
FIGS. 14E–14H show the second row of Figures forming the physical database model.
Figure 14F:
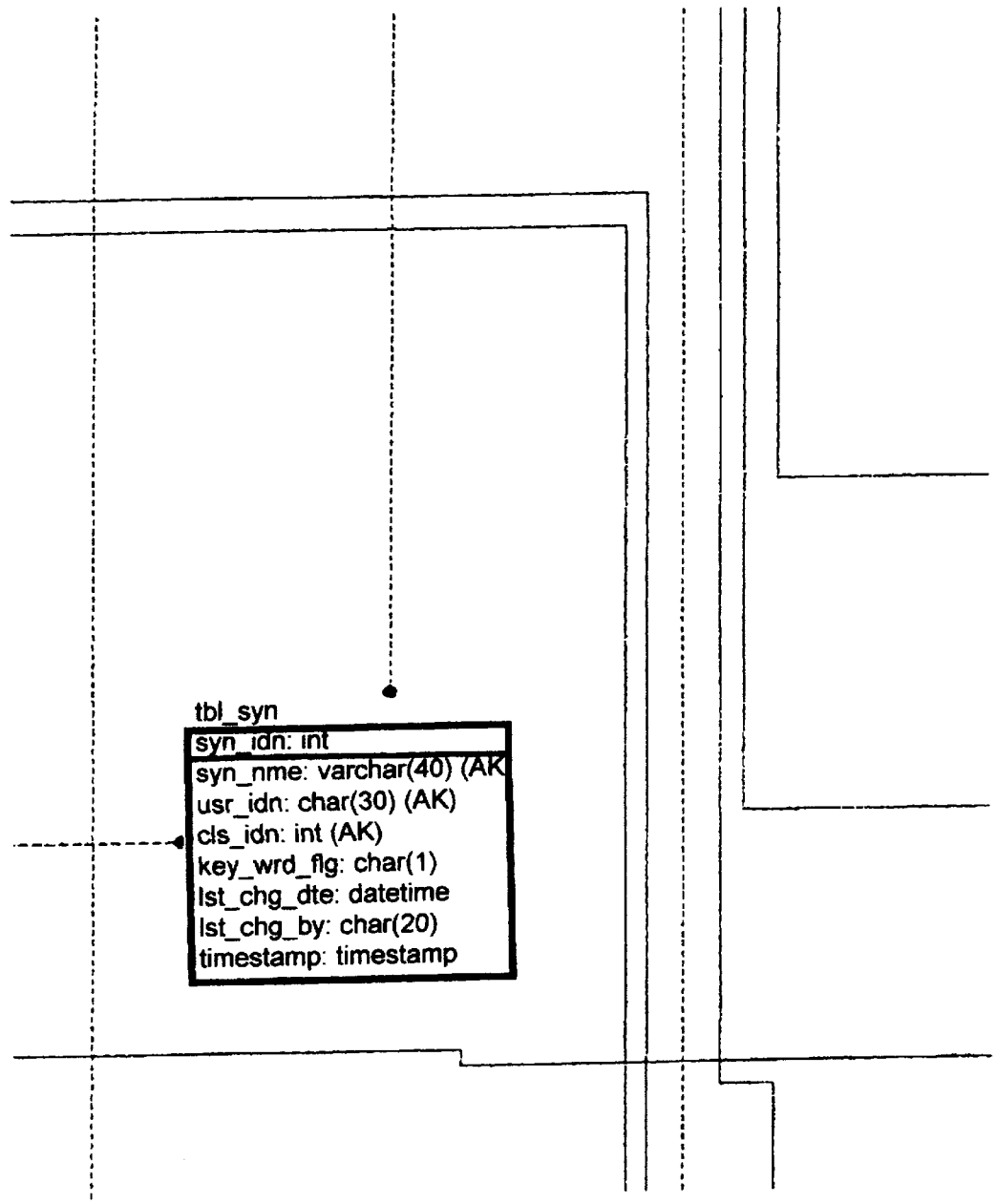
Figure 14G:
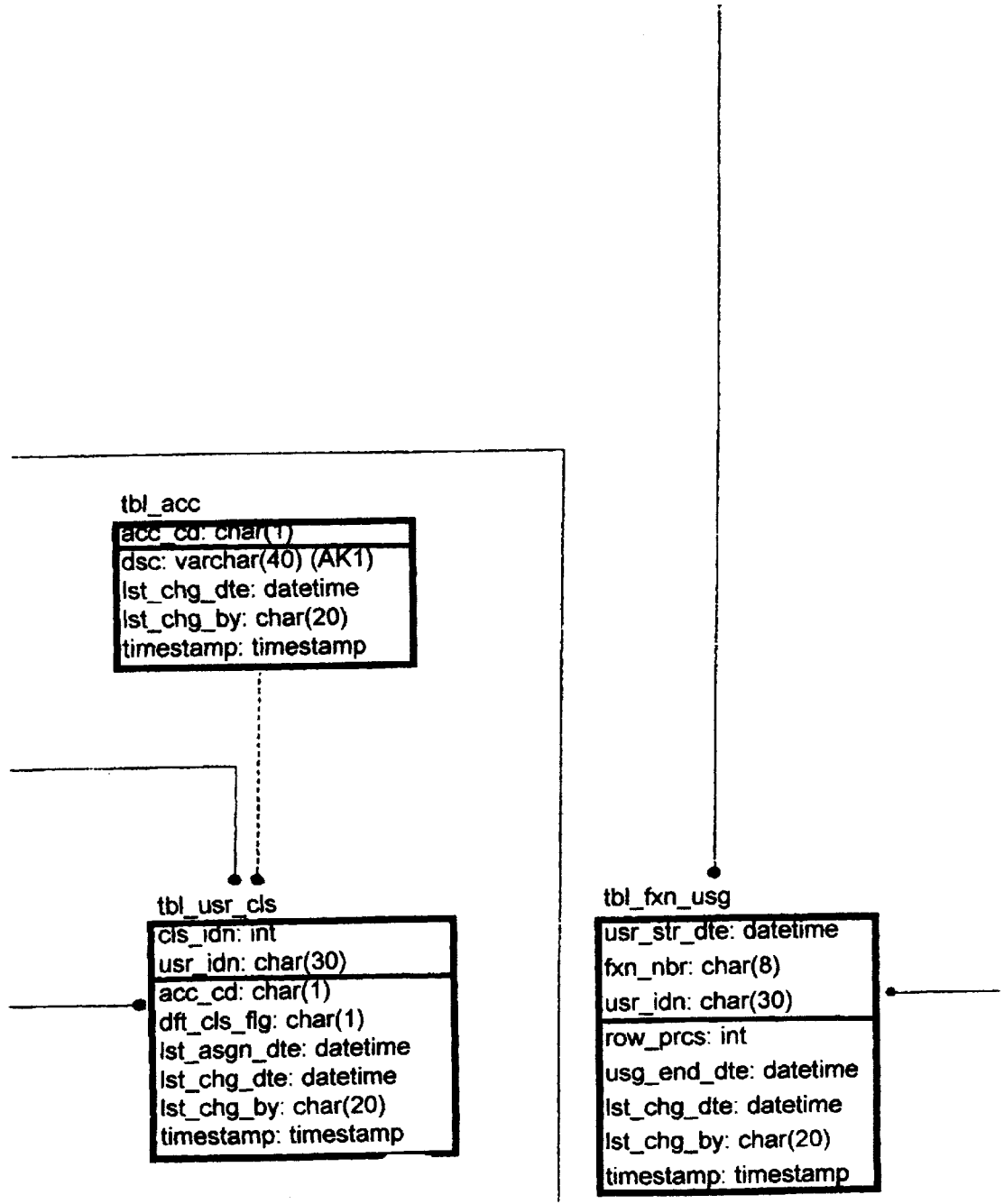
Figure 14H:
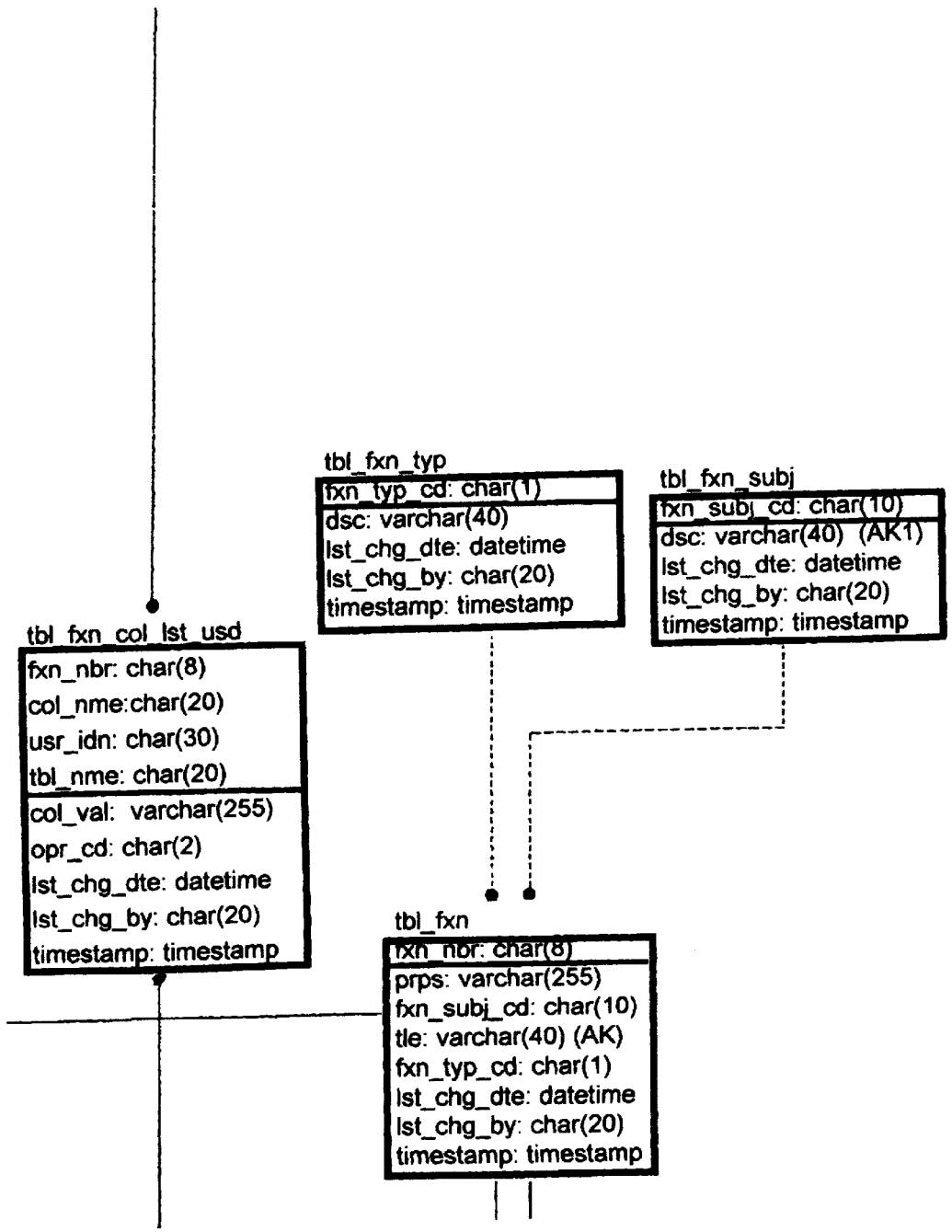
Figure 14I:
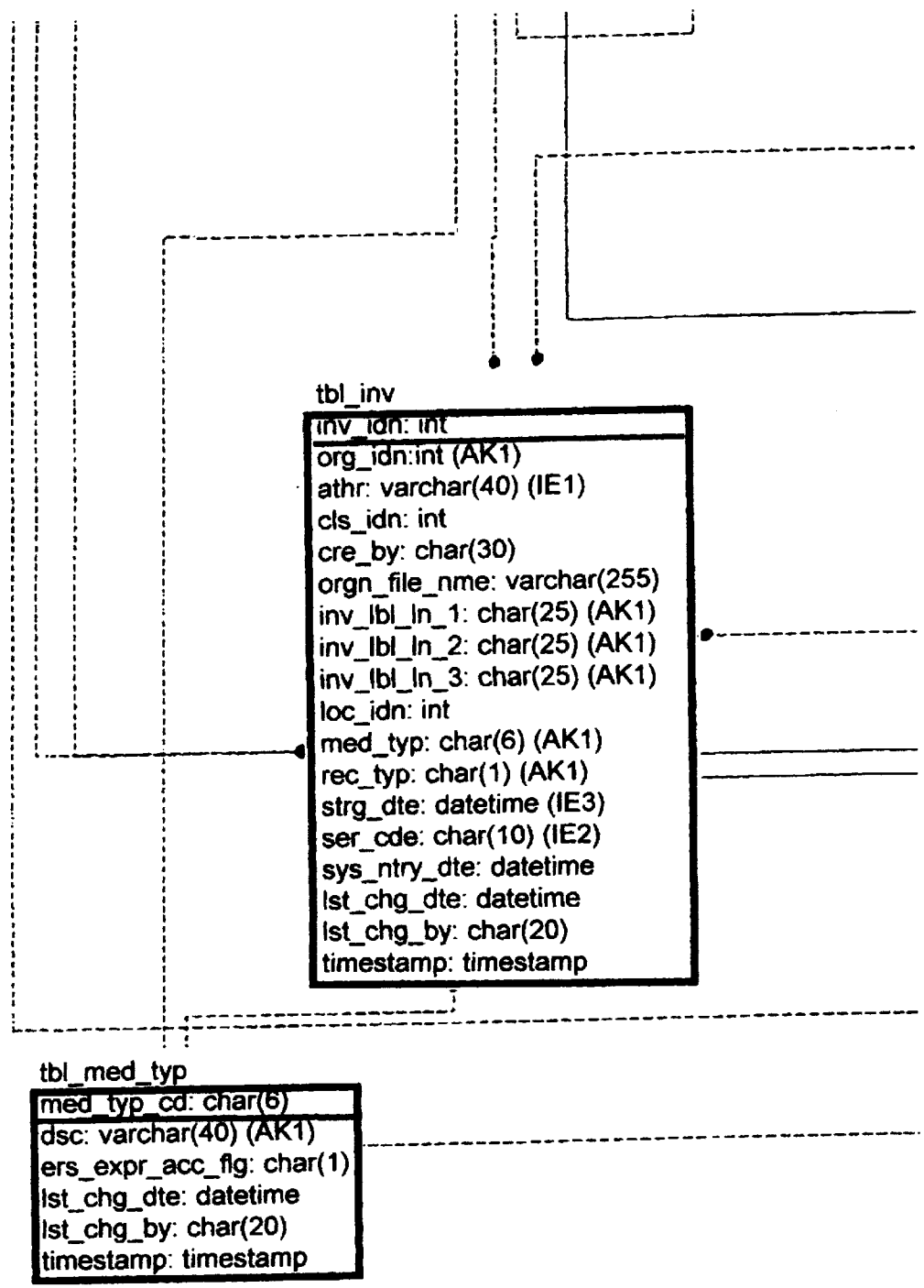
FIGS. 14I–14L show the third row of Figures forming the physical database model.
Figure 14J:
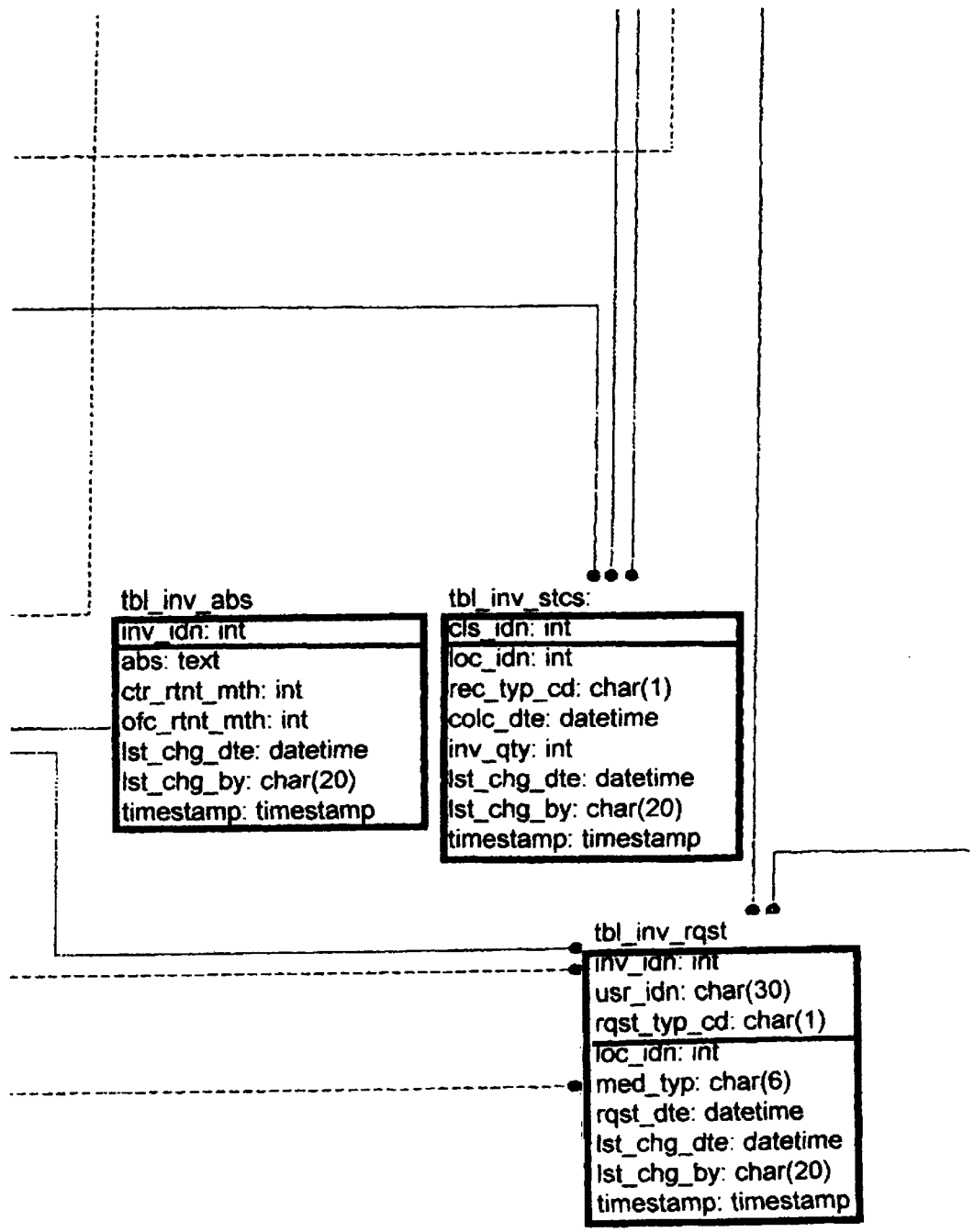
Figure 14K:
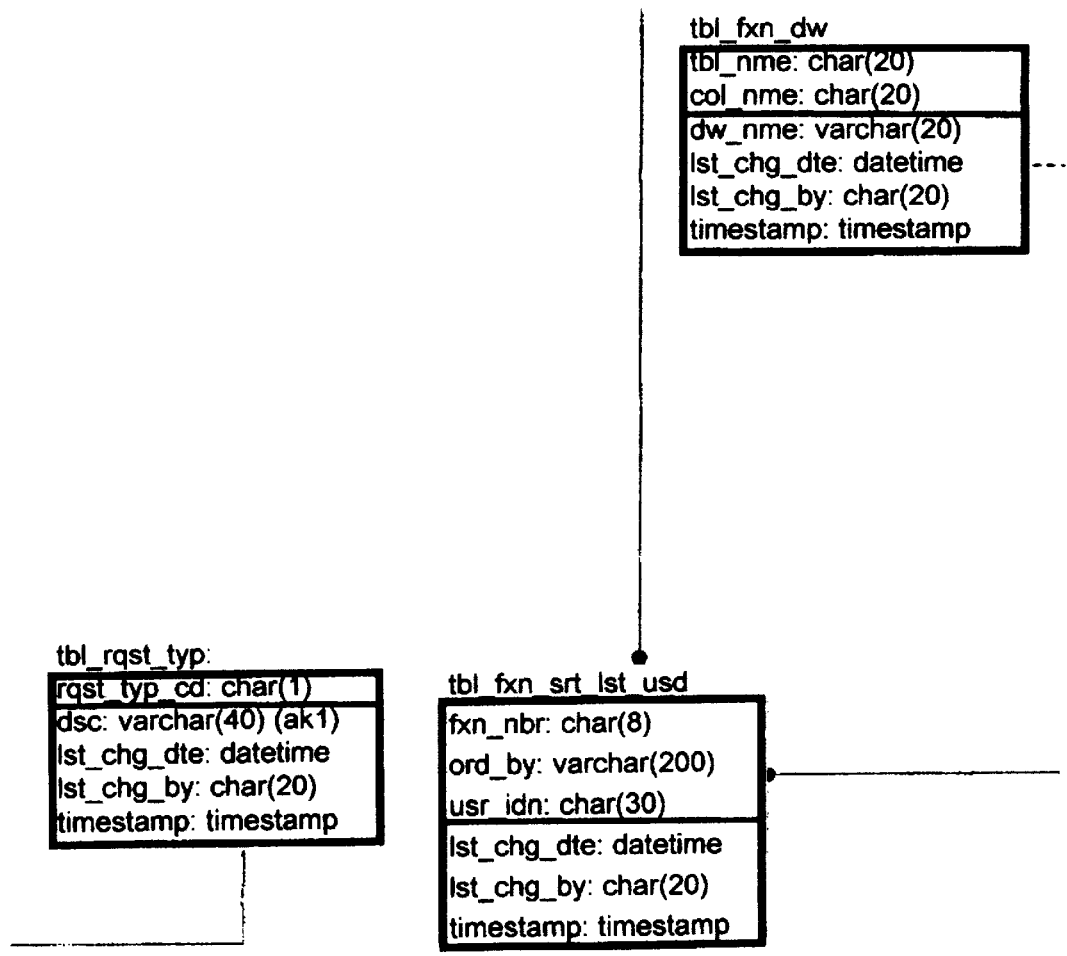
Figure 14L:
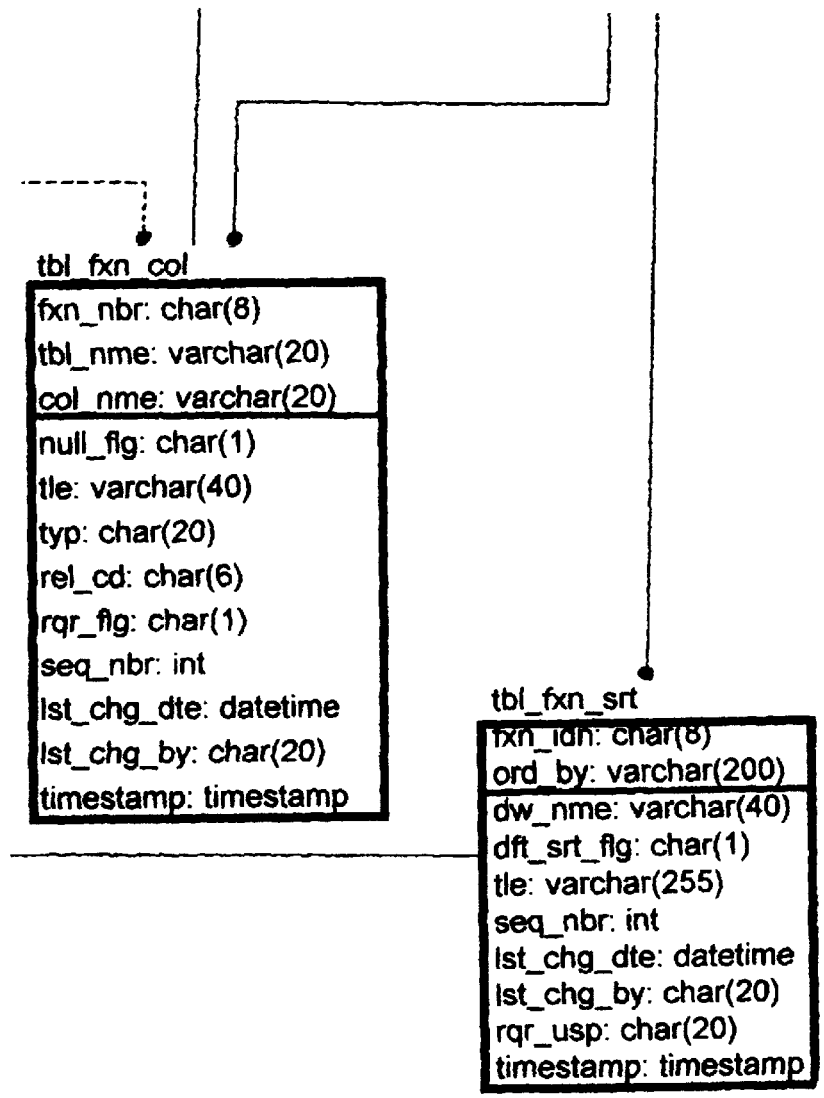

A component of a business process model is a node tree diagram. FIG. 8 shows the major activities associated with an application. FIGS. 9 through 11 show the node tree diagrams for ERS.

Database Design

The application will store its information in a set of relational tables. The total size of the database is expected to be approximately 500 Megs of disk space for a 300,000 inventory items. There will be roughly 1,200 total users, about 300 will be activity at any point in time.

Entity Definitions

The nature of each table in the database is described in the following entity definitions.

| Entity Name | Entity Definition |
|---|---|
| Access | The purpose of this entity is to store the access codes and descriptions. Access codes are select, update, insert, and deleted. |
| Class | The purpose of this entity is to store the all the information about a classification. This information contains classification code, title, retention periods, record type, sensitivity, etc. |
| Data Dictionary | The purpose of this entity is to store entity, attribute, and physical column information. This entity is used to support data dictionary reporting. |
| Function | The purpose of this entity is to store a valid list of system functions. System functions are window objects such as reports, updates, inquiries, interfaces, etc. |
| Function Column | The purpose of this entity is to store a valid list of columns than can be used to limit retrieval of a reporting function. |
| Function Column Last Used | The purpose of the last used function column entity is to record the selection criteria chosen by a specific user when a report was run. This entity supports storing the last query parameters applied by a user for a given report. |
| Function Data Window | |
| Function Sort | The purpose of this entity is to store a valid list of storing options that can be applied to a reporting function. |
| Function Sort Last Used | The purpose of the last used function sort entity is to record what sort sequence a user requested the last time they ran a specific report. This entity support recalling the last query for a report and user. |
| Function Subject | The purpose of this entity is to define what area of interest, for the user, the function relates to. |
| Function Type | The purpose of this entity is to store a valid list of function types. Function types are used to group functions together. Function types are reports, updates, interfaces, etc. |
| Function Usage | The purpose of this entity is to track who has accessed a function of the system and when. This entity could be used as a basis for activity analysis and usage charge back costing. |
| Inventory | The purpose of this entity is to store information about an item in inventory. The information includes title, date stored, media, classification, etc. |
| Inventory Abstract | |
| Inventory Request | The purpose of this entity is to store requests to move inventory from one form of media to another. For example, request to move documents from disk to tape. Once the media has been moved, the request is deleted. No past history of media requests are stored. |
| Inventory Statistics | The purpose of this entity is to store the quantity of items in inventory for each class, record type, level one location, and month. These statistics can be used to determine if classifications are being properly applied. |
| Location | The purpose of this entity is to store a valid list of locations. Locations can be storage areas, buildings, property, shelves, drawers, etc. |
| Location Type | The purpose of this entity is to store valid location types. Location types are building, floor, aisle, storage area, shelf, property number, drawer, etc. The location type also denotes what level of the hierarchy the location can be found. |
| Media Type | The purpose of this entity is to stare a valid list of media types and descriptions. Media are hardcopy, disk, tape, CD, microfiche, etc. |
| Object Identification | The purpose of this entity is to store the last identification number assigned to a table. For example, the last class identification assigned to the class table. |
| Organization | The purpose of this entity is store a valid list of companies, departments, and cost centers. |
| Organization Type | The purpose of this entity is to store a valid list of organization types. For example, company, department, cost center are all organization type. This entity also defines what level of the organization hierarchy the organization will be found on. |
| Record Type | The purpose of this entity is to store the valid record types and their descriptions. Valid record types would be official and informational. |
| Request Type | the purpose of this entity is to store a valid list of inventory request type codes and descriptions. Inventory request types are to change media or to move to or from offsite storage. |
| Retention Reference | The purpose of the retention reference entity is to store the text of the law or regulation that governs a set of classes and their retention periods. |
| Retention Start | The purpose of this entity is to store a valid list of retention type codes and |

| Entity Name | Entity Definition |
|---|---|
| | descriptions. Retention types define when a record's retention period begins. |
| Sensitivity | The purpose of this entity is to store a valid list of sensitivity codes and descriptions. Sensitivities are confidential, secrete, etc. |
| Synonym | The purpose of this entity is to store alternative names for a classification. A synonym may be a classification code, a portion of the classification name, or a commonly used alternative to the classification name. |
| User | The purpose of this entity is to store a list of valid users for the system. |
| User Class | The purpose of this entity is to store every classification the user has access to and may assigned to documents. The classes are initially set up by the Departmental Coordinator. |

Entity Relationship Diagram

FIG. 12 is the entity relationship diagram. Its purpose is to provide a high level view of the database and its structure. The diagram shows each table in the system and how it relates to other tables. The solid lines between entities denotes identifying relationships. The dotted lines denotes non-identifying relationships.

Attribute Definitions

Following are the attribute definitions. Attributes are the columns that can be found in each entity or table within the database. The definitions are sorted by entity name and attribute name.

| Entity Name | Attribute Name | Attribute Definition |
|---|---|---|
| Access | Access Code | User assigned identification code. The access code defines what a user can do to a database object. Access codes are S = Select, U = Update, I = Insert, D = Delete. If a user has an access code of I or D then they can automatically do U or S. If a user has an access code of U then they can also do S. |
| | Access Description | Long name, description, or title for code. The access description stores the meaning of the access code. For example, insert, update, delete, and select are all descriptions of access codes. |
| | Last Changed Date | |
| | Last Changed By | |
| | Timestamp | |
| Class | Class Identification | System assigned identification number. The class identification is the unique identifier for the classification. This integer is a system assigned value, not user assigned. |
| | Abstract | Description of classification. The abstract is the legal definition of the classification. |
| | Class Code | User assigned identification code. The class code is a 10 character user assigned classification code. The first two characters of the class code are the major class. The third and fourth characters are the primary class. The fifth and sixth characters are the secondary class. |

| Entity Name | Attribute Name | Attribute Definition |
|---|---|---|
| | | Characters 7–8 represent the next relationship level. Characters 9–10 represent the last relationship level. |
| | Classification Title | Long name or title for class. The classification title is the name of the class code. |
| | Classification Title Extended | Class title and all parent class titles. The extended classification title contains the titles of all the parent classifications plus this classification's title. For example, if this classification code is ACAP, then the extended classification title is 'Accounting, Payables'. |
| | Center Retention Months | Quantity of months in offsite storage. The center retention months is the quantity of months an inventory item is held in a records center or off site storage facility. The office retention plus the center retention months equals the total retention period for a classification. |
| | Organization Identification | System assigned identification number. The organization identification is the unique identification for a company, department, or cost center. The integer value is system assigned, not user assigned. Organizations own users and classifications. |
| | Created By | User ID of person who created the class. The created by column contains the user identification of the Records Manager who created the classification. |
| | Media Type Code | User assigned identification code for media type. The media type code defines what form the inventory item is stored in. For example, DISK = hard disk, FLOPPY = floppy disk, CD = CD ROM, TAPE = magnetic table, FICH = microfich, PAPER = hardcopy. |
| | Office Retention Months | Quantity of months stored on site. The office retention months is the quantity of months an inventory item is held in an office storage area before it is moved to a long term, off site storage facility. The office retention plus the center retention months equals the total retention period for a classification. |
| | Parent Class Identification | Owning parent classification. The parent class identification is the identification number to the class that owns this one. |
| | Record Type Code | User assigned identification code. The record type code defines importance to a classification. For example, I = informational and O = official record types. Inventory items assigned a classification having an official record type can only be deleted by a Department Coordinator. |
| | Retention Reference | User assigned identification number. The retention reference column is used to store the identification number for the reference document or law governing a set of classes and their retention periods. For example, '26 CFR 1.6001.1' is a document |

-continued

| Entity Name | Attribute Name | Attribute Definition |
|---|---|---|
| | Retention Start Code | defining how checks ought to stored. User assigned identification code. The retention start code defines when the retention period of the document starts. The quantity of months an inventory item is held may start when the document first created, or it may start when the document is moved to an off site storage facility. |
| | Sensitivity Code | User assigned identification code. The sensitivity code defines the security associated with a classification. For example, TS = top secrete and CO = confidential are sensitivity codes. |
| | Vital Flag | Vital record (Y = yes, N = no). The vital flag is a yes/no column denoting if the classification involves vital documents. Vital documents are those records whose loss would have a financial impact on the organization. |
| | Last Changed Date | |
| | Last Changed By | |
| | Timestamp | |
| Data Dictionary | Entity Name | Entity or long table name. The name of the entity in the logical data model. In most cases, the entity name is similar to the long name for the table in the database. |
| | Attribute Name | Attribute or long column name. The attribute name from the logical data model. In most cases, this is the long name for the column. |
| | Attribute Definition | Attribute description or meaning. The attribute definition contains the description, meaning, or purpose of the attribute. |
| | Column Name | SQL column name. The column name is the physical name for the attribute in the SQL database. |
| | Datatype | SQL column datatype. The datatype is the physical format of the column in the SQL database. |
| | Entity Definition | Entity description or meaning. The entity definition contains the description, meaning, or purpose of the entity. |
| | Null Option | SQL null option. The null option is a flag denoting if a column must always contain data or not. If the null option equals 'Yes' then the column does not have to contain data all the time. If the null option is set to 'No' then the column must always have data in it. |
| | User Defined Datatype Name | |
| | Last Changed Date | |
| | Last Changed By | |
| | Timestamp | |
| Function | Function Number | User assigned identification number. The function number is the unique identification of a function of the system. Function numbers are assigned by programmers. For example, ERS110 could be a function number assigned to a performance report. Function numbers 000 to 099 are utility functions, 100 to 199 are performance or management reports, 200 to 299 |

-continued

| Entity Name | Attribute Name | Attribute Definition |
|---|---|---|
| | | are operational reports, 300 to 399 are audit reports, 400 to 499 are static table listings, 500 to 599 are user functions, 600 to 699 are interface functions, 700 to 799 are dynamic table update functions, 800 to 899 are static table update functions, and 900 to 999 are administration functions. |
| | Function Purpose | Description or purpose of function. The function purpose is a text column defining how the report or update screen ought to be applied by the user. |
| | Function Subject Code | User assigned identification code. The function subject code defines what area of interest, for the user, the function relates to. For example, MANAGEMENT = management performance reports. The function subject code uniquely identifies subjects. Function subjects, types, and titles are used to build menus. |
| | Function Title | Title or name of function. The function title is the name of the function as it appears at the top of the window or in the menu. For example 'User Maintenance' is a function title. |
| | Function Type Code | User assigned identification code. The function type code is a way of grouping like functions together. For example R = report, U = update, M = menu, T = utility, I = interface are all function type codes. Function types, subject, and titles can be used to build menus. |
| | Last Changed Date | |
| | Last Changed By | |
| | Timestamp | |
| Function Column | Function Number | User assigned identification number. The function number is the unique identification of a function of the system. Function numbers are assigned by programmers. For example, ERS110 could be a function number assigned to a performance report. Function numbers 000 to 099 are utility functions, 100 to 199 are performance or management reports, 200 to 299 are operational reports, 300 to 399 are audit reports, 400 to 499 are static table listings, 500 to 599 are user functions, 600 to 699 are interface functions, 700 to 799 are dynamic table update functions, 800 to 899 are static table update functions, and 900 to 999 are administration functions. |
| | Table Name | SQL table name. The table name is the SQL table or view name that will be used as part of a WHERE phrase to limit report retrieval. |
| | Column Name | SQL column name. The column name is the SQL table or view column name that will be used as part of a WHERE phrase to limit report retrieval. For example, DPT_NBR is the department number column name. |
| | Column Null Flag | Column contains NULL's, Y = yes, N = no. The column null flag is used to state if the WHERE |

-continued

| Entity Name | Attribute Name | Attribute Definition |
|---|---|---|
| | | phrase should be constructed to search for null values for the column. For example, if the column name is DPT_NBR and the column null flag is set to Y = yes, then the WHERE phrase should be WHERE DPT_NBR = NULL. |
| | Column Title | Long name or title of column. The column title is what the users sees when selecting from a list of columns to use to limit report retrieval. For example, when the user wishes to pick the DPT_NBR column, they would see 'Department Number'. |
| | Column Type | SQL datatype (DATE, INT, CHAR, FLOAT, YESNO). The column type is a code defining the columns datatype. For example, DATE, INT, CHAR, FLOAT are all column types. The column type dictates which dialogue box appears displaying values for the column. |
| | Relationship Code | Column/value relation (EQUAL, LIKE, BOTH). The relationship code defines if the relationship in the WHERE phase could be an equality, a string search, or both. For example, if the relationship code is EQUAL then the relationship between the column name and its values in the WHERE phrase is IN for character type columns, BETWEEN for nun-null numeric columns, and = for null numeric columns. If the relationship code is LIKE then the relationship between the column name and its values is LIKE. If the relationship code is BOTH, then the user can choose either an equality or string search relationship. |
| | Required Flag | Column value required (Y = yes, N = no). The required flag denotes if the user must use this column to limit retrieval. This column helps prevent the user from constructing a report request that extracts every row from the database by forcing them to have a WHERE phrase on at least one column name. |
| | Sequence Number | Sort sequence number. The sequence number is a character column used to sort the column titles for display on the screen. The sequence number allows the system to display a list of column names in some other sort order besides alphabetically by column title. |
| | Last Changed Date Last Changed By Timestamp | |
| Function Column Last Used | Function Number | User assigned identification number. The function number is the unique identification of a function of the system. Function numbers are assigned by programmers. For example, ERS110 could be a function number assigned to a performance report. Function numbers 000 to 099 are utility functions, 100 to 199 are performance or management reports, 200 to 299 are operational reports, 300 to 399 are audit reports, 400 to 499 are static table listings, 500 to 599 are user functions, 600 to 699 are interface functions, 700 to 799 are dynamic table update functions, 800 to 899 are static table update functions, and 900 to 999 are administration functions. |
| | Column Name | SQL column name. The column name is the SQL table or view column name that will be used as part of a WHERE phrase to limit report retrieval. For example, DPT_NBR is the department number column name. |
| | User Identification | Logon user identification. The user identification is the SQL database name for the user. Normally, it is the user's first name initial and full last name. |
| | Table Name | SQL table name. The table name is the SQL table or view name that will be used as part of a WHERE phrase to limit report retrieval. |
| | Column Value | Column values last used. This text column stores the 'right hand side' of a SQL WHERE phrase. It contains the list of values desired for column when a specific report was last run by a given user. For example, if a user had requested a set of departments to appear on a report the last time it was run, then this column would contain that list of departments. |
| | Operator Code | Code to indicate exact value or list of values. Determines whether the user can enter a value or select from a list of values. |
| | Last Changed Date Last Changed By Timestamp | |
| Function Data Window | Table Name | SQL table name. The table name is the SQL table or view name that will be used as part of a WHERE phrase to limit report retrieval. |
| | Column Name | SQL column name. The column name is the SQL table or view column name that will be used as part of a WHERE phrase to limit report retrieval. For example, DPT_NBR is the department number column name. |
| | Data Window Name | Data Window Used for selection of column for SQL table. |
| | Last Changed Date Last Changed By Timestamp | |
| Function Sort | Function Number | User assigned identification number. The function number is the unique identification of a function of the system. Function numbers are assigned by programmers. For example, ERS110 could be a function number assigned to a performance report. Function numbers 000 to 099 are utility functions, 100 to 199 are performance or management reports, 200 to 299 are operational reports, 300 to 399 are audit reports, 400 to 499 are static table listings, 500 to 599 are user functions, 600 to 699 are interface functions, 700 to 799 are |

-continued

| Entity Name | Attribute Name | Attribute Definition |
|---|---|---|
| | | dynamic table update functions, 800 to 899 are static table update functions, and 900 to 999 are administration functions. |
| | Order By | SQL ORDER BY and/or GROUP BY. The order by column contains the SQL GROUP BY and/or ORDER BY phrase for the report request. |
| | Data Window Name | Power Builder Data Window name. The Data Window name is the name of the Power Builder Data Window name that should be displayed when a particular sort is requested by the user. Different Data Windows are used for different sorts because there may be different subtotaling on the same report depending upon how it is sorted. |
| | Default Sort Flag | Default sort (Y = yes, N = no). The default sort flag is a yes/no column denoting what sort will be applied to the report if the user does not select one. |
| | Order By Title | Title or long name of the sort. The order by title is what the user sees when selecting from a list of sort sequences to apply to a report. For example, the order by column value may be ORDER BY CO_NBR, DPT_NBR, CST_CTR_NBR. The order by title would be 'By Company, Department, and Cost Center Numbers'. |
| | Sequence Number | Sort sequence number. The sequence number column is used to sort the order by titles in some other sequence other than alphabetically by order by title. |
| | Last Changed Date Last Changed By Timestamp | |
| | Requires Stored Procedure | Required stored procedure name. The purpose of this column is to record the name of any stored procedure required to generate a report output. Some reports, because of their complexity, can not be created without the use of an SQL stored procedure. If a stored procedure is needed, its name would be found in this column. |
| Function Sort Last Used | Function Number | User assigned identification number. The function number is the unique identification of a function of the system. Function numbers are assigned by programmers. For example, ERS110 could be a function number assigned to a performance report. Function numbers 000 to 099 are utility functions, 100 to 199 are performance or management reports, 200 to 299 are operational reports, 300 to 399 are audit reports, 400 to 499 are static table listings, 500 to 599 are user functions, 600 to 699 are interface functions, 700 to 799 are dynamic table update functions, 800 to 899 are static table update functions, and 900 to 999 are administration functions. |
| | Order By | SQL ORDER BY and/or GROUP BY. The order by column contains the SQL GROUP BY and/or ORDER BY phrase for the report request. |
| | User Identification | Logon user identification. The user identification is the SQL database name for the user. Normally, it is the user's first name initial and full last name. |
| | Last Changed Date Last Changed By Timestamp | |
| Function Subject | Function Subject Code | User assigned identification code. The function subject code defines what area of interest, for the user, the function relates to. For example, MANAGEMENT = management performance reports. The function subject code uniquely identifies subjects. Function subjects, types, and titles are used to build menus. |
| | Function Subject Description | Long name, description or title for code. The function subject description is the long name for the subject. For example management performance reports, operational reports, utility, user functions are all subject descriptions. |
| | Last Changed Date Last Changed By Timestamp | |
| Function Type | Function Type Code | User assigned identification code. The function type code is a way of grouping like functions together. For example R = report, U = update, M = menu, T = utility, I = interface are all function type codes. Function types, subject, and titles can be used to build menus. |
| | Function Type Description | Long name, description, or title for code. The function type description is the meaning of the function type code. For example, report, update, menu, utility, and interface are all function type descriptions. |
| | Last Changed Date Last Changed By Timestamp | |
| Function Usage | Usage Start Date | Date/time function started being used. The usage start date is the date and time the update or report was activated. |
| | Function Number | User assigned identification number. The function number is the unique identification of a function of the system. Function numbers are assigned by programmers. For example, ERS110 could be a function number assigned to a performance report. Function numbers 000 to 099 are utility functions, 100 to 199 are performance or management reports, 200 to 299 are operational reports, 300 to 399 are audit reports, 400 to 499 are static table listings, 500 to 599 are user functions, 600 to 699 are interface functions, 700 to 799 are dynamic table update functions, 800 to 899 are static table update functions, and 900 to 999 are administration functions. |

-continued

| Entity Name | Attribute Name | Attribute Definition |
|---|---|---|
| | User Identification | Logon user identification. The user identification is the SQL database name for the user. Normally, it is the user's first name initial and full last name. |
| | Rows Processed | Quantity of rows retrieved or updated. The quantity of rows retrieved for a reporting function or the quantity of rows inserted, updated, or deleted for an update function. |
| | Usage End Date | Date/time function stopped being used. The usage end date is the date and time the function completed processing the rows. The difference between the usage start and end dates is the seconds required to retrieve the report rows or post the changes to the database for an update function. |
| | Last Changed Date | |
| | Last Changed By | |
| | Timestamp | |
| Inventory | Inventory Identification | System assigned identification number. The inventory identification is the unique identifier for a document. It is a system assigned integer, not user assigned. |
| | Organization Identification | System assigned identification number. The organization identification is the unique identification for a company, department, or cost center. The integer value is system assigned, not user assigned. Organizations own users and classifications. |
| | Author | Document written-by user identification. Identification for writer of the document. It can be any value. |
| | Class Identification | System assigned identification number. The class identification is the unique identifier for the classification. This integer is a system assigned value, not user assigned. |
| | Created By | Logon user identification. The user identification is the SQL database name for the user. Normally, it is the user's first name initial and full last name. |
| | Original File Name | PC file name and extension. The name of the computer file from which the inventory item originated. |
| | Inventory Label Line 1 | First line of label. The inventory label consists of three columns that appear on the label for the document, file folder, or box. The first label line typically contains a name. For example, vendor name, customer name, person name, etc. for the document. |
| | Inventory Label Line 2 | Second line of label. The inventory label consists of three columns that appear on the label for the document, file folder, or box. The second label line typically contains a geography. |
| | Inventory Label Line 3 | Third line of label. The inventory label consists of three columns that appear on the label for the document, file folder, or box. The third label line typically contains numbers or dates. For example, part numbers, purchase order numbers, contract numbers, employee numbers, etc. |
| | Location Identification | System assigned identification number. The location identification is the unique identifier for a shelf or drawer within an aisle or file cabinet in a storage area. It is a system assigned integer, not user assigned. |
| | Media Type Code | User assigned identification code for media type. The media type code defines what form the inventory item is stored in. For example, DISK = hard disk, FLOPPY = floppy disk, CD = CD ROM, TAPE = magnetic table, FICH = microfich, PAPER = hardcopy. |
| | Record Type Code | User assigned identification code. The record type code defines importance to a classification. For example, I = informational and O = official record types. Inventory items assigned a classification having an official record type can only be deleted by a Department Coordinator. |
| | Storage Date | Date entered into the Electronic Records System. The storage date is the date and time the inventory item was placed into the system. |
| | Series Code | Code to flag special documents. A 10 character code applied by the user to help flag documents that are special to them. |
| | System Entry Date | Date Inventory was entered into the system. It can never be changed. |
| | Last Changed Date | |
| | Last Changed By | |
| | Timestamp | |
| Inventory Abstract | Inventory Identification | System assigned identification number. The inventory identification is the unique identifier for a document. It is a system assigned integer, not user assigned. |
| | Abstract | Long description of inventory item. The abstract column contains a long textual description of the inventory item. |
| | Center Retention Months | Quantity of months in offsite storage. The center retention months is the quantity of months an inventory item is held in a records center or off site storage facility. The office retention plus the center retention months equals the total retention period for a classification. |
| | Office Retention Months | Quantity of months stored on site. The office retention months is the quantity of months an inventory item is held in an office storage area before it is moved to a long term, off site storage facility. The office retention plus the center retention months equals the total retention period for a classification. |
| | Last Changed Date | |
| | Last Changed By | |
| | Timestamp | |
| Inventory Request | Inventory Identification | System assigned identification number. The inventory identification is the unique identifier for a document. It is a |

-continued

| Entity Name | Attribute Name | Attribute Definition |
|---|---|---|
| | User Identification | system assigned integer, not user assigned. Logon user identification. The user identification is the SQL database name for the user. Normally, it is the user's first name initial and full last name. |
| | Request Type Code | User assigned identification code. The request type code is a user created code to define what needs to be done to an inventory item. Request type codes are M = Change Media, R = Retrieve from storage facility, S = sent to storage facility, T = Retire inventory item. |
| | Location Identification | System assigned identification number. The location identification is the unique identifier for a shelf or drawer within an aisle or file cabinet in a storage area. It is a system assigned integer, not user assigned. |
| | Media Type Requested | User assigned identification code for media type. The media type code defines what form the inventory item is stored in. For example, DISK = hard disk, FLOPPY = floppy disk, CD = CD ROM, TAPE = magnetic table, FICH = microfich, PAPER = hardcopy. |
| | Request Date | Date inventory request was created. The request date is the date and time a user has requested and inventory item be moved from one media to another. |
| | Last Changed Date Last Changed By Timestamp | |
| Inventory Statistics | Class Identification | System assigned identification number. The class identification is the unique identifier for the classification. This integer is a system assigned value, not user assigned. |
| | Location Identification | System assigned identification number. The location identification is the unique identifier for a shelf or drawer within an aisle or file cabinet in a storage area. It is a system assigned integer, not user assigned. |
| | Record Type Code | User assigned identification code. The record type code defines importance to a classification. For example, I = informational and O = official record types. Inventory items assigned a classification having an official record type can only be deleted by a Department Coordinator. |
| | Collection Date | Date statistics were collected. The date the count of inventory items was collected. The quantity of inventory items by class and record type will be collected once a month or once a quarter. |
| | Inventory Quantity | Quantity of inventory items found. The inventory quantity contains the number of inventory items found for a class and record type at a given point in time. |
| | Last Changed Date Last Changed By Timestamp | |
| Location | Location Identification | System assigned identification number. The location identification is the unique identifier for a shelf or drawer within an aisle or file cabinet in a storage area. It is a system assigned integer, not user assigned. |
| | Location Description | Long name, description, or title. The location description is the meaning of a location number. For example, 'Third drawer down' or 'Fourth shelf up' are location descriptions. |
| | Location Number | User assigned identification number. The location number is the user assigned identifier for a file cabinet drawer or shelf. |
| | Location Type Code | User assigned identification code for location type. The location type code is a user assigned code for the type of document storage facility. For example, BL = Building, FA = File area, PR = Property, SH = Shelf, AI = Aisle. |
| | Parent Location Identification | Parent or owner of location. The parent location identification is the unique identifier for building or file area that owns the location. |
| | Last Changed Date Last Changed By Timestamp | |
| Location Type | Location Type Code | User assigned identification code for location type. The location type code is a user assigned code for the type of document storage facility. For example, BL = Building, FA = File area, PR = Property, SH = Shelf, AI = Aisle. |
| | Archive Facility Flag | Archive facility (offsite storage) Y/N flag. The archive facility flag is a yes/no column used to define if the location is found in an archive facility. An archive facility would be an offsite warehouse, for example. |
| | Location Type Description | Long name or title of location type. The location description is the meaning of the location type code. |
| | Level Number | Location hierarchy level number. The level number defines what level of the location hierarchy this location can be found. Level one is the top level of the hierarchy and level number five is the bottom. |
| | Last Changed Date Last Changed By Timestamp | |
| Media Type | Media Type Code | User assigned identification code for media type. The media type code defines what form the inventory item is stored in. For example, DISK = hard disk, FLOPPY = floppy disk, CD = CD ROM, TAPE = magnetic table, FICH = microfich, PAPER = hardcopy. |
| | Media Type Description | Long name description, or title. The media type description adds meaning to the media type code. For example, 'Hardcopy' and 'Magnetic Tape' are media type descriptions. |
| | ERS Express Access Flag | File name required yes/no. The purpose of this column is to record whether a document being entered for a given media type should have |

-continued

| Entity Name | Attribute Name | Attribute Definition |
|---|---|---|
| | | a file name entered also. For example, if a document is entered into the system that has a media type of 'hard disk', and the file name required flag is set to 'yes', then the system will prompt the user to input a file name for the document. If the file name required flag is set to 'no' then the system will not prompt the user for a file name when they input information about a document. |
| | Last Changed Date | |
| | Last Changed By | |
| | Timestamp | |
| Object Identification | Object Name | Name of database object (table or view). The object name is the SQL database name for a table or view. |
| | Identification | Last system assigned identification number. The identification column contains the last or highest integer value assigned to the identification column in the table. For example, if the table name was tbl_dpt and the identification column contains 145, then the highest identification number assigned thus far to departments is 145. |
| | Last Changed Date | |
| | Last Changed By | |
| | Timestamp | |
| | Filler 1 | This is a character field of 255 bytes used to pad one row in the identification table out to one page long. This technique is use because SQL Server only has page locking, not row locking. |
| | Filler 2 | This is a character field of 255 bytes used to pad one row in the identification table out to one page long. This technique is use because SQL Server only has page locking, not row locking. |
| | Filler 3 | This is a character field of 255 bytes used to pad one row in the identification table out to one page long. This technique is use because SQL Server only has page locking, not row locking. |
| | Filler 4 | This is a character field of 255 bytes used to pad one row in the identification table out to one page long. This technique is use because SQL Server only has page locking, not row locking. |
| | Filler 5 | This is a character field of 255 bytes used to pad one row in the identification table out to one page long. This technique is use because SQL Server only has page locking, not row locking. |
| | Filler 6 | This is a character field of 255 bytes used to pad one row in the identification table out to one page long. This technique is use because SQL Server only has page locking, not row locking. |
| | Filler 7 | This is a character field of 255 bytes used to pad one row in the identification table out to one page long. This technique is use because SQL Server only has page locking, not row locking. |
| | Filler 8 | This is a character field of 151 bytes used to pad one row in the |

-continued

| Entity Name | Attribute Name | Attribute Definition |
|---|---|---|
| | | identification table out to one page long. This technique is use because SQL Server only has page locking, not row locking. |
| Organization | Organization Identification | System assigned identification number. The organization identification is the unique identification for a company, department, or cost center. The integer value is system assigned, not user assigned. Organizations own users and classifications. |
| | Organization Code | User assigned identification code. The organization code is a user assigned identification for a company, department, or cost center. |
| | Organization Name | Long name, description, or title. The organization name is the meaning for the organization code. For example, 'Account Payable', 'Payroll', 'Inside Sales' are all organization names for cost centers. |
| | Organization Type Code | User assigned organization type code. The organization type code defines if an organization is a company, department, or cost center. |
| | Parent Organization Identification | Parent owner for organization. The parent organization identification is the unique identification for a company, or department that owns the organization. |
| | Last Changed Date | |
| | Last Changed By | |
| | Timestamp | |
| Organization Type | Organization Type Code | User assigned organization type code. The organization type code defines if an organization is a company, department, or cost center. |
| | Organization Type Description | Long name, description, or title. The organization type description is the meaning of the organization type code. |
| | Level Number | Organization hierarchy level number. The level number defines at what level of the organization hierarchy this organization (company, department, or cost center) can be found. Level number one is the top of the hierarchy and level number five is the bottom. |
| | Last Changed Date | |
| | Last Changed By | |
| | Timestamp | |
| Record Type | Record Type Code | User assigned identification code. The record type code defines importance to a classification. For example, I = informational and O = official record types. Inventory items assigned a classification having an official record type can only be deleted by a Department Coordinator. |
| | Record Type Description | Long name, description, or title. The record type description adds meaning to the record type code. |
| | Record Type Procedure | Office policy for record type. The record type procedure states the office policy associated with the record type. For example, 'Inventory items assigned a classification having an official |

| Entity Name | Attribute Name | Attribute Definition |
|---|---|---|
| | | record type can only be deleted by a Department Coordinator'. |
| | Last Changed Date Last Changed By Timestamp | |
| Request Type | Request Type Code | User assigned identification code. The request type code is a user created code to define what needs to be done to an inventory item. Request type codes are M = Change Media, R = Retrieve from storage facility, S = sent to storage facility, T = Retire inventory item. |
| | Request Type Description | Long name, description, or title. The request type description defines the meaning for the request type code. |
| | Last Changed Date Last Changed By Timestamp | |
| Retention Reference | Retention Reference | User assigned identification number. The retention reference column is used to store the identification number for the reference document or law governing a set of classes and their retention periods. For example, '26 CFR 1.6001.1' is a document defining how checks ought to stored. |
| | Abstract | Long description of reference. The abstract column contains a paragraph about the reference. This paragraph states the policy for storing a type of document. |
| | Last Changed Date Last Changed By Timestamp | |
| Retention Start | Retention Start Code | User assigned identification code. The retention start code defines when the retention period of the document starts. The quantity of months an inventory item is held may start when the document first created, or it may start when the document is moved to an off site storage facility. |
| | Retention Start Description | Long name, description, or title. The retention start description adds meaning to the retention start code. It is the office policy stating when the retention period begins for a document. |
| | Last Changed Date Last Changed By Timestamp | |
| Sensitivity | Sensitivity Code | User assigned identification code. The sensitivity code defines the security associated with a classification. For example, TS = top secrete and CO = confidential are sensitivity codes. |
| | Sensitivity Description | Long name, description, or title. The sensitivity description adds meaning to the sensitivity code. |
| | Last Changed Date Last Changed By Timestamp | |
| Synonym | Synonym Identification | System assigned identification number. The synonym identification is the unique identifier for the synonym. This integer is a system assigned value, not user assigned. |
| | Synonym Name | Name of synonym. The synonym name is the name of the synonym. |

| Entity Name | Attribute Name | Attribute Definition |
|---|---|---|
| | | Synonyms are alternate means to refer to a classification. Synonyms can be class codes, class names, or any value the user wishes. |
| | User Identification | Logon user identification. The user identification is the SQL database name for the user. Normally, it is the user's first name initial and full last name. |
| | Class Identification | System assigned identification number. The class identification is the unique identifier for the classification. This integer is a system assigned value, not user assigned. |
| | Keyword Flag | Corporate keyword (Y = yes, N = no). The keyword flag denotes if this synonym is a Corporate synonym. All synonyms have to be related to a Corporate keyword. |
| | Last Changed Date Last Changed By Timestamp | |
| User | User Identification | Logon user identification. The user identification is the SQL database name for the user. Normally, it is the user's first name initial and full last name. |
| | Default Location Identification | System assigned identification number. The location identification is the unique identifier for a shelf or drawer within an aisle or file cabinet in a storage area. It is a system assigned integer, not user assigned. |

Logical View

FIG. 13 is a logical view of the database. It shows all the entities or tables and their attributes or columns. The purpose of this diagram is to provide a more detailed picture of the database and its contents.

Standard Abbreviations

The following lists the standard abbreviations for database object and column names. Several of these abbreviations will be merged together to derive a name. For example, the user tables will be named 'tbl_usr'. The user's last name column will be called 'lst_nme'.

| | |
|---|---|
| abs | abstract |
| acc | access |
| adr | address |
| ctr | center |
| chg | change |
| cd | code |
| cst | cost |
| cls | class |
| col | column |
| cre | created |
| d | Data Window object |
| db | database |
| dw | Data Window control |
| def | default |
| dsc | description |
| dir | directory |
| dte | date |
| dur | duration |
| end | end |
| flg | flag |
| fst | first |
| fcn | function |
| grp | group |

| | |
|---|---|
| hst | history |
| idn | identification |
| inv | inventory |
| key | key |
| lst | last |
| loc | location |
| log | logon |
| mail | mail |
| med | media |
| mth | month |
| nbr | number |
| nme | name |
| off | office |
| obj | object |
| ord | order |
| org | organization |
| out | output |
| par | parent |
| phn | phone |
| psw | password |
| pro | procedure |
| pcs | processed |
| pps | purpose |
| rec | record |
| rel | relationship |
| rqs | request |
| rqr | require |
| ret | retention |
| row | rows |
| snt | sensitivity |
| seq | sequence |
| srt | sort |
| str | start |
| sts | status |
| sto | storage |
| stp | stop |
| sub | subject |
| syn | synonym |
| tbl | table |
| tm | time |
| tle | title |
| trg | trigger |
| typ | type |
| udt | user defined datatype |
| usg | usage |
| usp | user stored procedure |
| usr | user |
| vtl | vital |
| vw | view |
| vwb | base view |
| w | window |
| wrd | word |

Triggers

Triggers are business rules embedded in the database. These rules are activated every time a row is added, changed, or delete for a table. They can be used insure referential integrity, enforce security, and/or calculate values for columns. The triggers defined for this system are described below by table. Note, that referential integrity triggers are not listed. They are too numerous to display, but will be part of the application.

Class Table

Insert Trigger—Two rows should be added to the synonym table. The values for the synonym table are as follows:

Row 1

| | |
|---|---|
| Synonym Name | The class code |
| User Identification | 'SA' |
| Parent Synonym Name | The class code of the parent classification |
| Keyword Flag | 'Y' |

Row 2

| | |
|---|---|
| Synonym Name | The classification title |
| User Identification | 'SA' |
| Parent Synonym Name | The class code |
| Keyword Flag | 'N' |

When inserting a row into the class table, add two rows to the class synonym table. The values for the class synonym table should be the following:

Row 1

| | |
|---|---|
| Synonym Name | The class code |
| User Identification | 'SA' |
| Class Identification | The class identification |

Row 2

| | |
|---|---|
| Synonym Name | The class title |
| User Identification | 'SA' |
| Class Identification | The class identification |

Update Trigger—See if the class code is being changed. If it is, then update the synonym name in the synonym table and the synonym name in the class synonym table.

When updating a row in the class table, see if the class title is being changed. If it is, then update the synonym name in the synonym table and the synonym name in the class synonym table.

When updating a row in the class table, see if the parent classification identification is being changed. If it is, then update the parent synonym name in the synonym table.

Delete Trigger—Delete the corresponding rows in the synonym table and the class synonym table where the following is true:

Synonym name equals class code and user identification equals 'SA' or

Synonym name equals classification title and user identification equal 'SA'

Function Table

Delete Trigger—Create a cascading delete that will remove the function form all other tables.

Update Trigger—If the function type is changed for 'REPORT' to something else, a search for the function column and function sort tables should be performed. If there are any rows in these tables, then they ought to be deleted.

Function Column Table

Insert Trigger—The function type column in the function table must be set to 'REPORT'. If the function is not a report, then it should not have rows in the function column or sort table.

The relationship code can only have values of 'EQUAL', 'LIKE' or 'BOTH'.

Also the column type values can only be 'CHAR', 'INT', 'DATE', and 'FLOAT'.

Update Trigger—The relationship code can only have values of 'EQUAL', 'LIKE' or 'BOTH'. Also the column type values can only be 'CHAR', 'INT', 'DATE', and 'FLOAT'.

Function Sort Table

Insert Trigger—There can only be one row having a default sort flag value of 'Y' for yes for each function.

Update Trigger—There can only be one row having a default sort flag value of 'Y' for yes for each function.

Function Usage Table
  Insert Trigger—The usage start date must be less than the usage end date.
  Update Trigger—The usage start date must be less than the usage end date.
Location Table
  Insert Trigger—If the level number for the location type is one, then the parent location identification equals the location identification. If the level number of the location type is not equal to one, then the parent location identification can not be equal to the location identification.
  If the level number is not equal to one, then the level number must be equal to one minus the level number for the parent location.
Object Table
  Insert Trigger—The object purpose can not be null if the object type code is 'V' for view.
  Insert Trigger—The object purpose can not be null if the object type code is 'V' for view.
Object Identification Table
  Insert Trigger—Insure that the object type column value in the object table is set to 'U' for user table.
  Update Trigger—Insure that the object type column value in the object table is set to 'U' for user table.
Organization Table
  Insert Trigger—If the level number for the organization type is one, then the parent organization identification equals the organization identification. If the level number of the organization type is not equal to one, then the parent organization identification can not be equal to the organization identification. If the level number is not equal to one, then the level number must be equal to one minus the level number for the parent organization.
  Update Trigger—If the level number for the organization type is one, then the parent organization identification equals the organization identification. If the level number of the organization type is not equal to one, then the parent organization identification can not be equal to the organization identification. If the level number is not equal to one, then the level number must be equal to one minus the level number for the parent organization.
User Table
  Insert Trigger—When inserting a new user, create rows for the user class table. Copy the user class rows for the person doing the inserting and place them into the user class table for the new user. The processing steps are:
    Retrieve the user ID of the individual inserting a new row into the user table.
    Take the user ID found in the previous step and read the user class table for the person doing the inserting. Retrieve their set of classifications and access codes.
    Insert the classifications and access codes found in the previous step under the ID of the new user.
    Ignore the processing describe above if the user doing the inserting is SA.
  Delete Trigger—Create a cascading delete that will remove the user for all other tables.
User Class Table
  Insert Table—There can only be one row having a default class flag value of 'Y' for yes for each user.
  If an individual is inserting a new row into the user class table, then that individual must have read or write access to that same class. The new row can not have write access to the class if the individual doing the inserting only has read access. Ignore this logic if the person doing the inserting is SA.
  Update Table—There can only be one row having a default class flag value of 'Y' for yes for each user.

If the access code is being changed from R=read to W=write then the individual making the change must have write access to that same class. Ignore this logic if the person doing the changing is SA.
User Database Table
  Insert Trigger—There can only be one row having a default database flag value of 'Y' for yes for each user.
  Update Trigger—There can only be one row having a default database flag value of 'Y' for yes for each user.
User Defined Datatypes
  User defined datatypes are common formats that will be applied to columns. The attributes for each datatype in this system are listed below.

udt_integer integer System generated identification numbers.

udt_ndt varchar(40) Names, descriptions and titles 40 chars or less.

udt_name char(20) First, Last Names, other names 20 chars or less.

udt_label char(25) Labels.

udt_text varchar(255) Long descriptions, text, explanations, summaries etc.

udt_identifier char(20) Any type of database object identifier.

udt_yesno char(1)Any yes/no column.

udt_phone char(13) Full length phone number—Do not store dashes.

udt_code_a char(1) Codes and other data of various lengths.

udt_code_b char(2)

udt_code_c char(6)

udt_code_d char(8)

udt_code_e char(10)

udt_code_f char(12)

udt_code_g char(15)

Physical Database Model
  The physical database model displays all the SQL attributes about each column in the application. It is the combination of the logical view, abbreviations, triggers, and user defined datatypes. The physical database model is presented in FIG. 14.
Physical Attributes
  The following table displays the SQL attributes (column name, datatype, null option, etc.) for each column being stored.

| Entity Name | Attribute Name | Column Name | Alternate Key | Foreign Key | Prime Key | Column Datatype | Null Option |
|---|---|---|---|---|---|---|---|
| Access | Access Code | acc_cd | | | (PK) | char(1) | NOT NULL |
| | Access Description | dsc | (AK1) | | | varchar(40) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Class | Class Identification | cls_idn | | | (PK) | int | NOT NULL |
| | Abstract | abs | | | | varchar(255) | NOT NULL |
| | Class Code | cls_cd | (AK1) | | | char(10) | NOT NULL |
| | Classification Title | tle | | | | varchar(40) | NOT NULL |
| | Classification Title Extended | tle_ext | | | | varchar(40) | NOT NULL |
| | Center Retention Months | ctr_rtnt_mth | | | | int | NOT NULL |
| | Organization Identification | org_idn | | (FK) | | int | NOT NULL |
| | Created By | cre_by | | | | char(20) | NOT NULL |
| | Media Type Code | med_typ_cd | | (FK) | | char(6) | NOT NULL |
| | Office Retention Months | ofc_rtnt_mth | | | | int | NOT NULL |
| | Parent Class Identification | prnt_cls_idn | | (FK) | | int | NOT NULL |
| | Record Type Code | rec_typ_cd | | (FK) | | char(1) | NOT NULL |
| | Retention Reference | rtnt_rfr | | (FK) | | varchar(40) | NOT NULL |
| | Retention Start Code | rtnt_str_cd | | (FK) | | char(2) | NOT NULL |
| | Sensitivity Code | sntv_cd | | (FK) | | char(2) | NOT NULL |
| | Vital Flag | vtl_flg | | | | char(1) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Data Dictionary | Entity Name | ent_nme | | | (PK) | varchar(40) | NOT NULL |
| | Attribute Name | att_nme | | | (PK) | varchar(40) | NOT NULL |
| | Attribute Definition | att_def | | | | varchar(255) | NOT NULL |
| | Column Name | col_nme | | | | varchar(40) | NOT NULL |
| | Datatype | dtyp | | | | char(20) | NOT NULL |
| | Entity Definition | ent_def | | | | varchar(255) | NOT NULL |
| | Null Option | null_opt | | | | char(20) | NOT NULL |
| | User Defined Datatype Name | udt_nme | | | | char(20) | NOT NULL |
| | Last Changed Date | lst_chg_dte | | | | datetime | NOT NULL |
| | Last Changed By | lst_chg_by | | | | char(20) | NOT NULL |
| | Timestamp | tmestamp | | | | timestamp | NULL |
| Function | Function Number | fxn_nbr | | | (PK) | char(8) | NOT NULL |
| | Function Purpose | prps | | | | varchar(255) | NOT NULL |
| | Function Subject Code | fxn_subj_cd | | (FK) | | char(10) | NOT NULL |
| | Function Title | tle | (AK1) | | | varchar(40) | NOT NULL |
| | Function Type Code | fxn_typ_cd | | (FK) | | char(1) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Function Column | Function Number | fxn_nbr | | (FK) | (PK) | char(8) | NOT NULL |
| | Table Name | tbl_nme | | (FK) | (PK) | char(20) | NOT NULL |
| | Column Name | col_nme | | (FK) | (PK) | char(20) | NOT NULL |
| | Column Null Flag | null_flg | | | | char(1) | NOT NULL |
| | Column Title | tle | | | | varchar(40) | NOT NULL |
| | Column Type | typ | | | | char(20) | NOT NULL |
| | Relationship Code | rel_cd | | | | char(6) | NOT NULL |
| | Required Flag | rqr_flg | | | | char(1) | NOT NULL |
| | Sequence Number | seq_nbr | | | | int | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Function Column Last Used | Function Number | fxn_nbr | | (FK) | (PK) | char(8) | NOT NULL |
| | Column Name | col_nme | | (FK) | (PK) | char(20) | NOT NULL |
| | User Identification | usr_idn | | (FK) | (PK) | char(30) | NOT NULL |
| | Table Name | tbl_nme | | (FK) | (PK) | char(20) | NOT NULL |

-continued

| Entity Name | Attribute Name | Column Name | Alternate Key | Foreign Key | Prime Key | Column Datatype | Null Option |
|---|---|---|---|---|---|---|---|
| | Column Value | col_val | | | | varchar(255) | NOT NULL |
| | Operator Code | opr_cd | | | | char(2) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Function Data Window | Table Name | tbl_nme | | | (PK) | char(20) | NOT NULL |
| | Column Name | col_nme | | | (PK) | char(20) | NOT NULL |
| | Data Window Name | dw_nme | | | | varchar(40) | NOT NULL |
| | Last Changed Date | lst_chg_dte | | | | datetime | NULL |
| | Last Changed By | lst_chg_by | | | | char(18) | NULL |
| | Timestamp | timestamp | | | | timestamp | NULL |
| Function sort | Function Number | fxn_nbr | | (FK) | (PK) | char(8) | NOT NULL |
| | Order By | ord_by | | | (PK) | varchar(200) | NOT NULL |
| | Data Window Name | dw_nme | | | | varchar(40) | NOT NULL |
| | Default Sort Flag | dft_srt_flg | | | | char(1) | NOT NULL |
| | Order By Title | tle | | | | varchar(255) | NOT NULL |
| | Sequence Number | seq_nbr | | | | int | NOT NULL |
| | Last Changed Date | lst_chg_dte | | | | datetime | NULL |
| | Last Changed By | lst_chg_by | | | | char(20) | NULL |
| | Requires Stored Procedure | rqr_usp | | | | char(20) | NULL |
| | Timestamp | timestamp | | | | timestamp | NULL |
| Function Sort Last Used | Function Number | fxn_nbr | | (FK) | (PK) | char(8) | NOT NULL |
| | Order By | ord_by | | (FK) | (PK) | varchar(200) | NOT NULL |
| | User Identification | usr_idn | | (FK) | (PK) | char(30) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Function Subject | Function Subject Code | fxn_subj_cd | | | (PK) | char(10) | NOT NULL |
| | Function Subject Description | dsc | (AK1) | | | varchar(40) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Function Type | Function Type Code | fxn_typ_cd | | | (PK) | char(1) | NOT NULL |
| | Function Type Description | dsc | | | | varchar(40) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Function Usage | Usage Start Date | usg_str_dte | | | (PK) | datetime | NOT NULL |
| | Function Number | fxn_nbr | | (FK) | (PK) | char(8) | NOT NULL |
| | User Identification | usr_idn | | (FK) | (PK) | char(30) | NOT NULL |
| | Rows Processed | row_prcs | | | | int | NOT NULL |
| | Usage End Date | usg_end_dte | | | | datetime | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Inventory | Inventory Identification | inv_idn | | | (PK) | int | NOT NULL |
| | Organization Identification | org_idn | (AK1) | (FK) | | int | NOT NULL |
| | Author | athr | (IE1) | | | varchar(40) | NOT NULL |
| | Class Identification | cls_idn | | (FK) | | int | NOT NULL |
| | Created By | cre_by | | (FK) | | char(30) | NULL |
| | Original File Name | orgn_file_nme | | | | varchar(40) | NULL |
| | Inventory Label Line 1 | inv_lbl_ln_1 | (AK1) | | | char(25) | NOT NULL |
| | Inventory Label Line 2 | inv_lbl_ln_2 | (AK1) | | | char(25) | NOT NULL |
| | Inventory Label Line 3 | inv_lbl_ln_3 | (AK1) | | | char(25) | NOT NULL |
| | Location | loc_idn | | (FK) | | int | NOT NULL |

-continued

| Entity Name | Attribute Name | Column Name | Alternate Key | Foreign Key | Prime Key | Column Datatype | Null Option |
|---|---|---|---|---|---|---|---|
| | Identification | | | | | | |
| | Media Type Code | med_typ_cd | (AK1) | (FK) | | char(6) | NOT NULL |
| | Record Type Code | rec_typ_cd | (AK1) | (FK) | | char(1) | NOT NULL |
| | Storage Date | strg_dte | (IE3) | | | datetime | NOT NULL |
| | Series Code | ser_cde | (IE2) | | | char(10) | NOT NULL |
| | System Entry Date | sys_ntry_dte | | | | datetime | NOT NULL |
| | Last Changed Date | lst_chg_dte | | | | datetime | NULL |
| | Last Changed By | lst_chg_by | | | | char(20) | NOT NULL |
| | Timestamp | timestamp | | | | timestamp | NULL |
| Inventory Abstract | Inventory Identification | inv_idn | | (FK) | (PK) | int | NOT NULL |
| | Abstract | abs | | | | text | NULL |
| | Center Retention Months | ctr_rtnt_mth | | | | int | NOT NULL |
| | Office Retention Months | ofc_rtnt_mth | | | | int | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Inventory Request | Inventory Identification | inv_idn | | (FK) | (PK) | int | NOT NULL |
| | User Identification | usr_idn | | (FK) | (PK) | char(30) | NOT NULL |
| | Request Type Code | rqst_typ_cd | | (FK) | (PK) | char(1) | NOT NULL |
| | Location Identification | loc_idn | | (FK) | | int | NULL |
| | Media Type Requested | med_typ_cd | | (FK) | | char(6) | NULL |
| | Request Date | rqst_dte | | | | datetime | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Inventory Statistics | Class Identification | cls_idn | | (FK) | (PK) | int | NOT NULL |
| | Location Identification | loc_idn | | (FK) | (PK) | int | NOT NULL |
| | Record Type Code | rec_typ_cd | | (FK) | (PK) | char(1) | NOT NULL |
| | Collection Date | colc_dte | | | (PK) | datetime | NOT NULL |
| | Inventory Quantity | inv_qty | | | | int | NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Location | Location Identification | loc_idn | | | (PK) | int | NOT NULL |
| | Location Description | dsc | | | | varchar(50) | NOT NULL |
| | Location Number | nbr | (AK1) | | | char(10) | NOT NULL |
| | Location Type Code | loc_typ_cd | | (FK) | | char(2) | NOT NULL |
| | Parent Location Identification | prnt_loc_idn | | (FK) | | int | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Location Type | Location Type Code | loc_typ_cd | | | (PK) | char(2) | NOT NULL |
| | Archive Facility Flag | arch_fac_flg | | | | char(1) | NOT NULL |
| | Location Type Description | dsc | (AK1) | | | varchar(40) | NOT NULL |
| | Level Number | lvl_nbr | | | | int | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Media Type | Media Type Code | med_typ_cd | | | (PK) | char(6) | NOT NULL |
| | Media Type Description | dsc | (AK1) | | | varchar(40) | NOT NULL |
| | ERS Express Access Flag | ers_expr_acc_flg | | | | char(1) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Object Identification | Object Name | obj_nme | | | (PK) | char(20) | NOT NULL |
| | Identification | idn | | | | int | NOT NULL |

-continued

| Entity Name | Attribute Name | Column Name | Alternate Key | Foreign Key | Prime Key | Column Datatype | Null Option |
|---|---|---|---|---|---|---|---|
| | Last Changed Date | lst_chg_dte | | | | datetime | NOT NULL |
| | Last Changed By | lst_chg_by | | | | char(20) | NOT NULL |
| | Timestamp | timestamp | | | | timestamp | NOT NULL |
| | Filler 1 | filler_1 | | | | char(255) | NOT NULL |
| | Filler 2 | filler_2 | | | | char(255) | NOT NULL |
| | Filler 3 | filler_3 | | | | char(255) | NOT NULL |
| | Filler 4 | filler_4 | | | | char(255) | NOT NULL |
| | Filler 5 | filler_5 | | | | char(255) | NOT NULL |
| | Filler 6 | filler_6 | | | | char(255) | NOT NULL |
| | Filler 7 | filler_7 | | | | char(255) | NOT NULL |
| | Filler 8 | filler_8 | | | | char(103) | NOT NULL |
| Organization | Organization Identification | org_idn | | | (PK) | int | NOT NULL |
| | Organization Code | org_cd | (AK1) | | | char(10) | NOT NULL |
| | Organization Name | org_nme | | | | varchar(40) | NOT NULL |
| | Organization Type Code | org_typ_cd | | (FK) | | char(2) | NOT NULL |
| | Parent Organization Identification | prnt_org_idn | | (FK) | | int | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Organization Type | Organization Type Code | org_typ_cd | | | (PK) | char(2) | NOT NULL |
| | Organization Type Description | dsc | (AK1) | | | varchar(40) | NOT NULL |
| | Level Number | lvl_nbr | | | | int | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Record Type | Record Type Code | rec_typ_cd | | | (PK) | char(1) | NOT NULL |
| | Record Type Description | dsc | | | | varchar(40) | NOT NULL |
| | Record Type Procedure | pcdr | | | | varchar(255) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Request Type | Request Type Code | rqst_typ_cd | | | (PK) | char(1) | NOT NULL |
| | Request Type Description | dsc | (AK1) | | | varchar(40) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Retention Reference | Retention Reference | rtnt_rfr | | | (PK) | varchar(40) | NOT NULL |
| | Abstract | abs | | | | varchar(255) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Retention Start | Retention Start Code | rtnt_str_cd | | | (PK) | char(2) | NOT NULL |
| | Retention Start Description | dsc | (AK1) | | | varchar(255) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Sensitivity | Sensitivity Code | sntv_cd | | | (PK) | char(2) | NOT NULL |
| | Sensitivity Description | dsc | (AK1) | | | varchar(40) | NOT NULL |
| | Last Changed Date | lst_chg_dte | | | | datetime | NULL |
| | Last Changed By | lst_chg_by | | | | char(20) | NULL |
| | Timestamp | timestamp | | | | timestamp | NULL |
| Synonym | Synonym Identification | syn_idn | | | (PK) | int | NOT NULL |
| | Synonym Name | syn_nme | (AK) | | | varchar(40) | NOT NULL |
| | User Identification | usr_idn | (AK) | (FK) | | char(30) | NOT NULL |
| | Class Identification | cls_idn | (AK) | (FK) | | int | NOT NULL |
| | Keyword Flag | key_wrd_flg | | | | char(1) | NOT NULL |
| | Last Changed Date | lst_chg_dte | | | | datetime | NULL |

-continued

| Entity Name | Attribute Name | Column Name | Alternate Key | Foreign Key | Prime Key | Column Datatype | Null Option |
|---|---|---|---|---|---|---|---|
| | Last Changed By Timestamp | lst_chg_by timestamp | | | | char(20) timestamp | NULL NULL |
| User | User Identification | usr_idn | | (FK) | (PK) | char(30) | NOT NULL |
| | Default Location Identification | loc_idn | | (FK) | | int | NOT NULL |
| | Organization Identification | org_idn | | (FK) | | int | NOT NULL |
| | Mail Stop | mail_stop | | | | char(10) | NULL |
| | Output Directory | out_dir | | | | varchar(255) | NULL |
| | Last Changed Date | lst_chg_dte | | | | datetime | NULL |
| | Last Changed By Timestamp | lst_chg_by timestamp | | | | char(20) timestamp | NULL NULL |
| User Class | Class Identification | cls_idn | | (FK) | (PK) | int | NOT NULL |
| | User Identification | usr_idn | | (FK) | (PK) | char(30) | NOT NULL |
| | Access Code | acc_cd | | (FK) | | char(1) | NULL |
| | Default Class Flag | dft_cls_flg | | | | char(1) | NOT NULL |
| | Last Assigned Date | lst_asgn_dte | | | | datetime | NULL |
| | Last Changed Date | lst_chg_dte | | | | datetime | NULL |
| | Last Changed By Timestamp | lst_chg_by timestamp | | | | char(20) timestamp | NULL NULL |

System Requirements

The purpose of this section of the document is to define the minimum hardware and software needed to run and maintain the application. This section is divided into three parts; Client Workstation, Developers Workstation, and Server. The requirements defined below assume that there are no other applications running on this equipment at the same time.

Client Workstation

The client workstation is the personal computer run by the average user. Its purpose is to create word processing documents, spreadsheets, presentations, and to run the ERS application.

| Hardware | |
|---|---|
| Processor | 486/66 MHz processor, or faster. |
| Memory | 16 Meg. of memory or more. |
| Hard Disk | 500 Meg. of available disk space or more. Access to a common network drive containing the application software. |
| Monitor | VGA color monitor. |
| Printer | Access to a LASER printer, 300 dpi resolution or higher. |
| Network Card | Must be compatible with available cabling, network software, and PC hardware. |
| Keyboard | |
| Mouse | |
| Software | |
| Operating System | Microsoft DOS, release 6.22. Microsoft Windows for Workgroups, release 3.11. Network Software such as Novell or Windows for Workgroups. |

Application Packages Microsoft Office containing Word, Excel, and PowerPoint.

Developer Workstation

The developer workstation is used to construct and maintain the application. It contains all the tools needed to modify the source code for the system.

| Hardware | |
|---|---|
| Processor | Pentium 100 MHz processor, or faster. |
| Memory | 24 Meg. of memory or more. |
| Hard Disk | 1 Gig. of available disk space or more. Access to a common network drive containing the application software. |
| CD ROM | 4x speed, or faster. |
| Tape Drive | 250 Meg tape backup, or larger. |
| Monitor | 17" VGA color monitor. |
| Printer | Access to a laser printer, 300 dpi resolution or higher. |
| Network Card | Must be compatible with available cabling, network software, and PC hardware. |
| Modem | 28.8 FAX/Modem, or faster. |
| Keyboard | |
| Mouse | |
| Software | |
| Operating System | Microsoft DOS, release 6.22. Microsoft Windows for Workgroups, release 3.11. Network Software such as Novell or Windows for Workgroups. |
| Application Packages Microsoft Office containing Word, Excel, and PowerPoint. | Microsoft Project, release 4.0. |
| Development Tools | PowerSoft PowerBuilder, release 4.0.4. MetaSolv PowerFrame, release 4.0. Norton Desktop for Windows, release 3.0. Logic Works ERWin for PowerBuilder, release 2.5. Embarcadero Technologies DBArtisan, release 2.02. Embarcadero Technologies Rapid SQL, release 1.02. Blue Sky Software RoboHelp, release 3.0. PC Install for Windows 3.X. Saros Mezzanine Developers Tool Kit. Saros Document Manager. |

Server

The server supports the user community and developers. It acts as the centralized storage point for the system's database and archived documents. The server should support two modems for remote access trouble shooting, demonstrations, and training sessions. The amount of disk space requested should be enough to support two versions of the database.

| Hardware | |
|---|---|
| Processor | Two Pentium 100 MHz processors, or faster. |
| Memory | 64 Meg. of memory or more. |
| Hard Disk | 1 Gig. of available disk space or more. Access to a common network drive containing the application software. |
| CD ROM | 4x speed, or faster. |
| Tape Drive | 250 Meg tape backup, or larger. |
| Monitor | VGA color monitor. |
| Printer | Access to a LASER printer, 300 dpi resolution or higher. |
| Network Card | Must be compatible with available cabling, network software, and PC hardware. |
| Modem | Two 28.8 FAX/Modems, or faster. |
| Keyboard | |
| Mouse | |
| Software | |
| Operating System | Microsoft Windows NT, release 3.5. |
| Database Server | Microsoft SQLServer, release 4.2 or higher. |
| Document Server | Saros Mezzanine Document Server. |

The production implementation of ERS will require one server. ERS will have 1,200 total users in one geographic location. 300 of the users will be active at any one point in time ERS is planned to be a 500 Meg database containing 300,000 inventory items.

Clarifications

The purpose of this section of the design document is to clearly state limitations of the system. The items listed below are not planned to be implemented in ERS at the present time. However, there is nothing preventing these functions or capabilities from being added to the application at a later date.

Ad Hoc Reporting

The menus within the ERS application will not provide access to any ad hoc reporting tools such as InfoMaker by PowerSoft or Microsoft Access.

Ad hoc reporting tools will not have access the ERS database. User passwords will be encrypted to prevent ad hoc tools from gaining access to the database.

ERS could be modified to bring up an ad hoc reporting tool from its menu some time in the future, if desired.

Multiple Databases

ERS will use only one database.

Only one database is needed. Based upon the size to the database (500 Megs.), the quantity of users(300 active users), and the location of the users (one building) can be supported on one server. For this reason, multiple databases will not be provided, nor will any across database functions be built.

As the application grows in quantity of users or locations, additional databases can be considered at a later date.

Archive Facility Management

ERS will track what documents are available and where.

ERS acts as the pointer to archive facilities. Some these documents will be stored in archive facilities such as off site warehouses or in Mezzanine.

ERS will not manage the operation of these archive facilities. It will not perform document check in and check out functions, or deliver the document to the user's workstation, for example. These functions will be the responsibility of the archive facility.

In this fashion there will be a division of labor. ERS can do what it is designed to best and the archive facilities can continue to perform what they do best.

Total Control Over All Corporate Information

ERS will not provide a fully automated means to enroll all of a corporation's information into a records management database. All information implies every eMail message, all application database transactions, telephone conversation, as well as electronic and hard copy documents.

ERS will not provide an interface into off site storage facility's information system. If the volume of information flowing between an office and a off site storage facility warrants it, an interface could be added later.

ERS will not provide an interface into eMail systems. The policies on the control and management of eMail messages needs to be established, first, before an interface can be considered.

ERS will provide a means to easily input hard copy documents, Microsoft Word documents, and Excel spreadsheets into a inventory and to classify these documents.

| Glossary | |
|---|---|
| Archive Facility | Off site storage of an inventory item or the storage of an item online in Mezzanine. |
| Classification | The process of assigning a class to a document. A class determines the record type, retention period, and sensitivity for the document. |
| ERS | Electronic Records System. |
| Functions | The capabilities of a system are functions. Functions fall into five types. They are reports, updates, inquires, interfaces, and utilities. System functions are composed of features. |
| Informational Record Type | The majority of all records can be categorized as informational records. These records are not covered by law. They can be originals or copies. |
| Inventory | A document or set of records stored for historical or legal purposes. |
| Keyword | A corporate created synonym. A synonym not created by a typical user. They are created by the Records Manger. Keywords can be referred to as official terms. |
| Media | The form a document or record in inventory takes. Media are hard copy, disk, tape, microfiche, etc. |
| Official Record Type | A small quantity of the total records can be categorized as official records. These records are always originals and never copies. Official records are covered by law. Contracts would be an example of official records or documents. |
| Official Term | A keyword or corporate created synonym. |
| Organization | A company, department, or cost center. |
| Record Type | Records have two types; official and informational. |
| Retention Period | The quantity of months a document is stored for historical or legal purposes. The retention period is determined by the class assigned to a document. |
| Retirement | The process of destroying a document that has been stored in inventory past its retention period. |
| Sensitivity | Records have four categories of sensitivity. They range from confidential to secret. |
| Synonym | A classification code, a portion of a classification name, and commonly used phrase that means the same as the classification name. Synonyms fall into two categories; corporate and user. Corporate synonyms are recognized throughout the organization and can be referred to as keywords or official terms. User synonyms are phrases made up by individual users. User synonyms always children to corporate synonyms. |
| User | Someone who can access the system. |
| User Group | A category or set of users all having the same security access to system functions and tables. Four user groups are planned; normal user, Departmental Coordinators, Information Services, and Record Manager. |

| | Glossary |
|---|---|
| Vital Attribute | Records whose loss would have a financial impact on the organization. Vital record is an attribute of class. It is not a record type. |

What is claimed is:

1. A computer implemented method for enabling individuals in an enterprise to uniformly classify documents comprising the steps of:
   a) assigning to a document to be classified a class code selected from a set of predetermined class codes from a class database, each of said class codes representing a class, said class database arranged in a hierarchy of classes from general to specific utilizing a hierarchically structured methodology using terms in current use by the enterprise wherein at least one of said class codes has at least one associated synonym stored in a synonym database;
   b) assigning a document type to said document;
   c) assigning a retention period to each of said classes and each of said document types, said retention period being associated with its corresponding class and corresponding document type in said class database and determined by governmental requirements;
   d) storing the class code and document type as part of a record in a document database.

2. The method defined by claim 1 wherein each of said class codes is selected from terms used in business and government.

3. The method defined by claim 1 wherein said document type is one of official, informational, vital and sensitive.

4. The method defined by claim 1 further comprising the steps of:
   a) assigning to said document a media type and location;
   b) storing the media type and location assigned to said document as part of said record in said document database.

5. The method defined by claim 1 further comprising the steps of:
   a) searching said document database by class code and
   b) generating a display showing matching records.

6. The method defined by claim 1 further comprising the steps of:
   a) receiving a term as a search parameter; and
   b) searching said document database using said search parameter by class code and generating a display showing records in said document database where said search parameter matches the class code, and if no matching records are found, searching said synonym database and generating a display showing records in said document database having a class code associated with a synonym which matches said search parameter.

7. The method defined by claim 1 wherein said synonym database is customizable at a user workstation for use by a user at said user workstation.

8. The method defined by claim 1 further comprising the step of:
   assigning to a user a user access code based on said user's position within at least one of a chart of accounts and an organization chart.

9. The method defined by claim 8 further comprising the steps of:
   a) assigning an organization name to said document;
   b) comparing the class code and the organization name assigned to the document to the user's access code;
   c) permitting the user access to said document if the class code and the organization name match the user's access code and preventing said user from accessing said document if the class code and the organization name do not match the user's access code.

10. The method defined by claim 1 wherein said document type serves as a modifier to the assigned class code.

* * * * *